(12) United States Patent
Taniguchi et al.

(10) Patent No.: US 9,787,496 B2
(45) Date of Patent: Oct. 10, 2017

(54) COMMUNICATION SYSTEM, COMMUNICATION APPARATUS, AND PROTECTION METHOD

(71) Applicant: Mitsubishi Electric Corporation, Chiyoda-ku (JP)

(72) Inventors: Sachiko Taniguchi, Tokyo (JP); Ryusuke Kawate, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 53 days.

(21) Appl. No.: 14/897,094

(22) PCT Filed: Feb. 26, 2014

(86) PCT No.: PCT/JP2014/054765
§ 371 (c)(1),
(2) Date: Dec. 9, 2015

(87) PCT Pub. No.: WO2014/199670
PCT Pub. Date: Dec. 18, 2014

(65) Prior Publication Data
US 2016/0142225 A1  May 19, 2016

(30) Foreign Application Priority Data
Jun. 12, 2013 (JP) .................... PCT/JP2013/066260

(51) Int. Cl.
*H04L 12/26* (2006.01)
*H04L 12/437* (2006.01)
(Continued)

(52) U.S. Cl.
CPC ............ *H04L 12/437* (2013.01); *H04L 12/42* (2013.01); *H04L 43/0823* (2013.01); *H04L 69/40* (2013.01); *H04L 2012/421* (2013.01)

(58) Field of Classification Search
CPC ..................................................... H04L 12/437
(Continued)

(56) References Cited

U.S. PATENT DOCUMENTS 6,766,482 B1 * 7/2004 Yip ...................... H04L 12/437
370/216
8,018,842 B2   9/2011 Yoshimaru
(Continued)

FOREIGN PATENT DOCUMENTS

JP   2008 136013    6/2008
JP      4874185     2/2012
(Continued)

OTHER PUBLICATIONS

Office Action dated Feb. 16, 2016 in Japanese Patent Application No. 2015-522577 with partial English translation.
(Continued)

*Primary Examiner* — Guang Li
(74) *Attorney, Agent, or Firm* — Oblon, McClelland, Maier & Neustadt, L.L.P.

(57) ABSTRACT

A communication system includes two or more ring networks in which nodes are connected in a ring shape, carries out ERP for each of the ring networks, sets one of the ring networks as a major ring that detects a failure in a shared link, and sets the other ring networks as sub rings. A shared node, which terminates the shared link, includes: a failure monitoring unit that respectively detects, concerning two or more of the ring networks that share the shared link, failures in the ring networks; a switching processing unit that determines, on the basis of a detection result of the failures, the ring network set as the major ring; and ERP processing units that store, when the switching is performed by the
(Continued)

switching processing unit, identification information after the switching in an R-APS frame and transfer or transmit the frame.

13 Claims, 30 Drawing Sheets

(51) Int. Cl.
*H04L 12/42* (2006.01)
*H04L 29/14* (2006.01)
(58) Field of Classification Search
USPC .......................................................... 370/223
See application file for complete search history.

(56) References Cited

U.S. PATENT DOCUMENTS

| | | | | |
|---|---|---|---|---|
| 8,649,261 B2* | 2/2014 | Wang | .................... | H04L 12/437 370/228 |
| 9,148,346 B2* | 9/2015 | Singh | | |
| 9,276,767 B2* | 3/2016 | Bos | ........................ | H04L 12/437 |
| 9,319,240 B2* | 4/2016 | Nahlous | ................ | H04L 12/437 |
| 2004/0252688 A1* | 12/2004 | May | ........................ | H04L 12/42 370/389 |
| 2008/0126536 A1 | 5/2008 | Sakurai | | |
| 2008/0192624 A1* | 8/2008 | de Frias Rebelo Nunes | .................... | H04L 12/437 370/223 |
| 2008/0317061 A1* | 12/2008 | Dake | ..................... | H04L 12/403 370/452 |
| 2009/0196172 A1* | 8/2009 | Long | .................... | H04L 12/437 370/225 |
| 2010/0135154 A1* | 6/2010 | Cheung | ............... | H04L 12/4625 370/223 |
| 2011/0019536 A1* | 1/2011 | Kim | ...................... | H04L 12/437 370/223 |
| 2011/0158241 A1* | 6/2011 | Wang | .................... | H04L 12/42 370/395.53 |
| 2011/0261681 A1* | 10/2011 | Wu | .................... | H04L 12/40045 370/223 |
| 2012/0155246 A1* | 6/2012 | Wang | .................... | H04L 12/437 370/217 |
| 2012/0250695 A1* | 10/2012 | Jia | ........................... | H04L 12/42 370/400 |
| 2012/0320734 A1 | 12/2012 | Sakurai | | |
| 2013/0064071 A1* | 3/2013 | Bos | ........................ | H04L 12/437 370/223 |
| 2013/0177021 A1* | 7/2013 | Kitayama | ............. | H04L 12/423 370/392 |
| 2013/0294226 A1* | 11/2013 | Lim | ........................ | H04L 69/40 370/225 |
| 2013/0343179 A1* | 12/2013 | Madaiah | ............... | H04L 12/437 370/222 |
| 2014/0064061 A1* | 3/2014 | Kulambi | ............... | H04L 12/437 370/223 |
| 2014/0078886 A1* | 3/2014 | Shukla | .................. | H04L 12/437 370/218 |
| 2015/0103830 A1* | 4/2015 | Kampmann | ............ | H04L 12/42 370/392 |

FOREIGN PATENT DOCUMENTS

| | | |
|---|---|---|
| JP | 2013 157682 | 8/2013 |
| WO | 2012 086019 | 6/2012 |

OTHER PUBLICATIONS

Koji Shibata, et al. Protection Switching Mechanism in case of Multiple Failure on the ERP Multi-Ring Network, The Institute of Electronics, Information and Communication Engineers, Communication 2, Mar. 6, 2012 p. 74.
G.8032/Y.1344, "Series G: Transmission Systems and Media, Digital Systems and Networks Packet over Transport aspects—Ethernet over Transport aspects Series Y: Global Information Infrastructure, Internet Protocol Aspects and Next-Generation Networks Internet protocol aspects—Transport", ITU-T, (Feb. 2012), Total 104 Pages.
International Search Report dated Mar. 25, 2014 in PCT/JP14/054765 Filed Feb. 26, 2014.

* cited by examiner

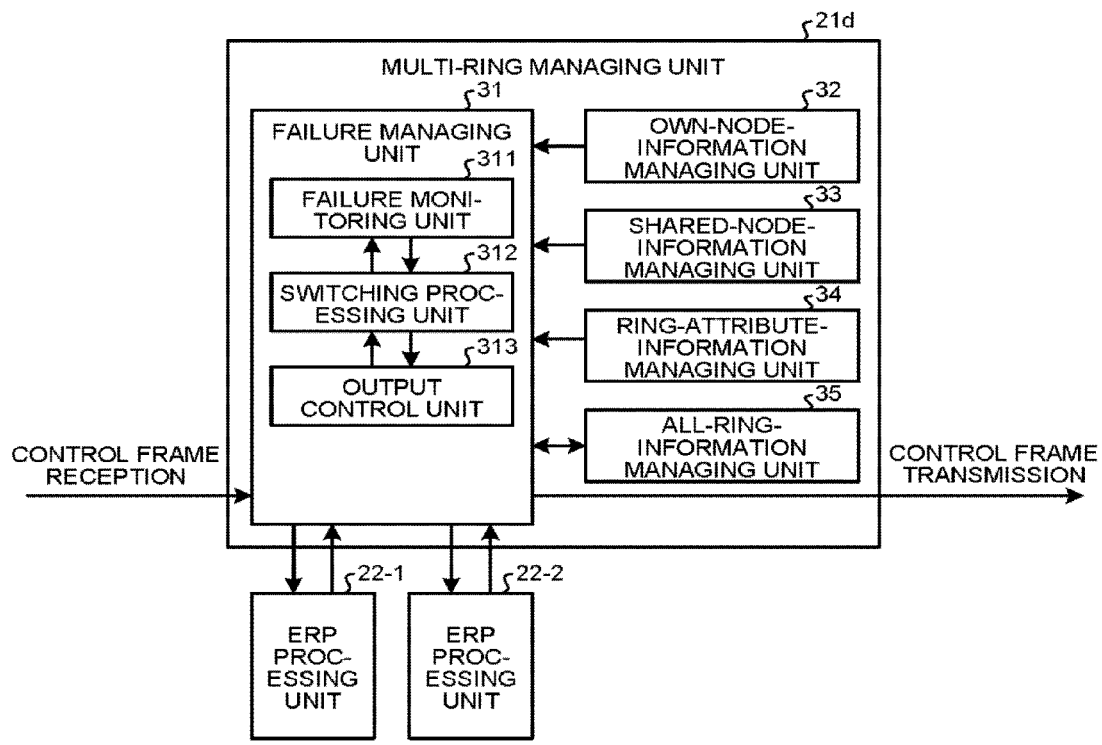

COMMUNICATION SYSTEM, COMMUNICATION APPARATUS, AND PROTECTION METHOD

FIELD

The present invention relates to a communication system, a communication apparatus, and a protection method.

BACKGROUND

As a configuration for imparting redundancy to a communication route to realize an improvement in the reliability of a network, a ring type network (a ring network) in which two or more communication apparatuses are connected in a ring shape is widely adopted. In a ring type network, when a loop occurs, the bandwidth of a transmission line can be completely consumed by the infinite circulation of a broadcast frame. Other communication thereby cannot be performed. Therefore, it is necessary to prevent the infinite circulation of frames. Therefore, usually, a method of logically disconnecting (hereinafter referred to as blocking) a single port on the ring network is used. In order to prevent division of the communication route when a failure occurs on a ring network, there have been devised several methods for securing a communicable route by switching the blocked port from a port set as the blocked port to a port in which the failure occurs.

For example, with ERP (Ethernet (registered trademark) Ring Protection), which is the ring protection standard for the Ethernet (registered trademark) ring in Non Patent Literature 1, the ring networks from which a multi-ring network is configured have one port that represents one of the node apparatuses (a Ring Protection Link owner: hereinafter referred to as RPL owner) that is blocked to logically disconnect a ring on the blocked port side and avoid occurrence of a loop during normal time. When a failure occurs, a node apparatus that detects the failure blocks the port in which the failure is detected and transmits an R-APS (Ring-Automatic Protection Switching) frame, which is a control frame for failure notification, from another port. When the RPL owner receives the control frame, the RPL owner unblocks the blocked port in order to perform route switching.

In the multi-ring network of the ERP in Non Patent Literature 1, when two ring networks are connected, one ring network is set as a major ring having a closed loop shape and the other ring network is set as a sub ring having an open loop shape. The major ring means a ring network that performs failure management for a transmission line shared by a plurality of ring networks (hereinafter, shared link). The cub ring means a ring network that does not perform failure management. If the major ring and the sub ring are not set in this way, both of the rings performs failure management on the shared link when shared link failure occurs. That is, when a shared link failure occurs, ports previously blocked by the RPL owner in both the ring networks are unblocked and a loop extending across both the ring networks occurs. Therefore, in a multi-ring network, one major ring and one or more sub rings are established with respect to the ring networks connected by the shared link. The major ring and the sub rings each carry out protection independently for failures other than a failure in the shared link. When failures occur in the local rings, the unblocking of blocked ports in the local rings is performed. However, when a shared link failure occurs, only the major ring performs failure management and carries out a protection operation by performing route switching to thereby avoid occurrence of a loop.

CITATION LIST

Non Patent Literature

Non Patent Literature 1: ITU-T G.8032/Y.1344 "Ethernet ring protection switching" February 2012

SUMMARY

Technical Problem

In the technology described in Non Patent Literature 1, when more than one failure including a failure in the shared link occurs, i.e., when a failure in the shared link and a failure other than a failure in the shared link occur, the unblocking of blocked ports in the sub rings is not however performed because no failure occurs in the sub rings. Therefore, when the failures including the failure in the shared link occur in the major ring, although a physical bypass is present, because the major ring and the sub rings independently carry out protection, there is a problem in that the protection does not operate in the sub rings, division of the network then occurs, and a node incapable of performing communication appears.

The present invention has been devised in view of the above and it is an objective of the present invention to obtain a communication system, a communication apparatus, and a protection method that can continue communication in a case where multiple failures including a failure in a shared link occur.

Solution to Problem

In order to solve the problem and achieve the objective mentioned above, the present invention relates to a communication system that includes two or more ring networks in which a plurality of communication apparatuses are connected in a ring shape, the communication system carrying out ring protection by blocking a single port as a blocked port for each of the ring networks and switching the blocked port to a failure occurrence port when a failure occurs, setting one of the ring networks as a major ring that detects a failure in a shared link, which is a transmission line shared among the ring networks, and setting the ring network other than the major ring as sub ring that does not monitor for a failure. A shared apparatus, which is the communication apparatus that terminates the shared link, includes: a failure monitoring unit that, for two or more of the ring networks that share the shared link, detects both failures in the ring networks and also detects a failure in the shared link; a switching processing unit that carries out switching of the major ring and the sub ring on the basis of a detection result of the failures detected by the failure monitoring unit; and a ring processing unit that notifies, when the switching is performed by the switching processing unit, the ring networks of information indicating the major ring after the switching.

Advantageous Effects of Invention

The communication system, the communication apparatus, and the protection method according to the present invention attain an effect whereby it is possible to continue communication when multiple failures including a failure in a shared link occur.

BRIEF DESCRIPTION OF DRAWINGS

FIG. 45 is a diagram illustrating an example configuration of a multi-ring managing unit of a shared node in the sixth embodiment.

FIG. 46 is a diagram illustrating an example of a ring management table.

FIG. 46 is a diagram illustrating a state in which failures occur in two shared links.

DESCRIPTION OF EMBODIMENTS

Exemplary embodiments of the present invention are described in detail below with reference to the drawings. Note that the present invention is not limited to the embodiment.

First Embodiment

Figure 1:
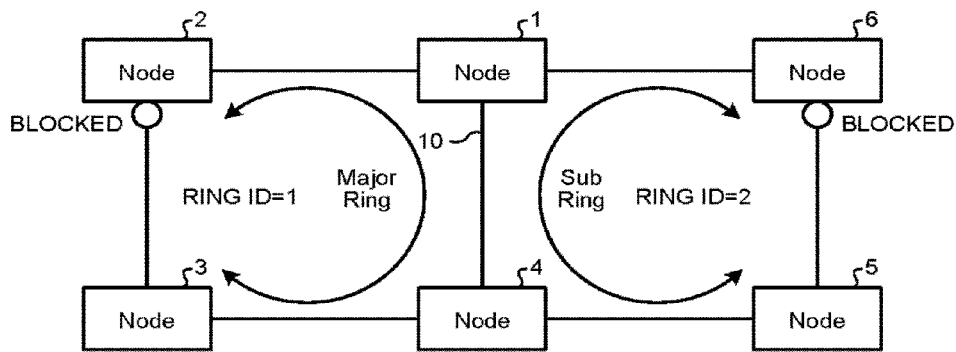
FIG. 1 is a diagram illustrating an example configuration of a multi-ring network in a first embodiment.

FIG. 1 is a diagram illustrating an example configuration of a multi-ring network (a communication system) according to a first embodiment of the present invention. The multi-ring network (a multi-ring network system) in the embodiment is made up of a ring network (hereinafter abbreviated as ring as appropriate) with a ring with a ring ID (IDentifier)=1 and a ring with a ring ID=2. The ring with the ring ID=1 includes nodes 1, 2, 3, and 4, which are communication apparatuses. The ring with the ring ID=2 includes nodes 1, 4, 5, and 6. The ring with the ring ID=1 and the ring with the ring ID=2 are connected via the nodes 1 and 4, which are communication apparatuses shared by the two rings (hereinafter referred to as shared nodes as appropriate). Nodes 1 and 4 connect with each other via a shared link 10.

As illustrated in FIG. 1, the ring with the ring ID=1 is set in advance as a major ring that performs failure management for the shared link 10; and the ring with the ring ID=2 is set in advance as a sub ring that does not perform failure management for the shared link 10.

Note that, in FIG. 1, the multi-ring network including the six apparatuses including the two shared nodes is illustrated as an example. However, the number of nodes connected to the rings is not limited to this. In FIG. 1, an example configuration in which two rings are connected is illustrated. However, this embodiment is also applicable to a structure in which three or more ring networks are connected. This embodiment is also applicable when three or more shared nodes are connected to the shared link.

Each of the nodes 1 to 6 includes a plurality of ports. The ports of the nodes adjacent to one another are connected to form the rings and the multi-ring network is thus configured. In the multi-ring network illustrated in FIG. 1, the nodes 1 and 4, which are the shared nodes, include three or more ports. The other nodes 2, 3, 5, and 6 include two or more ports.

The nodes 2 and 6 operate as RPL owner nodes for ERP. The other nodes 1, 3, 4, and 5 operate as non-RPL owner nodes for ERP. Concerning setting of an RPL owner and setting and unblocking of a blocked port, operations are supposed to conform to the ERP standard of the related art. Note that an example is described below in which ERP is used as a ring protection method for setting the blocked port in order to avoid a loop in a ring network from occurring. However, the ring protection method is not limited to ERP.

The rings with the ring IDs=1 and 2 operate a specific single link in the rings in a logically disconnected state in order to prevent a loop frame from occurring in the rings. Usually, one port of the RPL owner node is blocked to logically disconnect a link from an adjacent node. A disconnection point of the link is referred to as a BP (Blocking Point). The blocked port is referred to as port subjected to a BP setting. In the example configuration illustrated in FIG. 1, a port of the node 2 on the node 3 side and a port of the node 6 on the node 5 side are set as BPs. In normal ERP, in the node subjected to BP setting, a control frame and a data frame are not transferred to the adjacent node and are discarded. In contrast, in a port not subjected to the BP setting, the control frame and the data frame are permitted to be transferred to the adjacent node.

Figure 2:
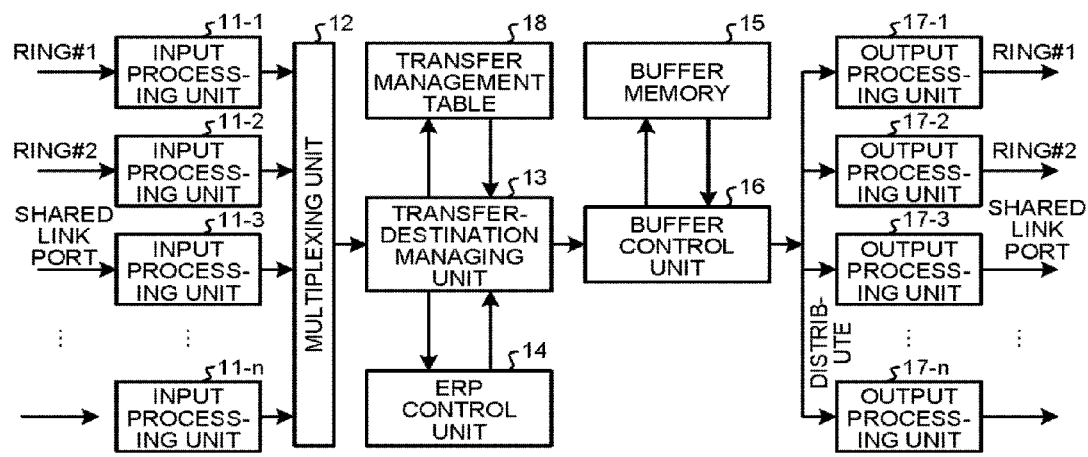
FIG. 2 is a diagram illustrating an example configuration of a shared node in the first embodiment.

FIG. 2 is a diagram illustrating an example configuration of a shared node (in the example configuration illustrated in FIG. 1, the nodes 1 and 4) in this embodiment. As illustrated in FIG. 2, the shared node includes input processing units 11-1 to 11-$n$ ($n$ is an integer equal to or larger than 3), a multiplexing unit 12, a transfer-destination managing unit 13, an ERP control unit 14, a buffer memory 15, a buffer control unit 16, and output processing units 17-1 to 17-$n$. The node 1 includes n ports, which are not illustrated. The ports function as input/output ports. $k$ ($k$=1, 2, . . . , n) port is connected to an input processing unit 11-$k$ and an output processing unit 17-$k$. Among the n ports, at least one is connected to the shared link 10. The node 1 retains a transfer management table 18 in a storing unit, which is not illustrated. The nodes (the nodes 2, 3, 5, and 6) other than the shared nodes are the same as the shared node illustrated in FIG. 2, except that the nodes include ERP control units 14$a$ instead of the ERP control unit 14, n is equal to or larger than 2, and the input processing units 11-1 to 11-$n$ and the output processing units 17-1 to 17-$n$ are not connected to the shared link.

The input processing units 11-1 to 11-$n$ perform processing such as an error check on frames input from the ports. One of the input processing units 11-1 to 11-$n$ performs processing on a frame input from one shared link port (a port connected to the shared link 10). The multiplexing unit 12 multiplexes frames input from the input processing units 11-1 to 11-$n$ (input frames from the ports) and outputs the multiplexed frames to the transfer-destination managing unit 13.

The transfer management table 18 is a table in which information is stored to manage a transfer destination of a frame. For example, a port of an output destination is stored for each kind of information for identifying the flow to a destination and the like. The transfer-destination managing unit 13 searches through the transfer management table 18, determines the transfer destination (a port at the transfer destination) for each of the destinations of an input frame, and notifies the buffer control unit 16 of transfer information concerning the determined transfer destination together with frame data.

The buffer memory 15 is a memory that functions as a queue that stores frames in the order of input for each of the transfer destinations. The buffer control unit 16 performs control for writing and reading frame data to and from the buffer memory 15 and manages the frame data storage state of the buffer memory 15 for each of the transfer destinations. When the frame data is stored in the buffer memory 15, the buffer control unit 16 reads, for each of the ports of the transfer destination, a stored frame from the buffer memory 15 according to the speed of an output destination and outputs the frame to the output processing units 17-1 to 17-$n$ corresponding to the ports of the transfer destination. Note that the output processing units 17-1 to 17-$n$ can generate read requests to enable a frame read from the buffer to be output to the outside within the range of the transfer speed for each of the ports and notify the buffer control unit 16 of the read requests.

The output processing units 17-1 to 17-$n$ are respectively connected to different ports. The output processing units 17-1 to 17-$n$ generate read requests to output a frame read from the buffer within the range of the transfer speed for each of the ports to the outside and notifies the buffer control unit 16 of the read requests.

The ERP control unit 14 carries out termination processing and transfer processing on a CCM frame, an R-APS frame, and the like, which are control frames for ERP and are input from ports for ERP connected in a ring shape. The ERP control unit 14 manages ERP states (presence or absence of a failure, etc.) of the ring networks by using, for example, information in a received frame.

Figure 3:
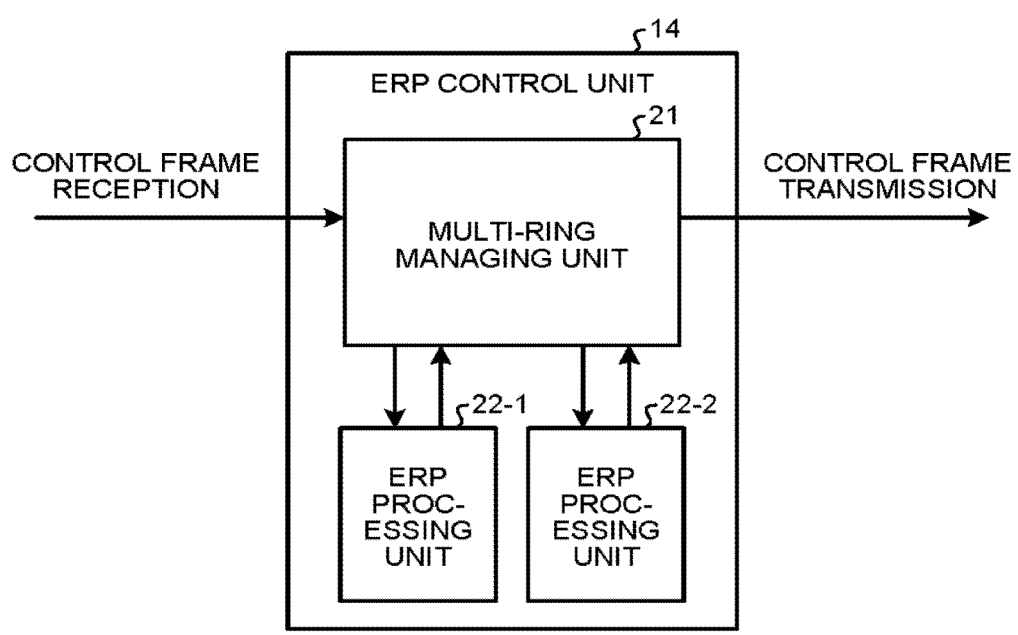
FIG. 3 is a diagram illustrating an example of functional configuration of an ERP control unit of the shared node in the first embodiment.

FIG. 3 is a diagram illustrating an example of a functional configuration of the ERP control unit 14 of the shared node in this embodiment. The ERP control unit 14 includes a multi-ring managing unit 21 and ERP processing units (ring processing units) 22-1 and 22-2. In the example illustrated in FIG. 1, because the number of shared ring networks is two, the ERP control unit 14 includes two ERP processing units. The ERP processing units 22-1 and 22-2 manage a failure state and the like with the ERP for each of the rings. For example, the ERP processing unit 22-1 carries out ERP processing for the ring with the ring ID=1. The ERP processing unit 22-2 carries out ERP processing for the ring with the ring ID=2. The multi-ring managing unit 21 manages a plurality of ERP processing units 22-1 and 22-2 to avoid division of a network due to multiple failures in the multi-ring network. Note that, in the example described here, the number of shared ring networks is two. The number of ERP control units 14 is equivalent to the number of shared ring networks.

Figure 4:
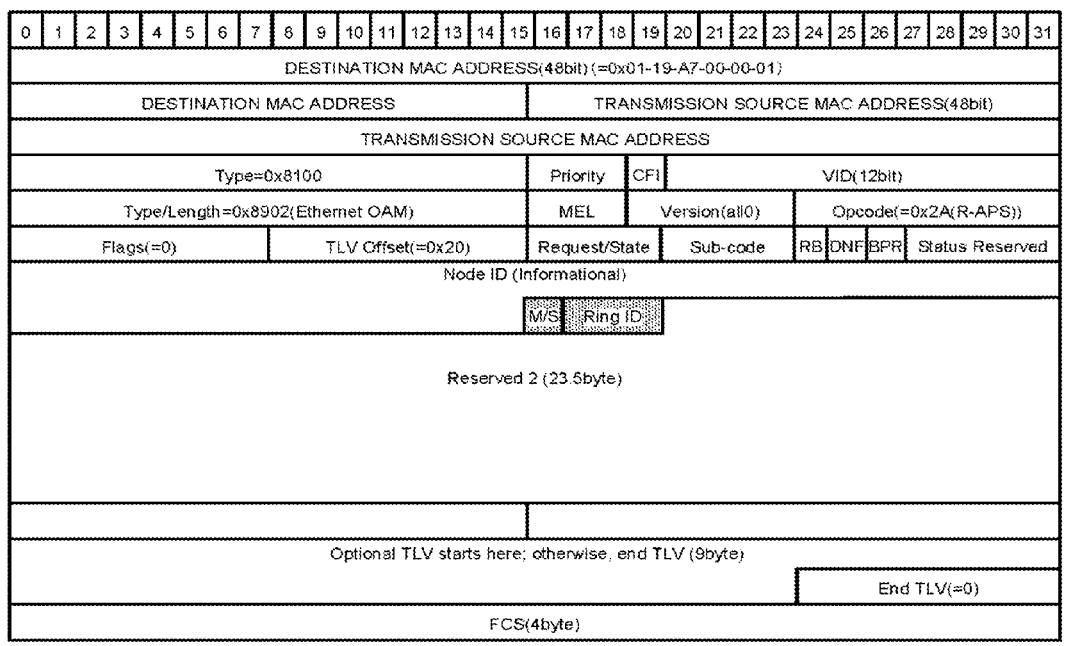
FIG. 4 is a diagram illustrating an example of a format of an R-APS frame that gives notification of failure state in the first embodiment.

FIG. 4 is a diagram illustrating an example of a format of an R-APS frame for providing notification of a failure state in this embodiment. As illustrated in FIG. 4, in the R-APS frame of the ERP specified by ITU-T G.8032, in addition to a node ID of a transmission source and blocked port information in the past, major/sub identification information (M/S in FIG. 4), which is an identification bit for identifying whether a ring is a major ring or a sub ring, and a ring ID (Ring ID in FIG. 4) indicating a ring to which a node at a transmission source belongs are added to a region in Reserved 2. The major/sub identification information indicates whether a ring with the following ring ID is a major ring or a sub ring. The information added in this embodiment is indicated by hatching in FIG. 4. Numbers in parentheses in FIG. 4 are values specified by ITU-T G.8032. The relation between values stored in a field of Request/State and information indicated by the values is as described below.

10111b: SF (Signal Fail)
1110b: Event
0000b: NR (No Request)
0111b: MS (Manual Switch)
1101b: FS (Force Switch)
BPR (Blocked Port Reference) indicates which side port is blocked. DNF (Do Not Flush) indicates whether flush of an FDB (Forwarding DataBase) is possible or prohibited. RB (RPL Blocked) indicates whether a blocked port of the RPL owner is blocked.

In the ERP specified in ITU-T G.8032, in a case where a failure does not occur, the Request/State from the RPL owner is stored as NR. The R-APS frame, in which a value indicating that a blocked port of the RPL owner is blocked is stored in the RB, is transmitted at a fixed cycle. When a node in the ring network detects a failure, the node that detects the failure transmits the R-APS frame in which the Request/State is the SF to ports on both sides. The nodes in the ring network transfer the received R-APS frame to adjacent nodes.

In the example illustrated in FIG. 4, the ring ID is set to have 3 bits. However, a region for a necessary number of bits only has to be able to be secured in accordance with the number of ring networks from which a multi-ring is configured. Note that the information indicating whether a ring is the major ring or the sub ring and the ring ID information are given as a notification by using the R-APS frame. However, a control frame for failure monitoring (a failure monitoring control frame) is not limited to the R-APS frame, and any format thereof can be used. Notification of the switching of the major ring can be given to the ring network, which shares the shared link 10, by using a frame other than the failure monitoring control frame.

Figure 5:
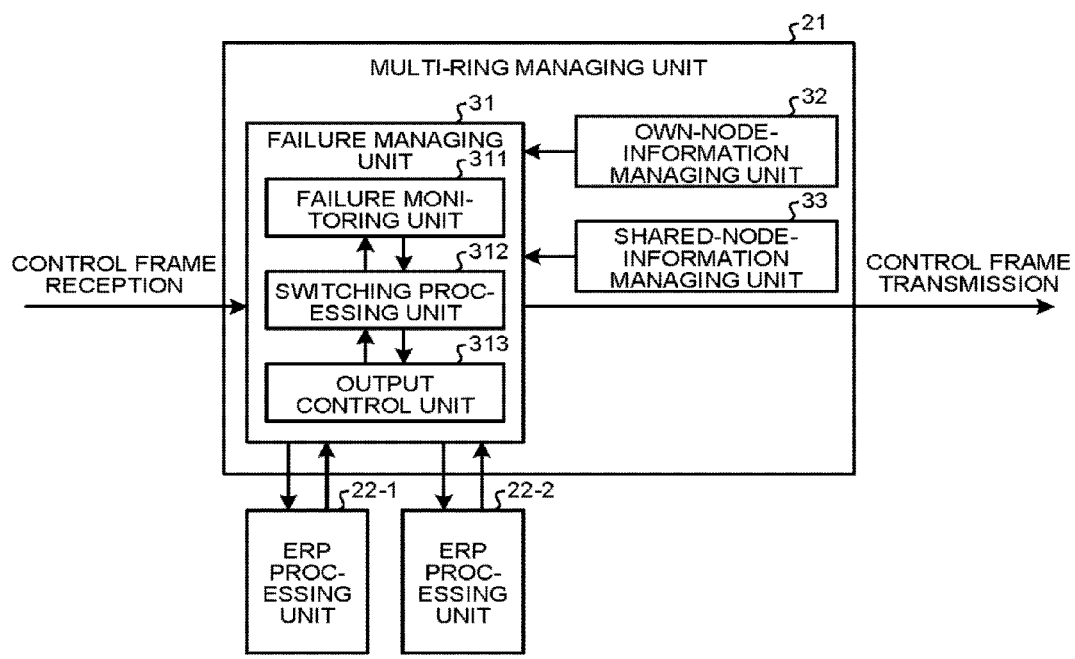
FIG. 5 is a diagram illustrating an example configuration of a multi-ring managing unit in the first embodiment.

Functions of the multi-ring managing unit 21 of the shared node in this embodiment are described here. FIG. 5 is a diagram illustrating an example configuration of the multi-ring managing unit 21 in this embodiment. The multi-ring managing unit 21 includes a failure managing unit 31, an own-node-information managing unit 32, and a shared-node-information managing unit 33. The own-node-information managing unit 32 manages, with respect to a plurality of ring IDs of the ring network shared by the shared node (the own node), own node information, which is information concerning the own node such as a ring ID of the major ring and a port number of a port connected to the major ring, a ring ID of the sub ring and a port number of a port connected to the sub ring, and a port number of a port connected to the shared link. Note that, like the multi-ring network of ITU-_T G.8032, the major ring is a ring that determines a failure in the shared link and the sub ring is a ring that does not determine a failure in the shared link.

The shared-node-information managing unit 33 of the multi-ring managing unit 21 manages shared node information, which is information for identifying a port such as a node ID of a shared node (in the example illustrated in FIG. 1; the node 4 from the viewpoint of the node 1 or the node 1 from the viewpoint of the node 4) that terminates the shared link on the opposite side of the shared link and a port number connected to the shared node; and information concerning the other shared nodes such as a node ID of a shared link intermediate node that is connected to the shared link but does not terminate the shared link. Note that, in the example illustrated in FIG. 1, the shared intermediate node is absent. However, the shared link intermediate node to which the shared link 10 is connected can be provided between the node 1 and the node 4.

The failure managing unit 31 of the multi-ring managing unit 21 includes a failure monitoring unit 311 that discriminates the presence or absence of a failure occurrence ring and the presence or absence of a failure in the shared link from the own node information; the shared node information; information stored in the R-APS frame when a failure occurs in the multi-ring network (a ring ID or a node ID in which a failure is detected); and port information (information concerning ports in which a failure is detected).

The failure managing unit 31 includes a switching processing unit 312 that switches ring IDs corresponding to the sub ring and the major ring when a failure other than a failure in the shared link occurs in the major ring, or when a failure occurs other than in the shared link in the major ring after the failure occurs in the shared link. If failure occurrence probabilities of the links are the same, in the former case (the failure other than the failure in the shared link occurs in the major ring), by changing a ring functioning as the major ring (changing a ring ID set as the major ring), it is possible to reduce the probability of the occurrence of multiple failures including a failure in the shared link in one ring. Note that, when failures in the multi-ring simultaneously occur in the rings, the timing of the receiving the R-APS frame that give notification of the failures is different in the shared nodes at both ends of the shared link. Therefore, it is likely that the recognition of the major ring and the sub ring differs in the shared nodes at both the ends. To avoid this problem, it is also possible that a preferential shared node is determined in advance and a non-preferential shared node conforms to identification information of the major/sub rings from the preferential shared node. The failure managing unit 31 of the multi-ring managing unit 21 includes an output control unit 313 that performs transfer/transmission processing on the R-APS frame according to the failure states of both the rings and the shared link and a result of the switching processing.

Figure 6:
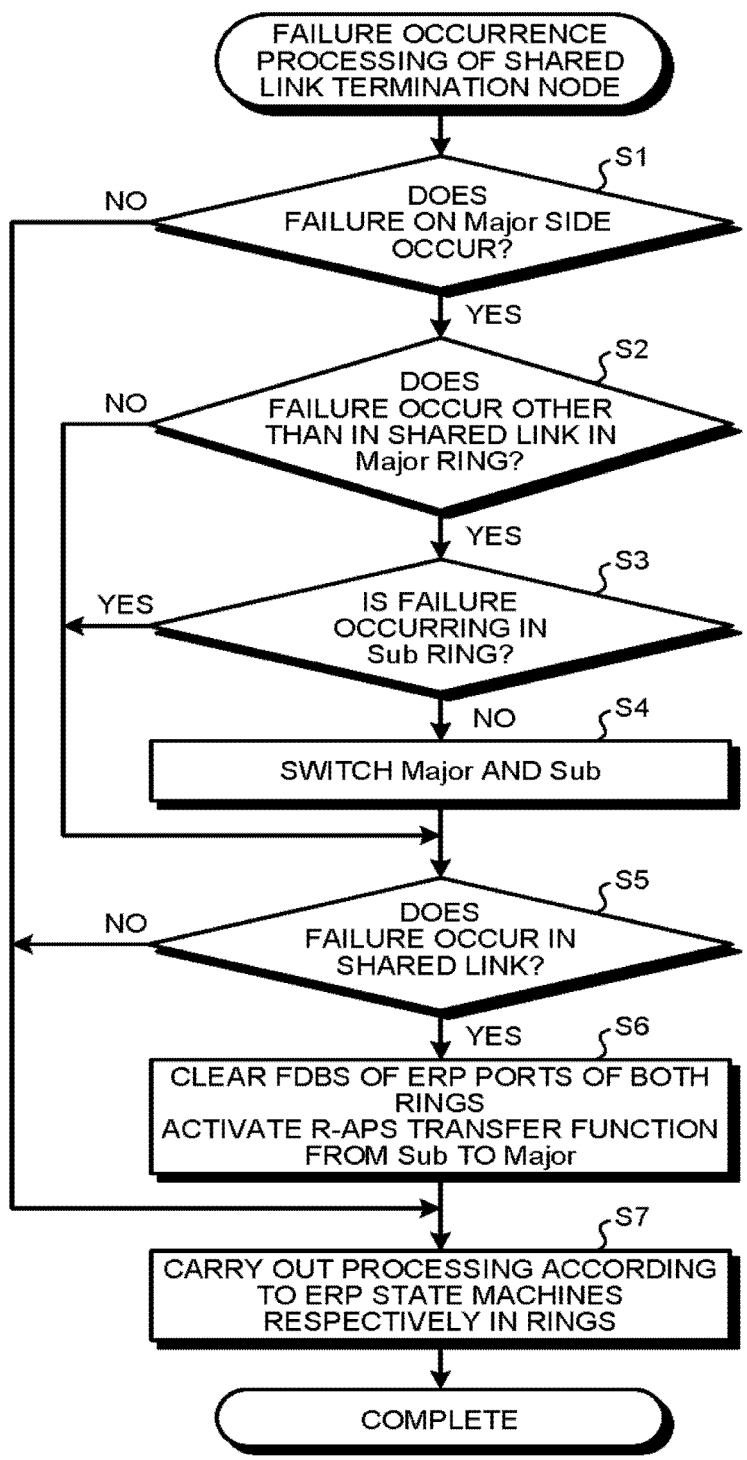
FIG. 6 is a flowchart illustrating an example of a processing procedure performed in the multi-ring managing unit when a failure is detected in the first embodiment.

Processing performed in the multi-ring managing unit 21 of the shared node when a failure is detected anew is described here. FIG. 6 is a flowchart illustrating an example of a processing (failure occurrence processing) procedure performed in the multi-ring managing unit 21 when a failure is detected. Note that, when the shared link intermediate node is present, this failure occurrence processing is carried out by a shared node other than the shared link intermediate node, i.e., by a shared link termination node that terminates the shared link.

As illustrated in FIG. 6, first, the multi-ring managing unit 21 determines whether a failure occurs on a Major (the major ring is hereinafter abbreviated to Major as appropriate) side (step S1). Specifically, the multi-ring managing unit 21 determines, on the basis of the R-APS frame received from a node belonging to the major ring, whether a failure occurs in the major ring.

When a failure occurs on the Major side (Yes at step S1), the multi-ring managing unit 21 determines whether a failure has occurred other than in the shared link (step S2). Whether a failure occurs in the shared link can be determined on the basis of the retained shared node information and the R-APS frame. When a failure occurs other than in the shared link (Yes at step S2), the multi-ring managing unit 21 determines whether a failure is occurring in the sub ring (step S3). The multi-ring managing unit 21 manages the failure occurrence state of the sub ring on the basis of the R-APS frame received from a node belonging to the sub ring. Consequently, it is possible to determine whether a failure is occurring in the sub ring.

When a failure is not occurring in the sub ring (No at step S3), the multi-ring managing unit 21 switches Major and Sub (the sub ring is hereinafter abbreviated to Sub as appropriate) (step S4). That is, in the state illustrated in FIG. 1, the multi-ring managing unit 21 changes the ring with the ring ID=1, which is the major ring, to the sub ring; and changes the ring with the ring ID=2, which is the sub ring, to the major ring.

After step S4, the multi-ring managing unit 21 determines whether a failure occurs in the shared link (step S5). When a failure occurs in the shared link (Yes at step S5), the multi-ring managing unit 21 clears FDBs of ERP ports of both the rings and activates a transfer function that transfers the R-APS frame from the sub ring to the major ring (step S6). By activating the transfer function, a frame that cannot be transferred to the sub ring because of the occurrence of the failure in the shared link can be transferred to the sub ring through the major ring. Note that, in the rings, as usual, in an initial state, a received frame and a port number are registered in the FDBs and transfer is performed using the FDBs.

Subsequently, the multi-ring managing unit 21 carries out processing in accordance with each of the ERP state machines in the rings (step S7) and ends the processing. The processing performed in accordance with the ERP state machines is the same as the processing of known art. Therefore, detailed explanation of the processing is omitted.

When a failure does not occur on the Major side at step S1 (No at step S1), the multi-ring managing unit 21 proceeds to step S7. When a failure does not occur other than in the shared link at step S2 (No at step S2), the multi-ring managing unit 21 proceeds to step S5. When a failure is occurring in the sub ring at step S3 (Yes at step S3), the multi-ring managing unit 21 proceeds to step S5. When a failure does not occur in the shared link at step S5 (No at step S5), the multi-ring managing unit 21 proceeds to step S7.

Figure 7:
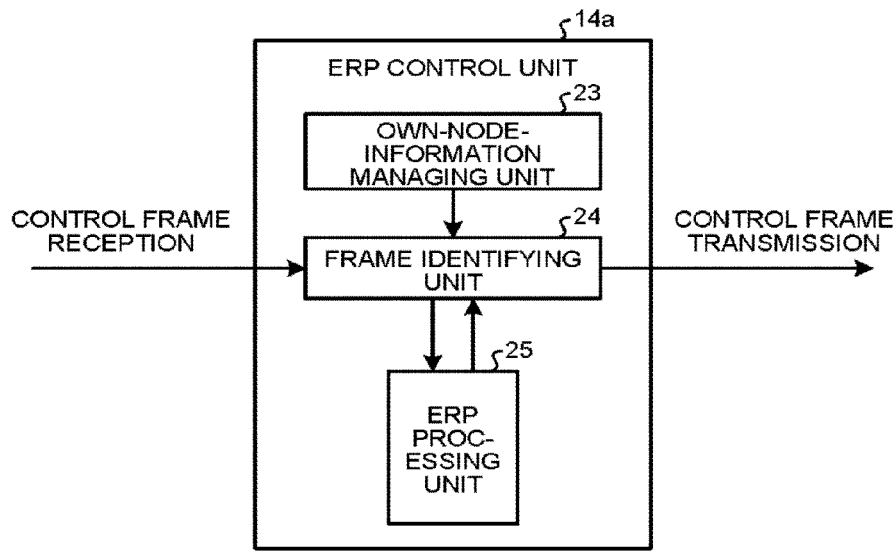
FIG. 7 is a diagram illustrating an example configuration of an ERP control unit included in a node ether than shared nodes in the first embodiment.
Figure 8:
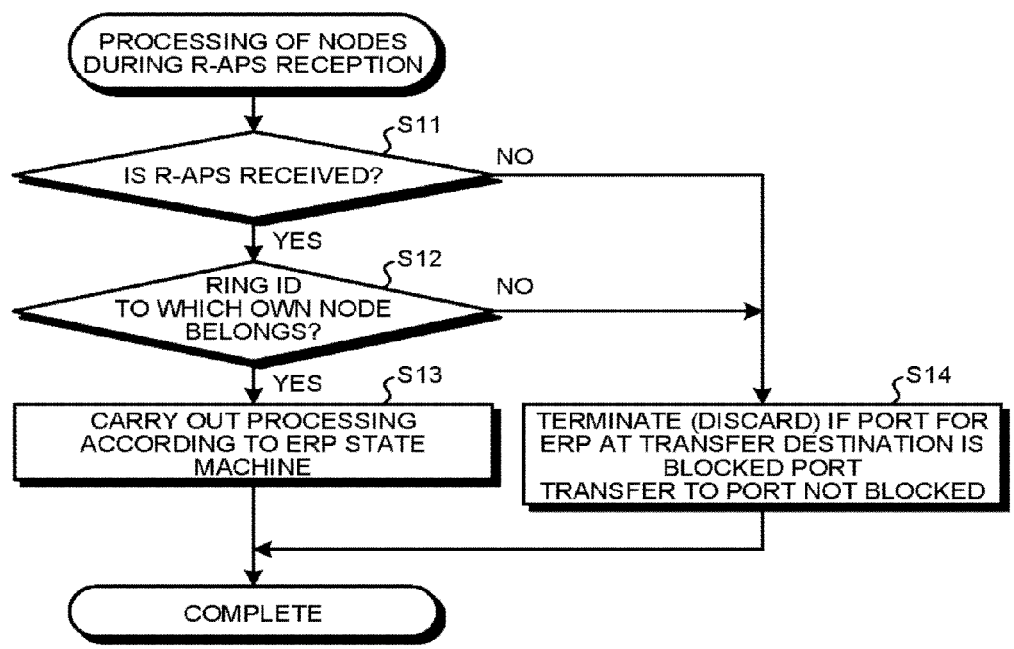
FIG. 8 is a flowchart illustrating an example of a processing procedure when receiving an R-APS frame in the node other than the shared nodes in the first embodiment.

The ERP control unit 14a included in the nodes other than the shared nodes is described here. FIG. 7 is a diagram illustrating an example configuration of the ERP control unit 14a included in the nodes other than the shared nodes in this embodiment. The ERP control unit 14a includes, as illustrated in FIG. 7, an own-node-information managing unit 23, a frame identifying unit 24, and an ERP processing unit 25. FIG. 8 is a flowchart illustrating an example of a processing procedure followed when receiving the R-APS frame in the nodes other than the shared nodes.

The own-node-information managing unit 23 manages information concerning the own node such as a ring ID to which the own node belongs. As illustrated in FIG. 8, frame identifying unit 24 determines whether the R-APS frame is received (step S11). When the R-APS frame is not received (No at step S11), the frame identifying unit 24 proceeds to step S14. When the R-APS frame is received (Yes at step S11), the frame identifying unit 24 determines on the basis of the information managed by the own-node-information managing unit 23 whether a ring ID (Ring ID in FIG. 4) in the received R-APS frame coincides with the ring ID to which the own node belongs (step S12). When the ring ID in the received R-APS frame coincides with the ring ID to which the own node belongs (Yes at step S12), the frame identifying unit 24 outputs the R-APS frame matching the ring ID to which the own node belongs to the ERP processing unit 25. The ERP processing unit 25 carries out normal ERP processing on the basis of the input R-APS frame (step S13). At this point, whether the ring network to which the own node belongs is the major ring or the sub ring is changed on the basis of the major/sub identification information in the R-APS frame, then, this change is to be incorporated.

For example, when the own node is an RPL owner of a ring network initially set as the sub ring, in this state, even if a failure occurs in the shared link, unblocking of a blocked port of the own node is not performed. Thereafter, when the R-APS frame indicating that the ring network to which the own node belongs is the major ring is received, thereafter, unblocking of the blocked port of the own node is performed when the R-APS frame indicating the detection of a failure in the shared link is received.

When the ring ID of the received R-APS frame does not coincide with the ring ID to which the own node belongs (No at step S12), the frame identifying unit 24 does not output the R-APS frame to the ERP processing unit 25. When the other ERP port (not on the receiving port side) (a port connected to a link from which the ERP ring is configured) at a transfer destination is a blocked port, the frame identifying unit 24 terminates (discards) the R-APS frame. When the ERP port is not the blocked port, the frame identifying unit 24 transfers the R-APS frame to the other port (step S14).

The operations of the nodes in this embodiment are described here. First, an operation performed when a failure does not occur in the multi-ring network is described. In the multi-ring network, the ring with the ring ID=1 or the ring ID=2 is set as the major ring and the other is set as the sub ring in advance. As illustrated in FIG. 1, the ring with the ring ID=1 is set as the major ring and the ring with the ring ID=2 is set as the sub ring.

As illustrated in FIG. 1, each of the ports of the node 2 and the node 6, which are the RPL owners of the rings, is blocked. An R-APS (NR, RB) frame meaning no failure is detected (the R-APS frame in which the Request/State is NR and a value indicating that the blocked ports of the RPL owners are blocked is stored in RB) is transmitted from the RPL owners. After carrying out, on the R-APS frame input from ports connected to the rings, ERP processing for a relevant ring ID (a ring ID stored in the R-APS frame), the nodes 1 and 4, which are the shared nodes, transfer the frame to the ports connected to the shared link. After carrying out, on the R-APS frame received from the shared link, ERP processing for the relevant ring ID in the same manner, the nodes 1 and 4 transfer the R-APS frame to ports to which a ring at a transfer destination is connected.

Figure 9:
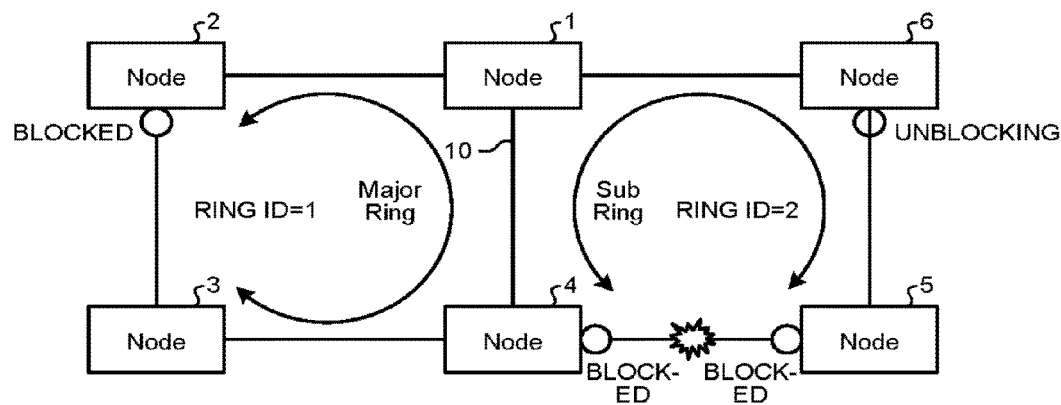
FIG. 9 is a diagram illustrating a state in which a failure occurs in a ring with a ring ID=2.

An operation performed when a failure occurs on the sub ring in the multi-ring network is described here. FIG. 9 is a diagram illustrating a state in which a failure occurs in the ring with the ring ID=2. The example illustrated in FIG. 9 indicates that the ring with the ring ID=1 is set as the major ring before a failure occurs; and, in this state, a failure occurs between the node 4 and the node 5 of the ring with the ring ID=2, which is the sub ring. In this case, because a failure does not occur on the major ring side, one port of the node 2, which is the RPL owner of the ring, is blocked and the R-APS(NR, RB) frame indicating no failure detection is transmitted from the RPL owner. Further, because a failure occurs between the node 4 and the node 5 on the sub ring side, failure detection ports are blocked. An R-APS(SF) frame (the R-APS frame in which the Request/State is SF) is transmitted from the nodes 4 and 5. The blocked port of the node 6, which is the RPL owner, is unblocked. After carrying out, on the R-APS frame input from the ports connected to the rings, ERP processing for a ring corresponding to a ring ID in the frame, the nodes 1 and 4, which are the shared nodes, transfer the frame to the ports to which the shared link 10 is connected. After carrying out, on the R-APS frame received from the shared link 10, ERP processing with the ring ID of the frame in the same manner, the nodes 1 and 4 transfer the R-APS frame to ports connected to a ring with the ring ID.

As described above, when a failure does not occur and when a does failure occur in the sub ring, operations are performed in the rings in the same manner as the ERP of a normal single ring except that a distinction is made between ring IDs.

Figure 10:
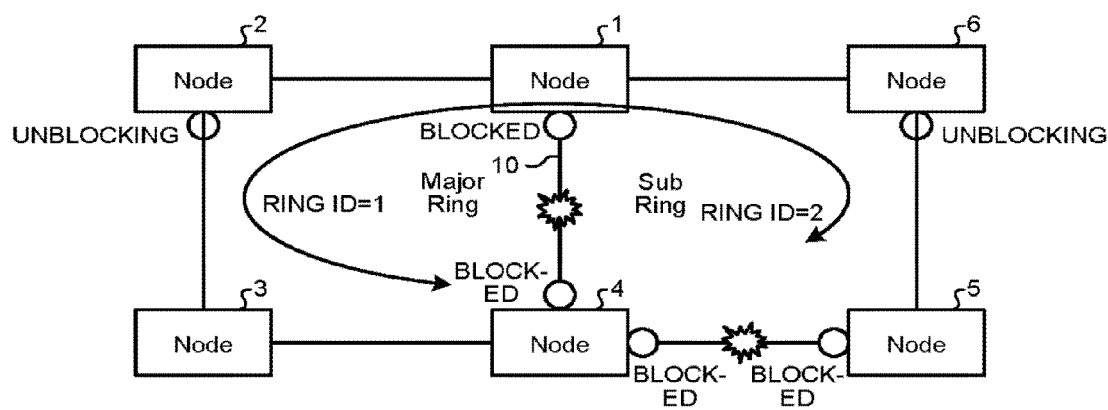
FIG. 10 is a diagram illustrating a state in which multiple failures occur in the multi-ring network.

FIG. 10 is a diagram illustrating a state in which multiple failures occur in the multi-ring network. In the example illustrated in FIG. 10, the ring with the ring ID=1 is set as the major ring before a failure occurs. In this state, failures occur in the shared link 10 and between the node 4 and the node 5. As in the example illustrated in FIG. 10, when a failure occurs in the shared link 10, ports of the nodes 1 and 4, which are the shared nodes, on the shared link 10 side are blocked. Concerning the shared link 10, a failure is detected on the major ring side. One port of the node 2, which is the RPL owner of the major ring, is unblocked. When the shared nodes receive the R-APS frame on the sub ring side, because the failure occurs in the shared link 10, the R-APS frame is transferred to the major ring side. Communication among the nodes is possible even during such multiple failures.

Figure 11:
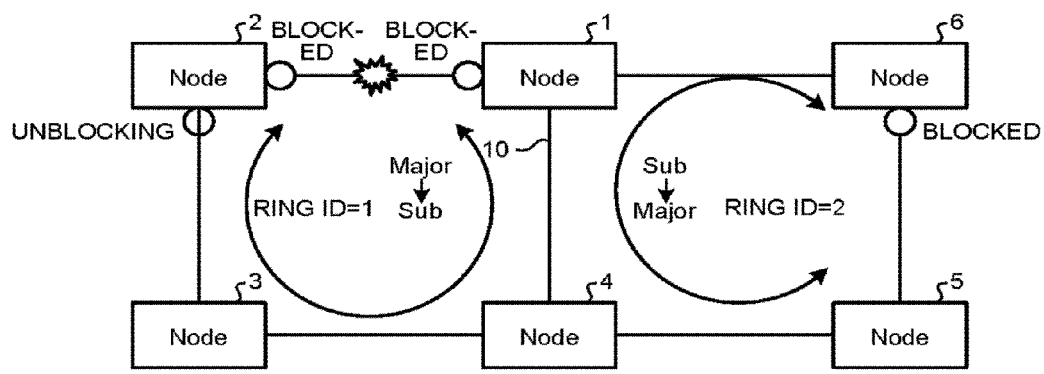
FIG. 11 is a diagram illustrating a state in which a failure occurs in a major ring.

FIG. 11 is a diagram illustrating a state in which a failure occurs in the major ring. In an example illustrated in FIG. 11, the ring with the ring ID=1 is set as the major ring before a failure occurs. In this state, a failure occurs between the node 2 and the node 1 in the major ring. As illustrated in FIG. 11, because a failure does not occur in the ring with the ring ID=2, which is the sub ring, one port of the node 6 which is the RPL owner of the sub ring is blocked. The R-APS(NR, RB) frame meaning no failure detection is transmitted. Further, in the ring with the ring ID=1, which is the major ring, because a failure occurs between the node 2 and the node 1, failure detection ports are blocked. The R-APS(SF) frame is transmitted from the nodes 1 and 2. A default blocked port of the node 2, which is the RPL owner, is unblocked. The nodes 1 and 4, which are the shared nodes, determine according to the R-APS frame input from the ports connected to the rings or according to failure detection of the own nodes that a failure occurs on the major ring side. The nodes 1 and 4 switch the major and the sub according to the flow of FIG. 6. The nodes 1 and 4 carry out, on the received R-APS frame, ERP processing for a ring corresponding to a ring ID of the frame (e.g., if the ring is the ring with the ring ID=1, the ERP processing unit 22-1 carries out ERP processing). The nodes 1 and 4 give information for identifying a new major ring or a new sub ring (after the switching) (major/sub identification information) to the R-APS frame and transfer the R-APS frame to the ports to which the shared link 10 is connected. When major/sub identification information in the R-APS frame received from the shared link 10 is the information before the switching, the nodes 1 and 4 update the major/sub identification information to values after the switching. After carrying out ERP processing for a ring corresponding to the ring ID of the frame, the nodes 1 and 4 transfer the R-APS frame to ports connected to the ring with the ring ID.

Figure 12:
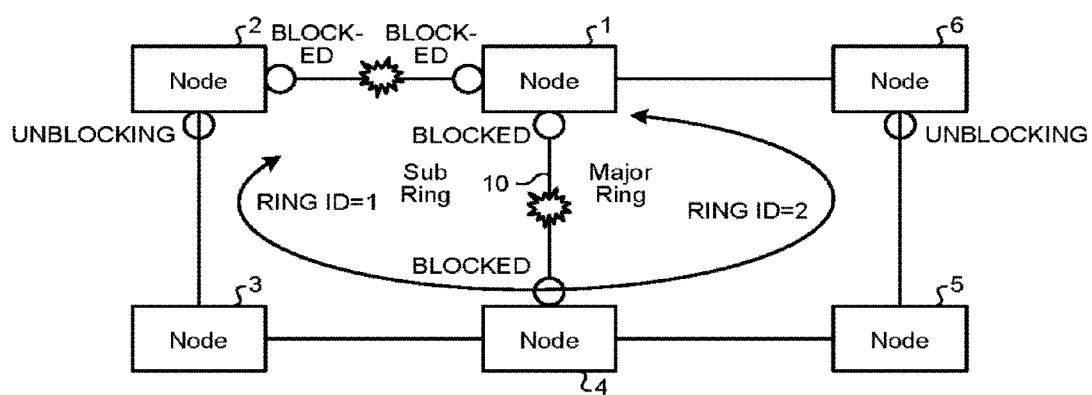
FIG. 12 is a diagram illustrating a state in which a failure in the shared link occurs after the major ring and a sub ring are switched.

FIG. 12 is a diagram illustrating a state in which a failure occurs in the shared link 10 after the major ring and the sub ring are switched. In an example illustrated in FIG. 12, after a failure occurs in the major ring and the major ring and the sub ring are switched as illustrated in FIG. 11, a failure further occurs in the shared link 10. As illustrated in FIG. 12, when a failure occurs in the shared link 10, the ports of the nodes 1 and 4, which are the shared nodes, on the shared link 10 side are blocked. The failure in the shared link 10 is detected by the major ring. Therefore, one port of the node 6, which is the RPL owner of the major ring after the switching, is unblocked. When the R-APS frame of the ring ID=1, which is the sub ring in the shared node, is received, because the failure occurs in the shared link 10, the output control unit 313 transfers the R-APS frame to the ring ID=2 side, which is the major ring. Communication among the nodes is possible even during such multiple failures.

Figure 13:
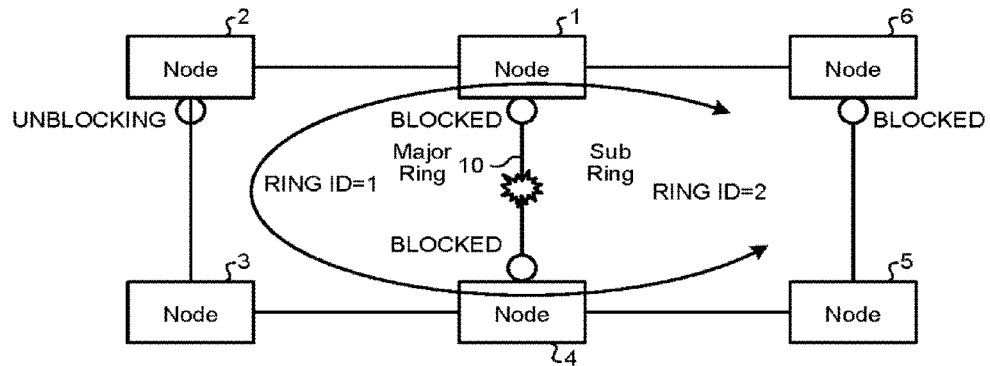
FIG. 13 is a diagram illustrating a state in which a failure occurs in the shared link in a state without a failure.

FIG. 13 is a diagram illustrating a state in which a failure occurs in the shared link 10 in a state without a failure. In the example illustrated in FIG. 13, the ring with the ring ID=1 is set as the major ring before a failure occurs. A failure occurs in the shared link 10 in this state. As illustrated in FIG. 13, a failure does not occur on the ring side with the ring ID=2, which is the sub ring. Therefore, one port of the node 6, which is the RPL owner of the ring, is blocked. The R-APS(NR, RB) meaning no failure detection is transmitted. Further, on the ring side with the ring ID=1, which is the major ring, a failure occurs between the nodes 1 and 4, which are the shared nodes. Failure detection ports are blocked. The R-APS(SF) frame is transmitted from the nodes 1 and 4. The default blocked port of the node 2, which is the RPL owner, is unblocked. According to the failure detection in the shared link 10, when the R-APS frame is received from the ring side with the ring ID=2, which is the sub ring, according to the flow of FIG. 6, the nodes 1 and 4, which are the shared nodes, carry out ERP processing and transfer the frame to the ring side with the ring ID=1, which is the major ring.

After the failure occurs in the shared link 10, when a failure occurs in the sub ring and multiple failures occur in the multi-ring network, the state is the same as the state illustrated in FIG. 10. Communication among the nodes is possible even during such multiple failures.

Figure 14:
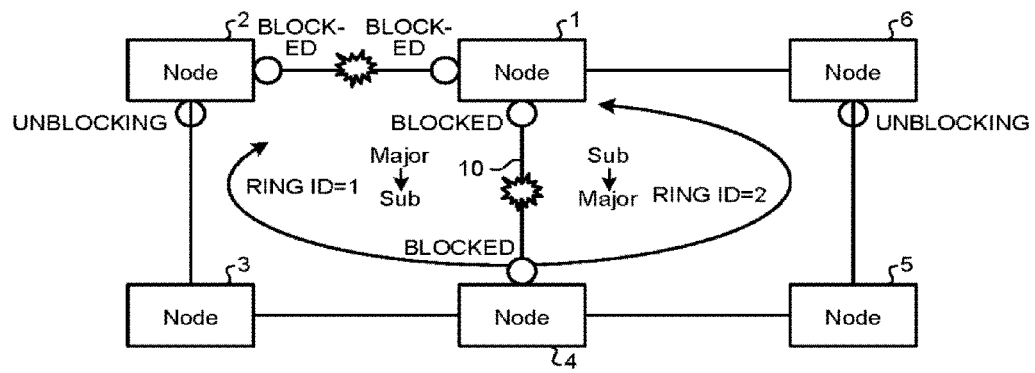
FIG. 14 is a diagram illustrating a state in which a failure occurs in the major ring after a failure occurs in the shared link.

FIG. 14 is a diagram illustrating a state in which a failure occurs in the major ring after the failure occurs in the shared link 10. In the example illustrated in FIG. 14, after the failure occurs in the shared link 10 as illustrated in FIG. 13, a failure occurs between the node 2 and the node 1 in the major ring. The shared link performs failure processing in the major ring. However, when a failure occurs anew between the node 2 and the node 1 in a place other than the shared link 10 of the major ring, ports in which the failure between the nodes 1 and 2 is detected are blocked. The R-APS(SF) frame is transmitted from the nodes 1 and 2 to the major ring. At this point, the nodes 1 and 4, which are the shared nodes, determine according to the R-APS frame input from ports connected to the ring with the ring ID=1 or according to failure detection of the own nodes that multiple failures in the major ring are occurring. According to the flow illustrated in FIG. 6, the nodes 1 and 4 switch the major ring and the sub ring. Consequently, the ring with the ring ID=2 becomes the major ring. The R-APS(SF) frame for failure detection in the shared link is output from the nodes 1 and 4, which are the shared nodes, to the ports on the ring side with the ring ID=2. The node 6, which is the RPL owner on the ring side with the ring ID=2, is unblocked. In the nodes 1 and 4, because the failure occurs in the shared link 10, the R-APS frame received from the ports on the ring side with the ring ID=1 is transferred to the ring side with the ring ID=2. Communication among the nodes is possible even during multiple failures described above.

As described above, in this embodiment, when the shared nodes terminating the shared link detect a failure other than a failure in the shared link of the major ring and a failure is not occurring in the sub ring, the major ring and the sub ring are instructed to be switched. Therefore, when multiple failures including a failure in the shared ring occur in the major ring, a bypass can be set and communication can be continued. By instructing this switching using a field of Reserved 2 in the R-APS frame, it is possible to obtain the effects described above with fewer circuits and a reduced amount of processing.

Second Embodiment

Figure 15:
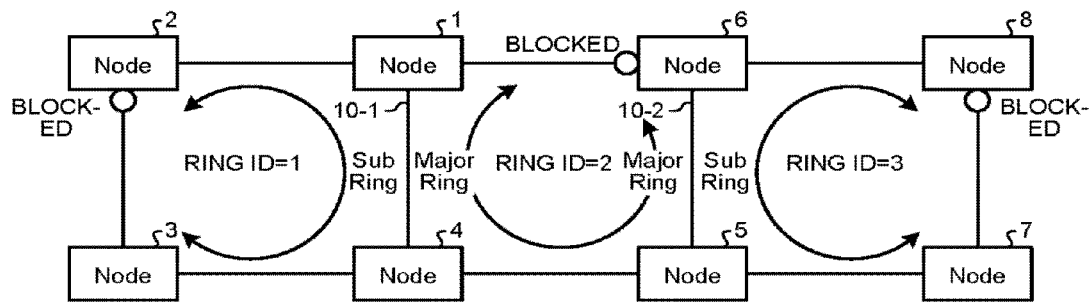
FIG. 15 is a diagram illustrating an example configuration of a multi-ring network in a second embodiment.

FIG. 15 is a diagram illustrating an example configuration of a multi-ring network in a second embodiment of the present invention. As illustrated in FIG. 15, the multi-ring network in this embodiment includes a ring with a ring ID=1, a ring with a ring ID=2, and a ring with a ring ID=3. In the multi-ring network illustrated in FIG. 15, shared links are present in two places: shared link 10-1 and a shared link 10-2. Concerning the shared link 10-1, the ring with the ring ID=2 is set as a major ring and the ring with the ring ID=1 is set as a sub ring in advance. Concerning the shared link 10-2, the ring with the ring ID=2 is set as the major ring and the ring with the ring ID=3 is set as the sub ring.

The ring with the ring ID=1 includes the nodes 1, 2, 3, and 4. The ring with the ring ID=2 includes the nodes 1, 4, 5, and 6. The ring with the ring ID=3 includes the nodes 5, 6, 7, and 8. The three rings are connected to each other via the nodes 1 and 4, which are the shared nodes shared by the rings with Ring IDs=1 and 2 and the nodes 5 and 6, which are shared nodes shared by the rings with Ring IDs=2 and 3. Note that, in FIG. 15, the multi-ring network including the eight nodes including the four shared nodes is illustrated. However, the number of nodes connected to the rings is not limited to this. In FIG. 15, a structure in which the three ring networks are connected is illustrated. However, this embodiment is also applicable to a structure in which four or more ring networks are connected. Further, this embodiment is also applicable when three or more shared nodes are connected to the shared link.

Each of the nodes 1 to 8 includes a plurality of ports. The ports of the nodes adjacent to one another are connected to form rings and thus the multi-ring network is configured. In the multi-ring network illustrated in FIG. 15, the nodes 1, 4, 5, and 6, which are shared nodes, include three or more ports. The other nodes 2, 3, 7, and 8 include two or more ports.

The nodes 2, 6, and 8 operate as nodes of an RPL owner of ERP. The other nodes 1, 3, 4, 5, and 7 operate as nodes of a non-RPL owner of the ERP. Concerning setting of the RPL owner and setting and unblocking of a blocked port, operations conforming to the ERP standard in the related art are performed.

Like the rings with the ring IDs=1 and 2 in the first embodiment, the rings with the ring IDs=1, 2, and 3 operate one specific link in the ring networks in a logically disconnected state in order to prevent a loop frame from occurring in the rings. In the ring network illustrated in FIG. 15, a port of the node 2 on the node 3 side, a port of the node 6 on the node 1 side, and a port of the node 8 on the node 7 side are set as BPs.

The nodes 1, 4, 5, and 6 in this embodiment have a configuration the same as the configuration of the shared node (the shared link termination node) in the first embodiment, as illustrated in FIGS. 2 and 3. The configuration of the nodes (the nodes 2, 3, 7, and 8) other than the shared node in this embodiment is the same as the configuration of the nodes other than the shared nodes in the first embodiment. Functions of the multi-ring managing units 21 of the nodes 1, 4, 5, and 6, which are shared link termination nodes, are the same as the functions in the first embodiment and are the same as those illustrated in FIG. 5. In the multi-ring managing unit 21 of the shared node, the processing flow performed when a failure is detected anew and the processing flow of nodes other than the shared nodes are the same as the processing flows in the first embodiment. The format of the R-APS frame used in this embodiment is the same as the format in the first embodiment. Differences from the first embodiment are described below.

First, the operation performed when a failure does not occur in the multi-ring network is described. As illustrated in FIG. 15, each of ports respectively belonging to the node 2, the node 6, and the node 8, which are RPL owners of the rings, is blocked. An R-APS(NR, RB) frame meaning no failure detection is transmitted from the RPL owners. After carrying out, on the R-APS frame input from ports connected to the rings, ERP processing for a ring ID stored in the R-APS frame, the shared nodes of the nodes 1, 4, 5, and 6 transfer the frame to ports to which the shared link (the shared link 10-1 or 10-2) is connected. After carrying out, on the R-APS frame received from the shared links 10-1 and 10-2, ERP processing for the ring ID stored in the R-APS frame in the same manner, the shared nodes transfer the R-APS frame to ports to which a ring at a transfer destination is connected.

Figure 16:
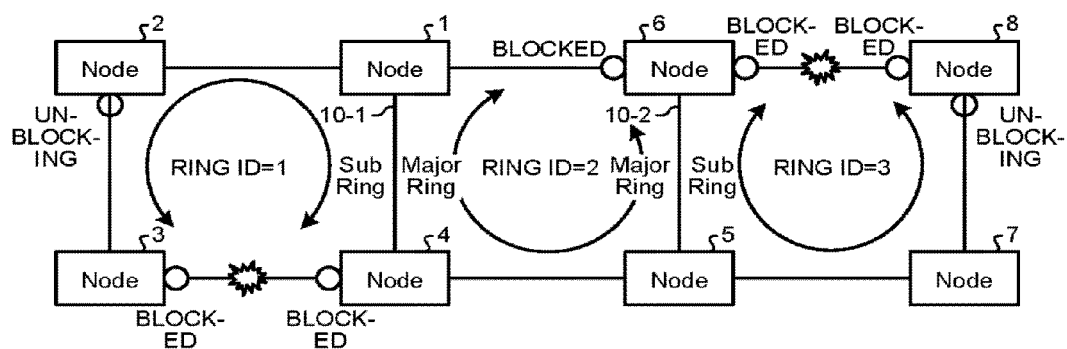
FIG. 16 is a diagram illustrating a state in which a failure occurs in a sub ring.

The operation performed when a failure occurs on the sub rings in the multi-ring network is described here. FIG. 16 is a diagram illustrating a state in which a failure occurs in the sub rings. In an example illustrated in FIG. 16, failures occur between the node 3 and the node 4 with the ring ID=1, which is the sub ring for the shared link 10-1; and between the node 6 and the node 8 with the ring ID=3, which is the sub ring with respect to the shared link 10-2. As illustrated in FIG. 16, a failure does not occur on the major ring side. Therefore, one port of the node, which is the RPL owner of the ring is blocked. The R-APS(NR, RB) frame meaning no failure detection is transmitted from the RPL owners. Further, on the sub ring side with respect to the shared link 10-1, a failure occurs between the node 3 and the node 4. Therefore, failure detection ports are blocked, and an R-APS(SF) frame is transmitted from the nodes 3 and 4. A blocked port of the node 2, which is the RPL owner, is unblocked. Similarly, on the sub ring side with respect to the shared link 10-2, a failure occurs between the node 6 and the node 8. Therefore, failure detection ports are blocked. The R-APS(SF) frame is transmitted from the nodes 6 and 8. The blocked port of the node 8, which is the RPL owner, is unblocked.

After carrying out, on the R-APS frame input from ports connected to the rings, ERP processing for a ring with a ring ID stored in the R-APS frame, the shared nodes of the nodes 1, 4, 5, and 6 transfer or generate frames and transmit the frames to ports to which the shared links 10-1 and 10-2 are connected. After carrying out, on the R-APS frame received from the shared links 10-1 and 10-2, ERP processing for the ring with the ring ID stored in the R-APS frame in the same manner, the shared nodes transfer the R-APS frame to the port to which the ring with the ring ID is connected.

As described above, in cases where a failure does not occur and where a failure occurs in the sub ring, operations are performed in the rings in the same manner as the ERP of a normal single ring, except that a distinction is made between ring IDs.

Figure 17:
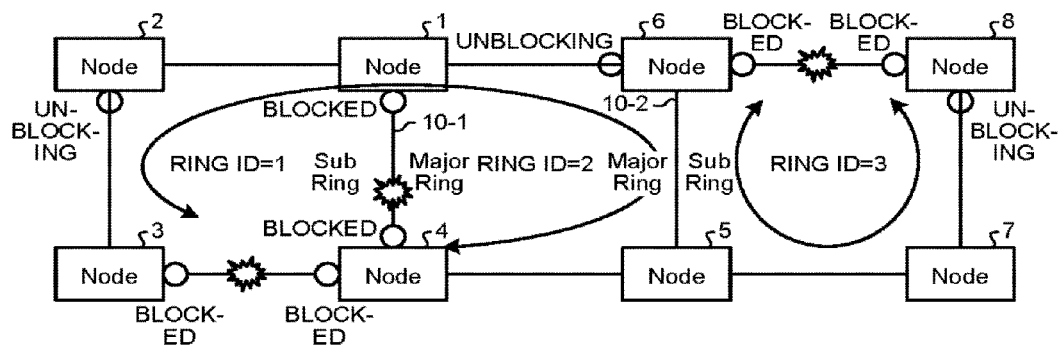
FIG. 17 is a diagram illustrating a state in which a failure occurs in a shared link after the failure occurs in the sub ring.

FIG. 17 is a diagram illustrating a state in which a failure occurs in the shared link after a failure occurs in the sub ring. In the example illustrated in FIG. 17, after the failure occurs as illustrated in FIG. 16, a failure further occurs in the shared link 10-1. As illustrated in FIG. 17, when a failure occurs in the shared link 10-1, ports of the nodes 1 and 4, which are the shared nodes of the shared link 10-1, on the shared link 10-1 side are blocked. The shared link 10-1 detects a failure in the major ring. Therefore, one port of the node 6, which is the RPL owner of the ring ID=2, which is the major ring, is unblocked. When the R-APS frame with the ring ID=1 on the sub ring side is received, because the failure occurs in the shared link 10-1, the shared nodes transfer the R-APS frame to ports on the ring ID=2 side on the major ring side. Communication among the nodes is possible even during such multiple failures.

Figure 18:
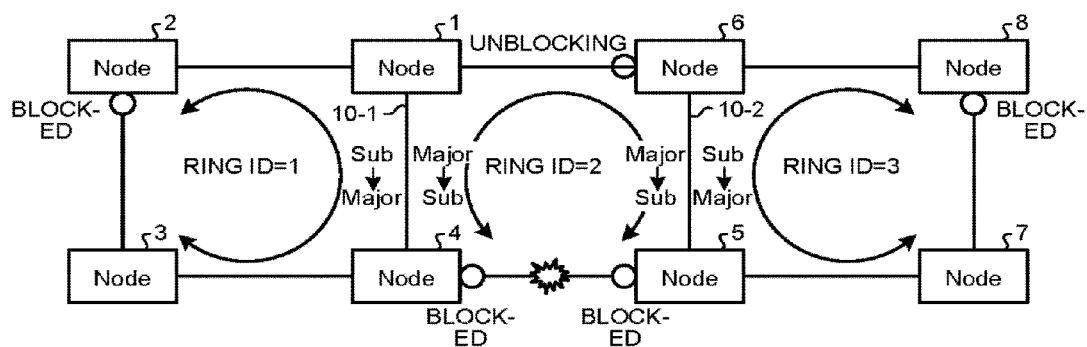
FIG. 18 is a diagram illustrating a state in which a failure occurs in a major ring.

FIG. 18 is a diagram illustrating a state in which a failure occurs in the major ring. In an example illustrated in FIG. 18, when the setting illustrated in FIG. 15 is performed before a failure occurs, a failure occurs between the node 4 and the node 5 in the ring with the ring ID=2. As illustrated in FIG. 18, a failure does not occur in the rings with the ring IDs=1 and 3, which are the sub rings. Therefore, one port of the node 2 and one port of the node 8, which are the RPL owners of the rings, are blocked. The R-APS(NR, RB) meaning no failure detection is transmitted. Further, in the ring with the ring ID=2, which is the major ring, a failure occurs between the node 4 and the node 5. Therefore, failure detection ports are blocked. The R-APS(SF) frame is transmitted from the nodes 4 and 5. The default blocked port of the node 6, which is the RPL owner, is unblocked. The shared nodes of the nodes 1, 4, 5, and 6 determine according to the R-APS frame input from the ports connected to the rings or according to failure detection that a failure occurs on the major ring side of the shared links 10-1 and 10-2. The nodes 1, 4, 5, and 6 switch the major and the sub according to the flow of FIG. 6. The nodes 1, 4, 5, and 6 carry out ERP processing for a ring ID stored in the received R-APS frame. The nodes 1, 4, 5, and 6 give major-sub identification information after the switching to the R-APS frame, and the R-APS frame is transferred to the ports to which the shared links are connected. When major/sub identification information in the frame received from the shared links 10-1 and 10-2 is the information before the switching, the nodes 1, 4, 5, and 6 update the major/sub identification information to values after the switching. After carrying out ERP processing for a ring corresponding to the ring ID of the frame, the nodes 1, 4, 5, and 6 transfer the R-APS frame to ports connected to the ring with the ring ID.

Figure 19:
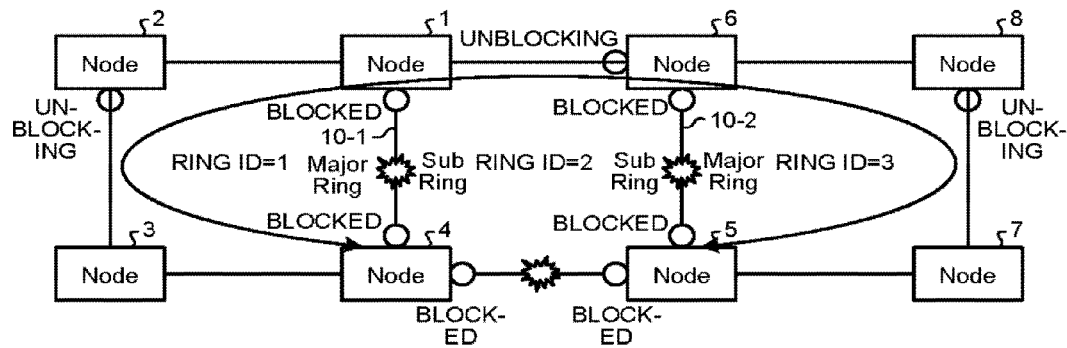
FIG. 19 is a diagram illustrating a state in which failures in two shared links occur after the major ring and the sub ring are switched.

FIG. 19 is a diagram illustrating a state in which failures occur in the shared links 10-1 and 10-2 after the major ring and the sub ring are switched. In an example illustrated in FIG. 19, after the failure illustrated in FIG. 18 occurs and the major ring and the sub ring are switched, failures occur in the shared links 10-1 and 10-2. As illustrated in FIG. 19, when failures occur in the shared links 10-2 and 10-2, the ports of the nodes 1, 4, 5, and 6, which are the shared nodes, on the shared links 10-1 and 10-2 side are all blocked. One port of the node 2 and one port of the node 8, which are the RPL owners of the major ring after the switching, are unblocked. When the R-APS frame of the ring ID=2, which is the sub ring, is received in the shared nodes, because the failures occur in the shared links, the R-APS frame is transferred to the ring side with the ring IDs=1 and 3, which is the major ring. Communication among the nodes is possible even during such multiple failures. Note that, in an example illustrated in FIG. 19, failures occur in both of the shared links 10-1 and 10-2. However, when a failure occurs in one of the shared links 10-1 and 10-2, the operation described above is also carried out in the major ring of the shared link 10-1 in which the failure occurs.

Figure 20:
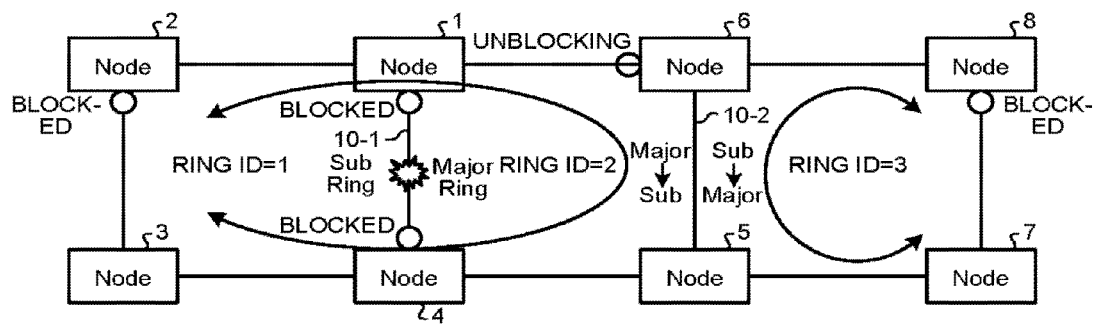
FIG. 20 is a diagram illustrating a state in which a failure occurs in one shared link in a state without a failure.

FIG. 20 is a diagram illustrating a state in which a failure occurs in the shared link 10-1 in a state without a failure. In an example illustrated in FIG. 20, a failure does not occur on the ring side with the ring ID=1, which is the sub ring. Therefore, one port of the node 2, which is the RPL owner of the ring, is blocked. The R-APS(NR, RB) meaning no failure detection is transmitted. Further, on the ring side with the ring ID=2, which is the major ring, a failure occurs between the node 1 and the node 4 of the shared link 10-1. Therefore, failure detection ports are blocked. The R-APS (SF) frame is transmitted from the nodes 1 and 4. The default blocked port of the node 6, which is the RPL owner, is unblocked. According to the failure detection in the shared link 10-1, when the R-APS frame is received from the ring side with the ring ID=1, which is the sub ring, according to the flow of FIG. 6, the nodes 1 and 4, which are the shared nodes, carry out ERP processing and transfer the frame to the ring side with the ring ID=2, which is the major ring. According to failure occurrence in the major ring other than the shared link 10-2, the shared nodes of the nodes 5 and 6 connected to the shared link 10-2 switch the major and the sub according to the flow of FIG. 6. The shared nodes carry out, on the received R-APS frame, ERP processing for a ring corresponding to the ring ID of the frame, give major/sub identification information after the switching to the R-APS frame, and transfer the R-APS frame to ports to which the shared link 10-2 is connected.

Figure 21:
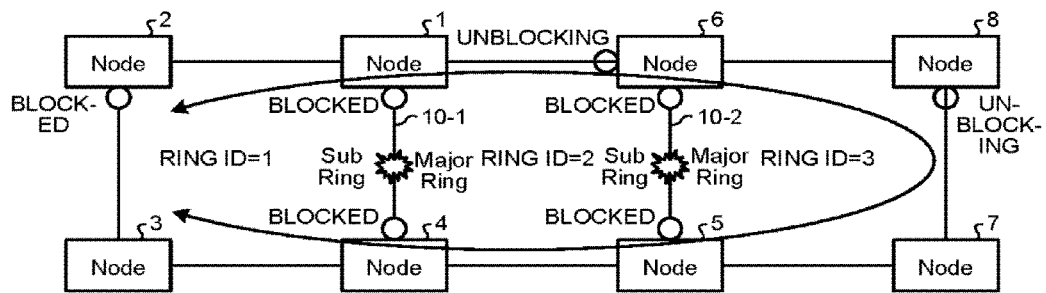
FIG. 21 is a diagram illustrating a state in which a failure occurs in another shared link after a failure occurs in one shared link.

FIG. 21 is a diagram illustrating a state in which a failure occurs in the shared link 10-2 after a failure occurs in the shared link 10-1. In the example illustrated in FIG. 21, after the failure occurs in the shared link 10-1, as illustrated in FIG. 20, a failure further occurs in the shared link 10-2. As illustrated in FIG. 21, after a failure occurs in the shared link 10-1 and when a failure further occurs in the shared link 10-2, in the ring with the ring ID=3, which is the major ring of the shared link 10-2, a failure occurs between the nodes 5 and 6 of the shared link 10-2. Therefore, the failure detection ports are blocked. The R-APS(SF) frame is transmitted from the nodes 5 and 6. A default blocked port of the node 8, which is the RPL owner, is unblocked. According to the failure detection in the shared link 10-2, according to the flow of FIG. 6, when the R-APS frame is received from the ring side with the ring ID=2, which is the sub ring, the nodes 5 and 6, which are the shared nodes, carry out ERP processing and transfer the R-APS frame to the ring side with the ring ID=3, which is the major ring.

Figure 22:
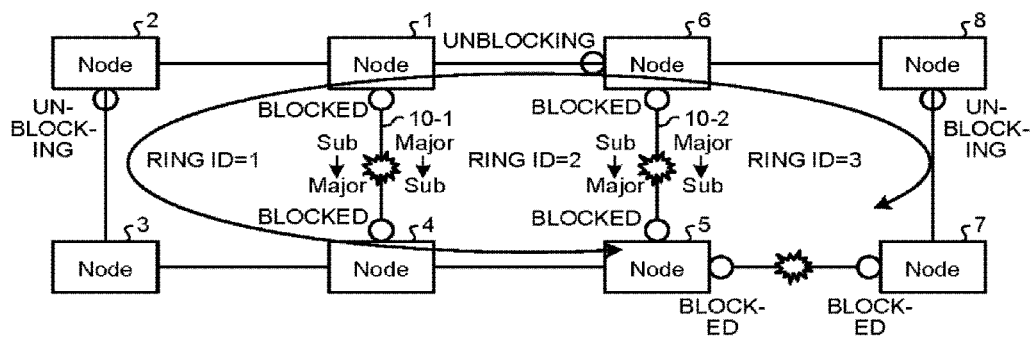
FIG. 22 is a diagram illustrating a state in which a failure occurs in the major ring after failures occur in the two shared links.

FIG. 22 is a diagram illustrating a state in which, after failures occur in the two shared links 10-1 and 10-2, a failure occurs in the major ring with respect to the shared link 10-2. In an example illustrated in FIG. 22, after the failures occur in the shared links 10-1 and 10-2, as illustrated in FIG. 21, a failure further occurs between the nodes 5 and 7 with respect to the shared link 10-2. The shared links perform failure processing in the major ring. However, when a failure occurs anew between the nodes 5 and 7 in places other than the shared link 10-2 of the major ring of the shared link 10-2, ports in which the failure between the nodes 5 and 7 is detected are blocked. The R-APS(SF) frame is transmitted from the nodes 5 and 7 to the ring with the ring ID=3. At this point, the nodes 5 and 6, which are the shared nodes, determine according to the R-APS frame input from ports connected to the ring with the ring ID=3 or from failure detection that multiple failures in the major ring occur. According to the flow illustrated in FIG. 6, the nodes 5 and 6 switch the major ring and the sub ring with respect to the shared link 10-2. Consequently, with respect to the shared link 10-2, the ring with the ring ID=2 becomes the major ring. The R-APS(SF) frame for failure detection in the shared link 10-2 is output from the nodes 5 and 6, which are shared nodes, to the ports on the ring side with the ring ID=2. The nodes 1 and 4 on the ring side with the ring ID=2 receive the R-APS(SF) frame.

The nodes 1 and 4 detect a failure other than a failure in the shared link 10-1 of the ring with the ring ID=2, which is the major ring of the shared link 10-2, and switches the major ring and the sub ring with respect to the shared link 10-1 according to the flow of FIG. 6. Consequently, with respect to the shared link 10-1, the ring with the ring ID=1 becomes the major ring. The R-APS(SF) frame for failure detection in the shared link 10-1 is output from the nodes 1 and 4, which are the shared nodes, to the ports on the ring side with the ring ID=1. The node 2, which is the RPL owner of the ring with the ring ID=1, receives the R-APS(SF) frame and opens the blocked ports. In the nodes 5 and 6, which are the shared nodes, because the failure occurs in the shared link 10-2, the R-APS frame received from the ports on the ring side with the ring ID=3 is transferred to the ring side with the ring ID=2. Because the failure occurs in the shared link 10-1, the R-APS frame received from the ports on the ring side with the ring ID=2 in the nodes 1 and 4 is transferred to the ring side with the ring ID=1. Communication among the nodes is possible even during such multiple failures.

As described above, in this embodiment, the configuration in which the three rings are connected by the two shared links is referred to as an example and, as in the first embodiment, the operation is described in which the shared nodes terminating the shared links detect a failure other than a failure in the shared links of the major ring and, when a failure is not occurring in the sub ring, switch the major ring and the sub ring. When the three rings are connected by two shared links in this way, as in the first embodiment and multiple failures including failures in the shared links occur in the major ring, it is possible to set up a bypass and continue communication.

Third Embodiment

Figure 23:
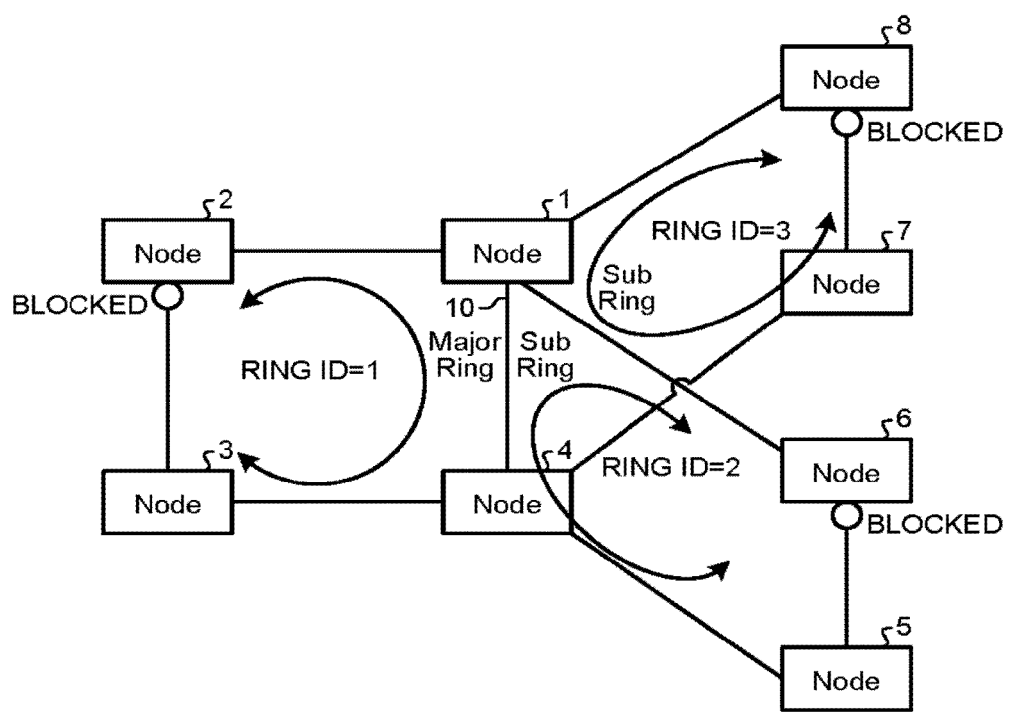
FIG. 23 is a diagram illustrating an example configuration of a multi-ring network in a third embodiment.

FIG. 23 is a diagram illustrating an example configuration of a multi-ring network in a third embodiment of the present invention. As illustrated in FIG. 23, the multi-ring network in this embodiment includes a ring with a ring ID=1, a ring with a ring ID=2, and a ring with a ring ID=3. In the example illustrated in FIG. 23, the shared link 10 is shared by the three rings with the ring IDs=1, 2, and 3. In the example illustrated in FIG. 23, the ring with the ring ID=1 is set as the major ring and the rings with the ring IDs=2 and 3 are set as sub rings in advance.

The ring with the ring ID=1 includes the nodes 1, 2, 3, and 4. The ring with the ring ID=2 includes the nodes 1, 4, 5, and 6. The ring with the ring ID=3 includes the nodes 1, 4, 7, and 8. The rings are connected to one another via the nodes 1 and 4, which are the shared nodes that share the three nodes with each other. A link that connects the nodes 1 and 4 belonging to the three rings is set to be link 10. Note that, in FIG. 23, the multi-ring network including the eight apparatuses including two shared nodes is illustrated. However, the number of nodes connected to the rings is not limited to this. In FIG. 23, a structure is illustrated in which three ring networks are connected. However, the present invention is also applicable to a structure in which four or more ring networks are connected. Further, the present invention is also applicable when three or more shared nodes are connected to the shared link 10.

Each of the nodes 1 to 8 includes a plurality of ports. The ports of the nodes adjacent to one another are connected to form rings and the multi-ring network is thus configured. In the multi-ring network illustrated in FIG. 23, the nodes 1 and 4, which are the shared nodes, include four or more ports. The other nodes 2, 3, 5, 6, 7, and 8 include two or more ports.

The nodes 2, 6, and 8 operate as nodes of an RPL owner of ERP. The other nodes 1, 3, 4, 5, and 7 operate as nodes of a non-RPL owner of the ERP. Concerning setting of the RPL owner and setting and unblocking of a blocked port, operations conforming to the ERP standard in the related art are performed.

Like the rings with the ring IDs=1 and 2 in the first embodiment, the rings with the ring IDs=1, 2, and 3 operate one specific link in the ring networks in a logically disconnected state in order to prevent a loop frame from occurring in the rings. In the ring network illustrated in FIG. 23, a port of the node 2 on the node 3 side, a port of the node 6 on the node 5 side, and a port of the node 8 on the node 7 side are set as BPs.

The nodes 1 and 4 in this embodiment have a configuration the same as the configuration of the shared node (the shared link termination node) in the first embodiment, except that the nodes 1 and 4 include an ERP control unit 14b instead of the ERP control unit 14 of the shared node (the shared link termination node) in the first embodiment illustrated in FIG. 2. Components having functions the same as the functions in the first embodiment are denoted by the same reference numerals and signs as the reference numerals and signs in the first embodiment and redundant explanation of the components is omitted. Differences from the first embodiment are described below.

Figure 24:
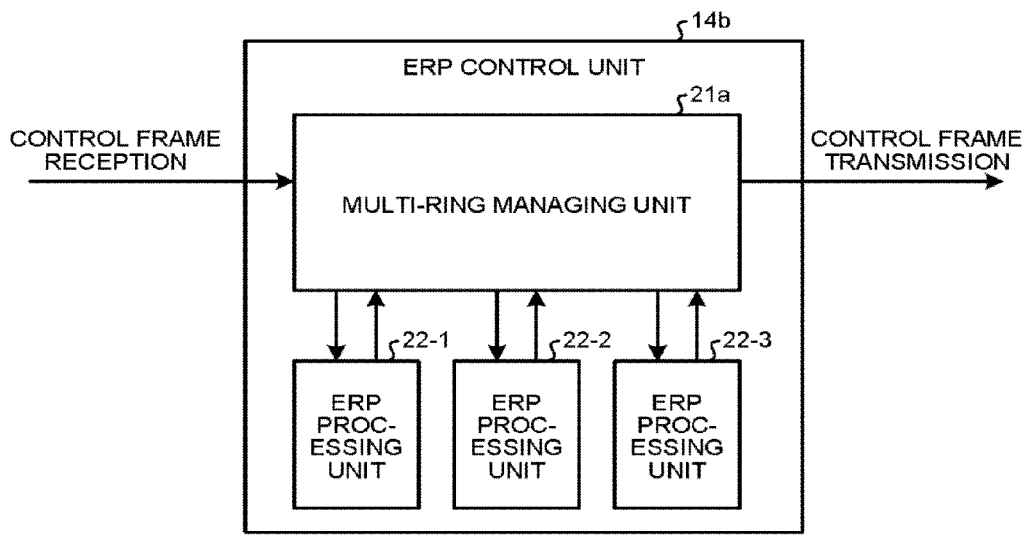
FIG. 24 is a diagram illustrating an example configuration of an ERP control unit of a shared node in the third embodiment.

FIG. 24 is a diagram illustrating an example configuration of the ERP control unit 14b in the shared node in this embodiment. As illustrated in FIG. 24, the ERP control unit 14b in this embodiment includes a multi-ring managing unit 21a and ERP processing units 22-1 to 22-3. The number of ERP processing units in the ERP control unit 14b is equivalent to the number of shared ring networks. The ERP processing units manage a failure state and the like for each of the rings. The multi-ring managing unit 21a manages a plurality of ERP processing units in order to avoid division of a network due to multiple failures in the multi-ring network.

Figure 25:
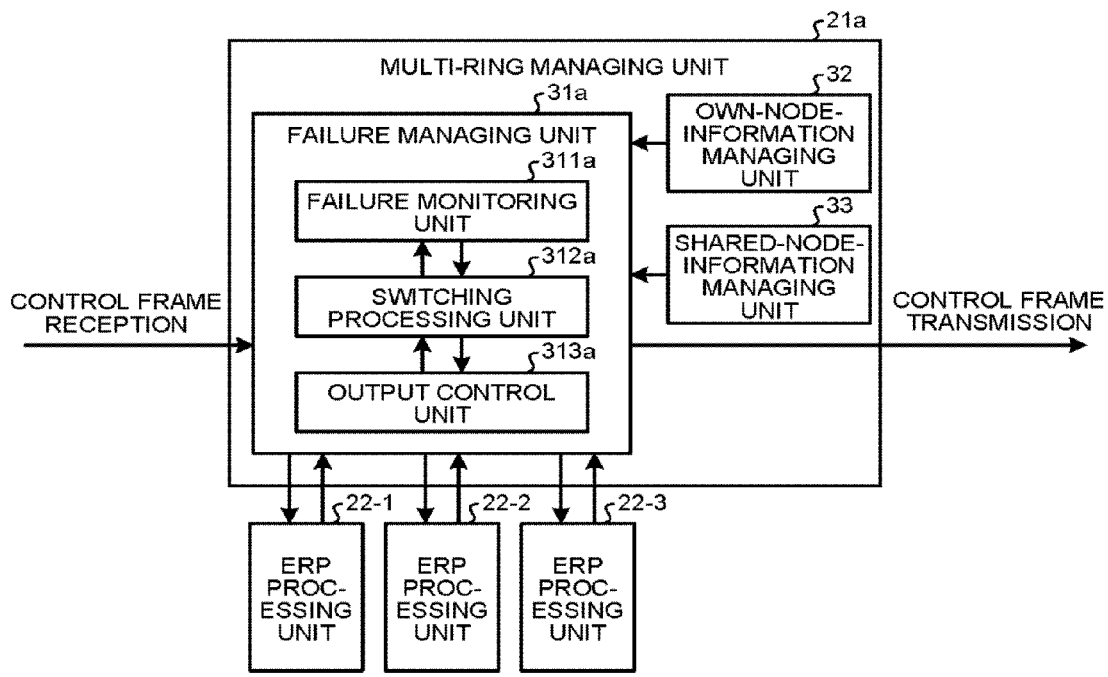
FIG. 25 is a diagram illustrating an example configuration of a multi-ring managing unit in the third embodiment.

FIG. 25 is a diagram illustrating an example configuration of the multi-ring managing unit 21a in this embodiment. The multi-ring managing unit 21a is the same as the multi-ring managing unit 21 in the first embodiment, except that the multi-ring managing unit 21a includes, instead of the failure managing unit 31, a failure managing unit 31a that controls the three ERP processing units 22-1 to 22-3. The failure managing unit 31a includes a failure monitoring unit 311a, a switching processing unit 312a, and an output control unit 313a. The failure monitoring unit 311a discriminates the presence or absence of a failure occurrence ring among the rings with the ring IDs=1, 2, and 3 shared by the shared nodes and the presence or absence of a failure in the shared link 10 on the basis of own node information, shared node information, and information stored in the R-APS frame when a failure occurs in the multi-ring network.

When a failure occurs other than in the shared link in the major ring or when a failure occurs other than in the shared link in the major ring after the failure occurs in the shared link, the switching processing unit 312a switches ring IDs corresponding to the sub rings and the major ring. However, in this embodiment, because a plurality of sub rings are present, it is determined which of the sub rings is changed to the major ring. Among the sub rings, a ring in which a failure does not occur is selected. When two or more rings are selected, for example, one ring is selected according to an order set in advance (e.g., an ascending order of ring IDs) and is set as the major ring.

The failure managing unit 31a of the multi-ring managing unit 21a includes an output control unit 313a that performs transfer/transmission processing for the R-APS frame on the basis of failure states of the three rings and the shared link and a result of the switching processing.

Functions of the multi-ring managing units 21a of the nodes 1 and 4, which are shared link termination nodes, are the same as the functions in the first embodiment and are as illustrated in FIG. 5. A processing flow of the nodes other than the shared nodes is also the same as the processing flow in the first embodiment. A format of the R-APS frame used in this embodiment is also the same as the format in the first embodiment.

Figure 26:
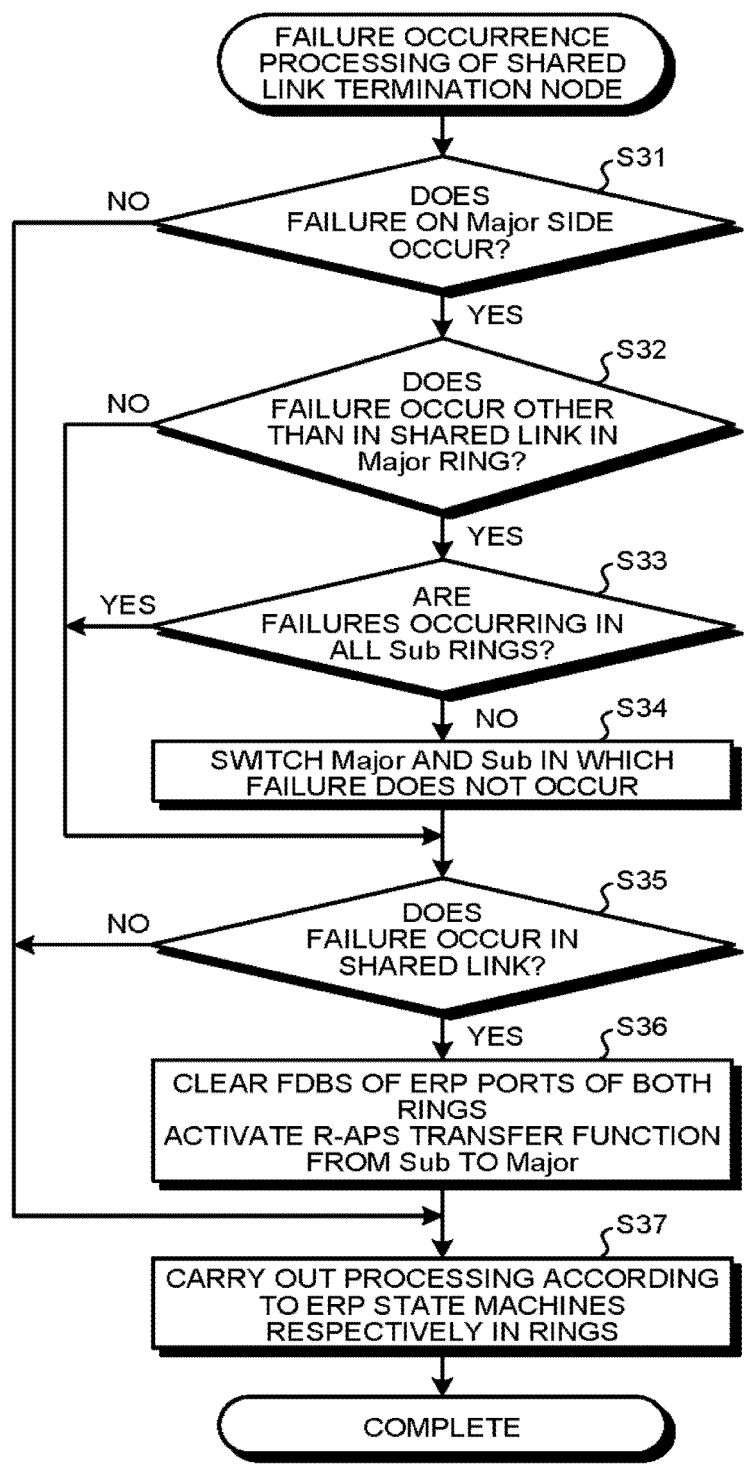
FIG. 26 is a flowchart illustrating an example of a processing procedure performed by the multi-ring managing unit in the third embodiment when a failure is detected.

Processing performed when a failure is detected anew in the multi-ring managing unit 21a of the shared node is described here. FIG. 26 is a flowchart illustrating an example of a processing (failure occurrence processing) procedure performed in the multi-ring managing unit 21a when a failure is detected. Steps S31 and S32 are the same as the steps S1 and S2 in the multi-ring managing unit 21 in the first embodiment. After step S32, the multi-ring managing unit 21a determines whether failures are occurring in all the sub rings (step S33). When there are one or more sub rings in which a failure does not occur (No at step S33), the multi-ring managing unit 21a switches the major ring and the sub ring to change one of the sub rings in which a failure does not occur to the major ring and change the major ring to a sub ring (step S34).

When failures are occurring in all the sub rings at step S33 (Yes at step S33), the multi-ring managing unit 21a proceeds to step S35. Steps S35 to S37 are the same as steps S5 to S7 in the multi-ring managing unit 21 in the first embodiment. However, at step S36, FDB is cleared for all the rings.

The operations of the nodes in this embodiment are described here. First, the operation performed when a failure does not occur in the multi-ring network is described. Any one of the rings with the ring IDs=1, 2, or 3 is set as the major ring and the remaining rings are set as the sub rings in advance. As illustrated in FIG. 23, the ring with the ring ID=1 is set as the major ring and the rings with the ring IDs=2 and 3 are set as the sub rings. As illustrated in FIG. 23, one port of the node 2, one port of the node 6, and one port of the node 8, which are the RPL owners of the rings, are blocked. The R-APS(NR, RB) frame meaning no failure detection is transmitted from the RPL owners. After carrying out, on the R-APS frame input from the ports connected to the rings, ERP processing for a ring with a ring ID stored in the R-APS frame, the shared nodes of the nodes 1 and 4 transfer the frame to the ports to which the shared link 10 is connected. After carrying out, on the R-APS frame received from the shared link 10, ERP processing for a relevant ring ID in the same manner, the shared nodes transfer the R-APS frame to the ports to which a ring at a transfer destination is connected.

Figure 27:
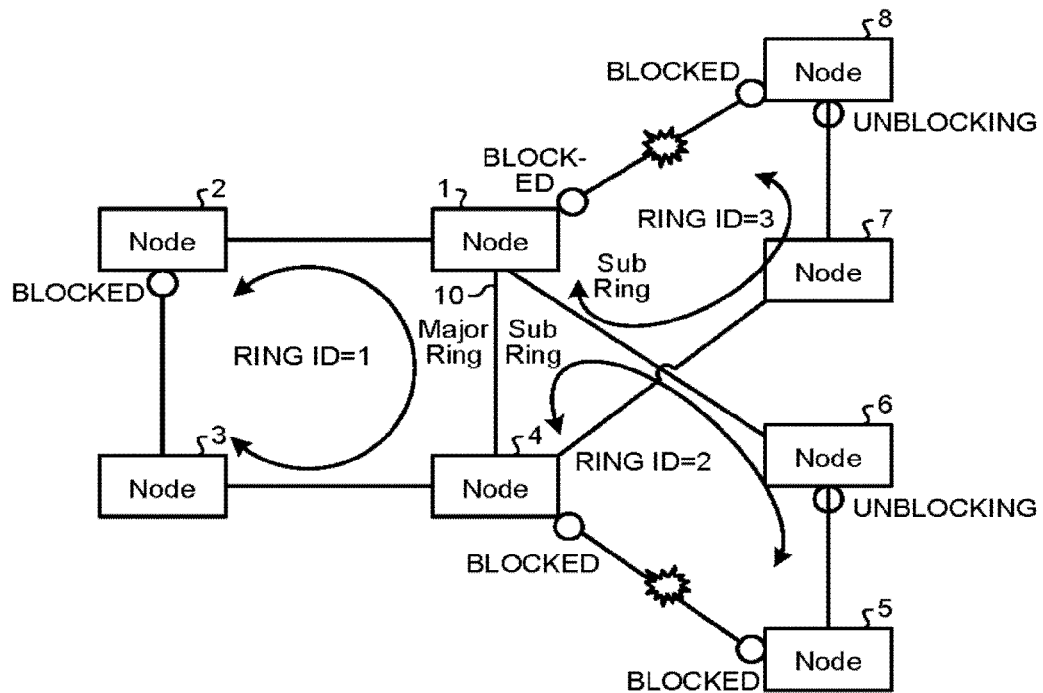
FIG. 27 is a diagram illustrating a state in which failures occurs in sub rings.

FIG. 27 is a diagram illustrating a state in which failures occur in the sub rings. In the example illustrated in FIG. 27, failures occur between the node 1 and the node 8 of the ring with the ring ID=3, which is a sub ring, and between the node 4 and the node 5 of the ring with the ring ID=2, which is a sub ring. In the example illustrated in FIG. 27, because a failure does not occur on the major ring side, one port of the node 2, which is the RPL owner of the ring, is blocked. The R-APS(NR, RB) frame meaning no failure detection is transmitted from the RPL owner. Further, failures occur between the nodes 4 and 5 and between the nodes 1 and 8 on the sub ring side. Therefore, failure detection ports are blocked. The R-APS(SF) frame is transmitted from the nodes 4, 5, 1, and 8. The blocked ports of the nodes 6 and 8, which are the RPL owners, is unblocked. After carrying out, on the R-APS frame input from the ports connected to the rings, ERP processing for the ring with the ring ID in the frame, the nodes 1 and 4, which are the shared nodes, transfer the frame to the ports to which the shared link 10 is connected. After carrying out, on the R-APS frame received from the shared link 10, ERP processing for the ring ID in the frame in the same manner, the nodes 1 and 4 transfer the R-APS frame to the ports connected to the ring with the ring ID.

As described above, when a failure does not occur and when a failure does occur in the sub ring, operations are performed in the rings in the same manner as the ERP of a normal single ring except that the ring ID is discriminated.

Figure 28:
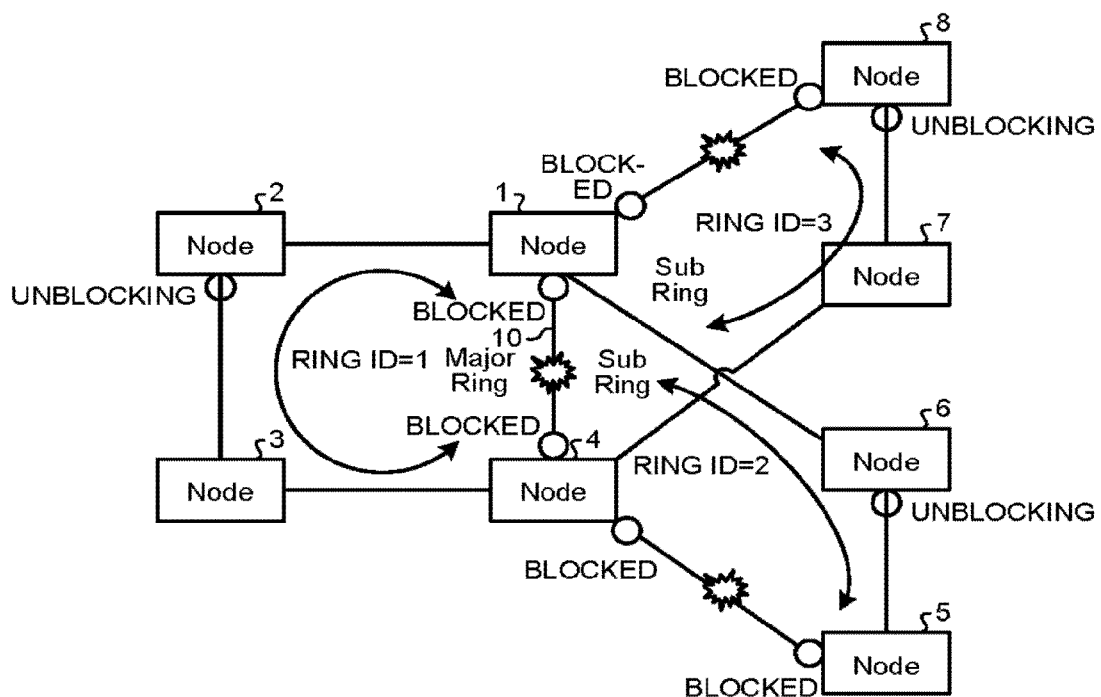
FIG. 28 is a diagram illustrating a state in which a failure occurs in a shared link after the failure occurs in the sub rings.

FIG. 28 is a diagram illustrating a state in which a failure occurs in the shared link after a failure occurs in a sub ring.

In the example illustrated in FIG. 28, after the failure occurs in a sub ring as illustrated in FIG. 27, a failure further occurs in the shared link 10. As illustrated in FIG. 28, when a failure occurs in the shared link 10, the ports of the nodes 1 and 4, which are the shared nodes, on the shared link 10 side are blocked. One port of the node 2, which is the RPL owner of the major ring, is unblocked. When the shared nodes receive the R-APS frame on the sub ring side, because the failure occurs in the shared link 10, the R-APS frame is transferred to the major ring side. Communication among the nodes is possible even during such multiple failures.

Figure 29:
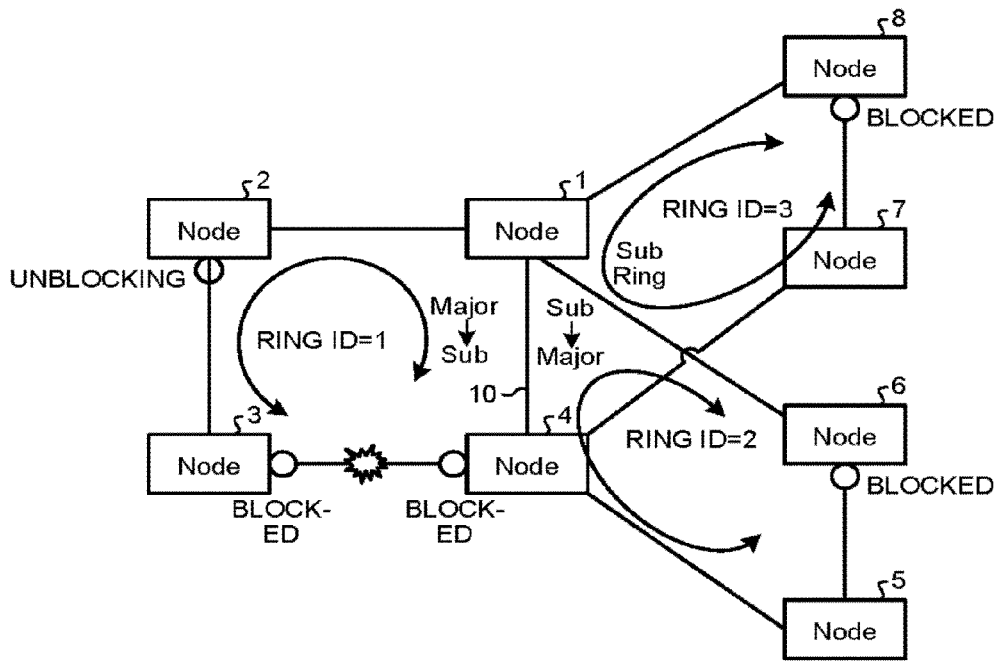
FIG. 29 is a diagram illustrating a state in which a failure occurs in a major ring.

FIG. 29 is a diagram illustrating a state in which a failure occurs in the major ring. In the example illustrated in FIG. 29, a failure occurs between the node 3 and the node 4 of the ring ID=1, which is the major ring. As illustrated in FIG. 29, a failure does not occur in the rings with the ring IDs=2 and 3, which are the sub rings. Therefore, one port of the node 6 and one port of the node 8, which are the RPL owner of the ring, are blocked. The R-APS(NR, RB) frame meaning no failure detection is transmitted. Further, in the ring with the ring ID=1, which is the major ring, a failure occurs between the nodes 3 and 4. Therefore, failure detection ports are blocked. The R-APS(SF) frame is transmitted from nodes 3 and 4. The default blocked port of the node 2, which is the RPL owner, is unblocked. The nodes 1 and 4, which are the shared nodes, determine according to the R-APS frame input from the ports connected to the rings or according to failure detection of the own nodes that a failure occurs on the major ring side. The nodes 1 and 4 switch the major and the sub between the rings with the ring ID=1 and the ring ID=2 according to the flow of FIG. 26. The nodes 1 and 4 carry out, on the received R-APS frame, ERP processing for a ring corresponding to a ring ID of the frame, give major/sub identification information after the switching to the R-APS frame, and transfer the R-APS frame to the ports to which the shared link 10 is connected. When detecting a failure in the own nodes, the nodes 1 and 4 transmit, to the ring corresponding to the failure, the R-APS frame that provides notification of failure occurrence given with the major/sub identification information after the switching. When the major/sub identification information in the frame received from the shared link 10 is the information after the switching, the nodes 1 and 4 update the values of the major/sub identification information after the switching. After carrying out ERP processing for a ring corresponding to the ring ID of the frame, the nodes 1 and 4 transfer the R-APS frame to ports connected to the ring with the ring ID.

Figure 30:
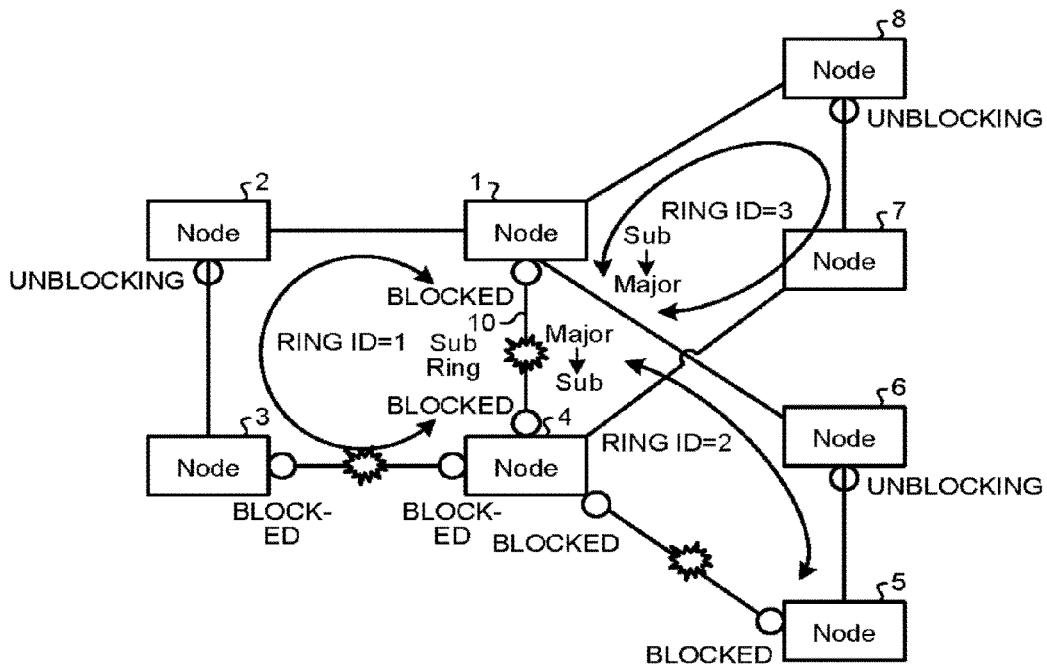
FIG. 30 is a diagram illustrating a state in which a failure occurs in the shared link and a failure further occurs in the major ring after switching of the sub rind and the major ring due to the failure illustrated in FIG. 29.

FIG. 30 is a diagram illustrating a state in which, after the switching of the sub ring and the major ring due to the failure illustrated in FIG. 29, a failure occurs in the shared link 10 and a failure further occurs in the major ring. In the example illustrated in FIG. 30, the switching is performed according to the failure occurrence in the major ring as described with reference to FIG. 29, a failure further occurs in the shared link 10, and thereafter a failure further occurs between the nodes 4 and 5 of the major ring. When the failure occurs in the shared link 10, the ports of the nodes 1 and 4, which are the shared nodes, on the shared link 10 side are blocked. The ring with the ring ID=2, which is the major ring, detects this failure. The node 6, which is the RPL owner of the ring with the ring ID=2, is unblocked. Further, thereafter, as illustrated in FIG. 30, when a failure occurs in the nodes 4 and 5 of the major ring, the major and the sub are switched between the rings with the ring ID=2 and the ring ID=3. Consequently, one port of the node 8, which is the RPL owner of the major ring after the switching, is unblocked. When the shared nodes receive the R-APS frame from the rings with the ring IDs=1 and 2, which are the sub rings, because the failure occurs in the shared link 10, the shared nodes transfer the R-APS frame to the ring side with the ring ID=3, which is the major ring. Communication among the nodes is possible even during such multiple failures.

Figure 31:
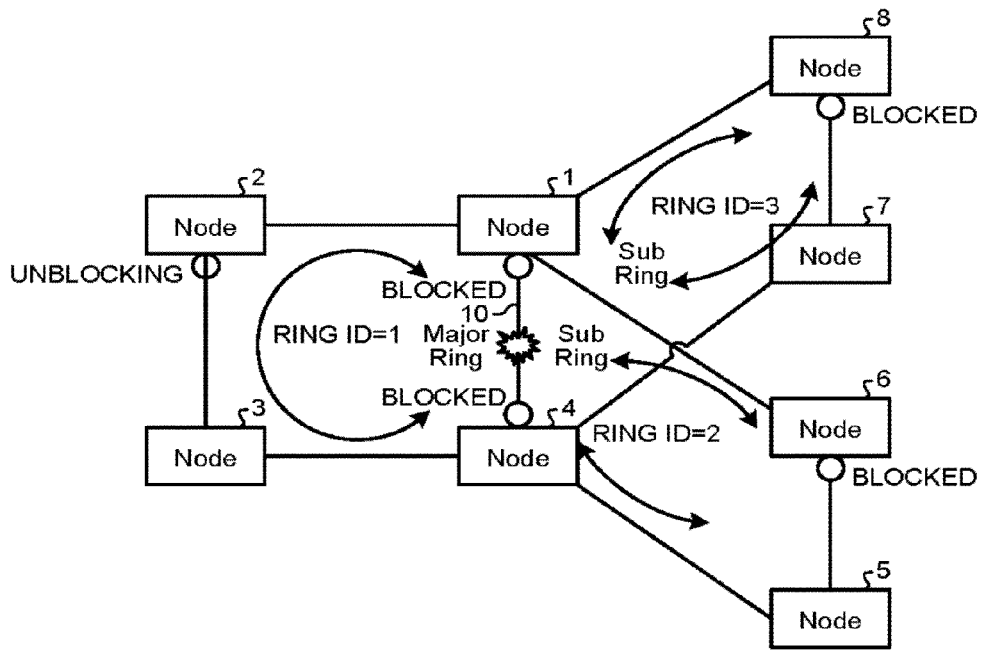
FIG. 31 is a diagram illustrating a state in which a failure occurs in the shared link in a state without any other failures.

FIG. 31 is a diagram illustrating a state in which a failure occurs in the shared link 10 in a state without a failure. In the example illustrated in FIG. 31, a failure occurs in the shared link 10 in the state without a failure illustrated in FIG. 23. As illustrated in FIG. 31, a failure does not occur in the rings with the ring IDs=2 and 3, which are the sub rings. Therefore, one port of the node 6 and one port of the node 8, which are the RPL owners of the ring, are blocked. The R-ARP(NR, RB) frame meaning no failure detection is transmitted. Further, in the ring with the ring ID=1, which is the major ring, a failure occurs between the nodes 1 and 4, which are the shared nodes. Therefore, failure detection ports are blocked. The R-APS(SF) frame is transmitted from the nodes 1 and 4. The default blocked port of the node 2, which is the RPL owner, is unblocked. According to the failure detection in the shared link 10, when the R-APS frame is received from the ring with the ring ID=2, which is the sub ring, according to the flow of FIG. 26, the nodes 1 and 4, which are the shared nodes, carry out ERP processing and transfer the RS-APS frame to the ring with the ring ID=1, which is the major ring.

After the failure occurs in the shared link 10, when a failure occurs in the sub ring and multiple failures occur in the multi-ring network, the state is the same as the state illustrated in FIG. 28. Communication among the nodes is possible even during such multiple failures.

Figure 32:
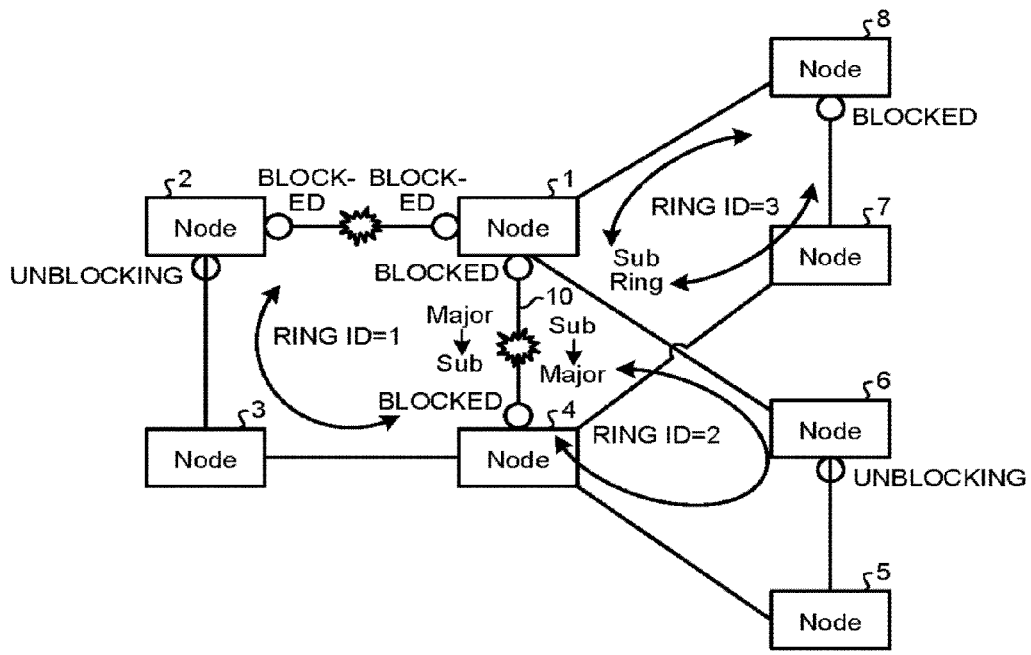
FIG. 32 is a diagram illustrating a state in which a failure occurs in the major ring after a failure occurs in the shared link.

FIG. 32 is a diagram illustrating a state in which a failure occurs in the major ring after the failure occurs in the shared link 10. In the example illustrated in FIG. 32, after the failure occurs in the shared link 10 as illustrated in FIG. 31, a failure occurs between the nodes 1 and 2 of the ring with the ring ID=1, which is the major ring. The shared link performs failure processing in the major ring. However, when a failure occurs anew between the nodes 1 and 2 in a place other than the shared link of the major ring, ports in which the failure between the nodes 1 and 2 is detected are blocked. The R-APS(SF) frame is transmitted from the nodes 1 and 2 to the major ring. At this point, the nodes 1 and 4, which are the shared nodes, determine according to the R-APS frame input from ports connected to the ring with the ring ID=1 or from failure detection of the own nodes that multiple failures in the major ring occur. According to the flow illustrated in FIG. 26, the nodes 1 and 4 switch the major ring and the sub ring between the rings with the ring ID=1 and the ring ID=2. Consequently, the ring with the ring ID=2 becomes the major ring. The R-APS(SF) frame for failure detection in the shared link is output from the nodes 1 and 4, which are the shared nodes, to the ports on the ring side with the ring ID=2. The node 6, which is the RPL owner on the ring side with the ring ID=2, is unblocked. In the nodes 1 and 4, because a failure occurs in the shared link, the R-APS frame received from the ports on the ring side with the ring ID=1 is transferred to the ring side with the ring ID=2.

Figure 33:
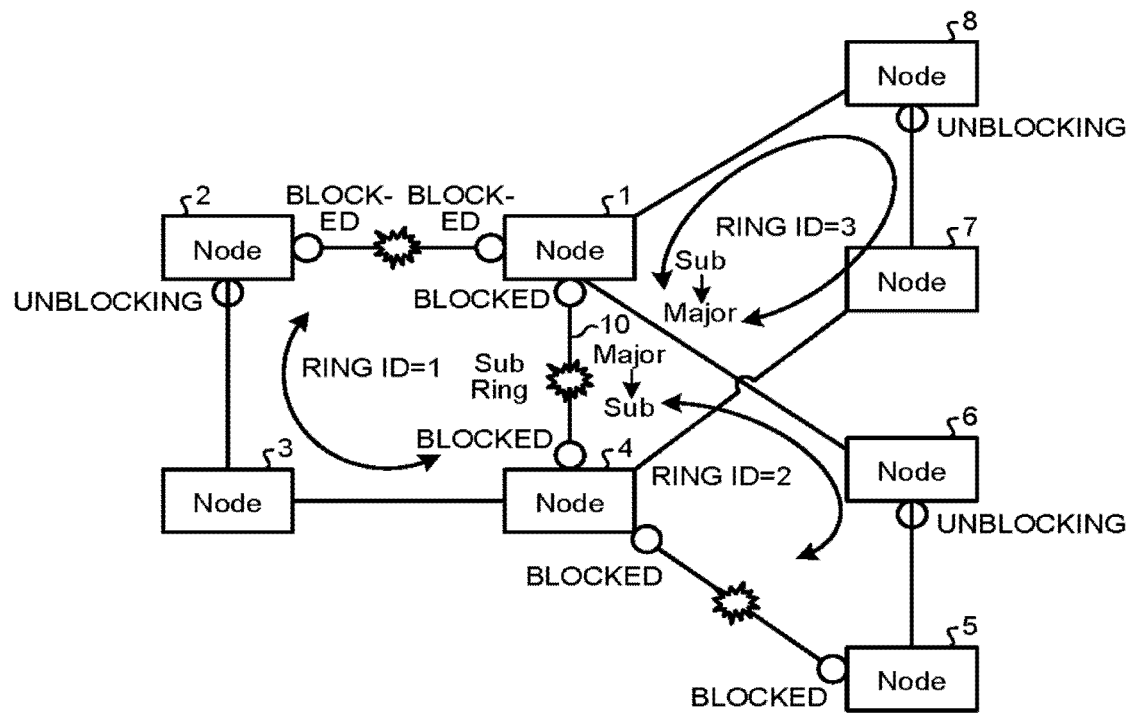
FIG. 33 is a diagram illustrating a state in which a failure further occurs in the major ring after the failure illustrated in FIG. 32 occurs.

FIG. 33 is a diagram illustrating a state in which a failure further occurs in the major ring after the failure occurrence illustrated in FIG. 32. In the example illustrated in FIG. 33, after the failure occurs in the shared link 10, a failure occurs between the nodes 1 and 2 of the ring with the ring ID=1, which is the major ring, and a failure further occurs between the nodes 4 and 5 of the ring with the ring ID=2, which is the major ring at that point. The shared link performs failure processing in the major ring. However, when a failure occurs anew between the nodes 4 and 5 in a place other than the shared link of the major ring, ports in which the failure between the nodes 4 and 5 is detected are blocked. The R-APS(SF) frame is transmitted from the nodes 4 and 5 to the ring with the ring ID=2, which is the major ring. At this point, the nodes 1 and 4, which are shared nodes, determine according to the R-APS frame input from ports connected to the ring with the ring ID=2 or from failure detection of the own nodes that multiple failures in the major ring occur. According to the flow illustrated in FIG. 26, the nodes 1 and 4 switch the major ring and the sub ring between the rings with the ring ID=2 and the ring ID=3. Consequently, the ring with the ring ID=3 becomes the major ring. The R-APS(SF) frame for failure detection in the shared link 10 is output from the nodes 1 and 4, which are the shared nodes, to the ports on the ring side with the ring ID=3. The node 8, which is the RPL owner of the ring with the ring ID=3, is unblocked. In the nodes 1 and 4, because the failure occurs in the shared link 10, the R-APS frame received from the ports on the ring sides with the ring IDs=1 and 2 is transferred to the ring side with the ring ID=3. Communication among the nodes is possible even during the multiple failures described above.

As described above, in this embodiment, the configuration in which the three rings share the one shared link is referred to as an example and, as in the first embodiment, an operation is described in which the shared nodes terminating the shared links detect a failure other than a failure in the shared links of the major ring and, when a failure is not occurring in the sub rings, switch the major ring and the sub ring. When the three rings share one shared link in this way, as in the first embodiment and when multiple failures including a failure in the shared link occur in the major ring, it is possible to set a bypass and continue communication.

Fourth Embodiment

Figure 34:
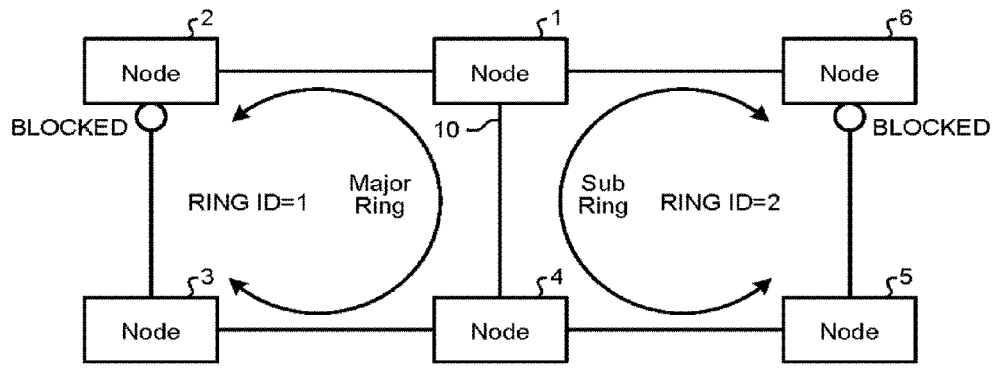
FIG. 34 is a diagram illustrating an example configuration of a multi-ring network in a fourth embodiment.

FIG. 34 is a diagram illustrating an example configuration of a multi-ring network in a fourth embodiment of the present invention. The multi-ring network in the fourth embodiment includes a ring network with a ring ID=1 and a ring with a ring ID=2. The ring with the ring ID=1 includes the nodes 1, 2, 3, and 4, which are communication apparatuses. The ring with the ring ID=2 includes the nodes 1, 4, 5, and 6. The ring with the ring ID=1 and the ring with the ring ID=2 are connected via the nodes 1 and 4, which are communication apparatuses shared by two rings (hereinafter referred to as shared nodes as appropriate). The nodes 1 and 4 are connected by the shared link 10.

As illustrated in FIG. 34, the ring with the ring ID=1 is set in advance as a major ring that performs failure management for the shared link 10, and the ring with the ring ID=2 is set in advance as a sub ring that does not perform failure management for the shared link 10. The method of determining the major ring and the sub ring is not particularly limited. For example, the major ring and the sub ring can be determined by comparing information such as ring IDs.

As illustrated in FIG. 34, the node 1 is set in advance as a shared link master node (a master shared apparatus) that determines the major ring that performs the failure management for the shared link; and the node 4 is set as a slave node (a slave shared apparatus) that determines, following the major ring determined by the master node, the major ring that performs the failure management of the shared link. A method of determining the shared link master node and the slave node is not particularly limited. For example, the shared link master node and the slave node can be determined by comparing information such as node IDs.

Note that, in FIG. 34, the multi-ring network including the six apparatuses including the two shared nodes is illustrated as an example. However, the number of nodes connected to the rings is not limited to this. In FIG. 1, an example configuration in which two rings are connected is illustrated. However, this embodiment is also applicable to a structure in which three or more ring networks are connected. This embodiment is also applicable when three or more shared nodes are connected to the shared link.

Each of the nodes 1 to 6 includes a plurality of ports. The ports of the nodes adjacent to one another are connected to form the rings and thus the multi-ring network is configured. In the multi-ring network illustrated in FIG. 34, the nodes 1 and 4, which are the shared nodes, include three or more ports. The other nodes 2, 3, 5, and 6 include two or more ports.

The nodes 2 and 6 operate as RPL owner nodes of ERP. The other nodes 1, 3, 4, and 5 operate as non-RPL owner nodes of the ERP. Concerning setting of an RPL owner and setting and unblocking of a blocked port, operations conforming to the ERP standard of the related art are performed. Note that an example is described below in which the ERP is used as a ring protection method for setting the blocked port in order to avoid a loop in a ring network from occurring. However, the ring protection method is not limited to the ERP.

The rings with the ring IDs=1 and 2 operate one specific link in the rings in a logically disconnected state in order to prevent a loop frame from occurring in the rings. Usually, one port of the RPL owner node is blocked so as to logically disconnect a link to an adjacent node. In the example configuration illustrated in FIG. 34, a port of the node 2 on the node 3 side and a port of the node 6 on the node 5 side are set as BPs. With normal ERP, in the node subjected to the BP setting, a control frame and a data frame are not transferred to an adjacent node and are discarded. In contrast, in a port not subjected to the BP setting, the control frame and the data frame are permitted to be transferred to an adjacent node.

The shared nodes 1 and 4 in this embodiment have a configuration the same as the configuration of the shared nodes in the first embodiment, except that the multi-ring managing unit 21 is replaced with a multi-ring managing unit 21b. The configuration of the nodes (the nodes 2, 3, 5, and 6) other than the shared nodes in this embodiment is also the same as the configuration of the nodes other than the shared nodes in the first embodiment.

Figure 35:
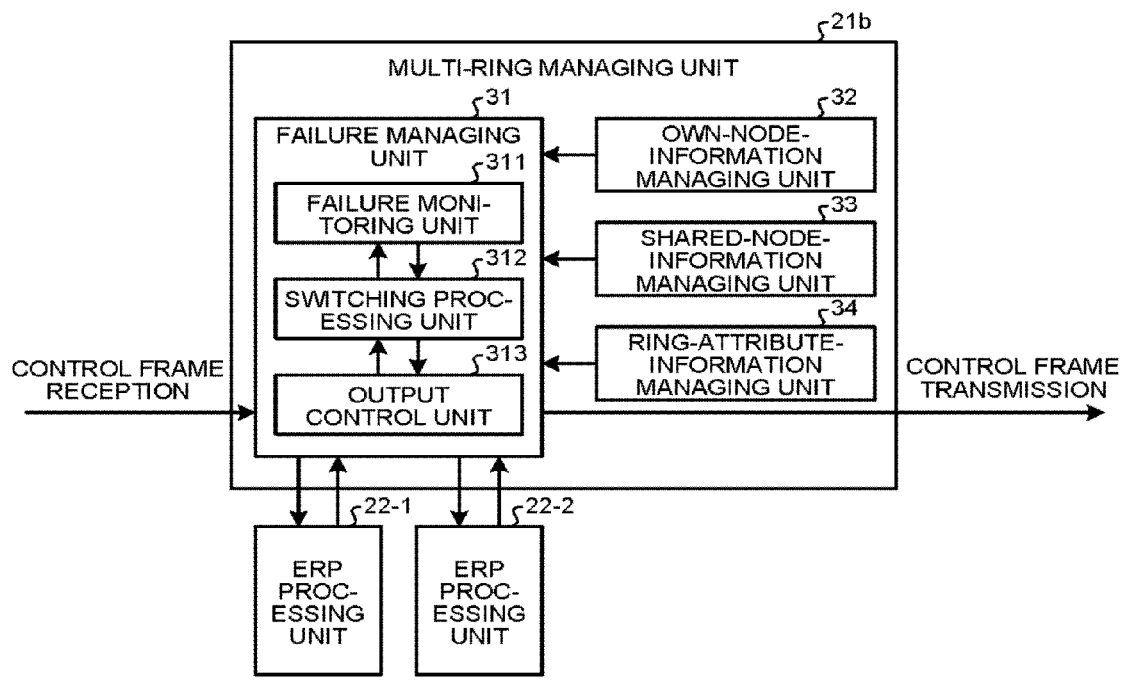
FIG. 35 is a diagram illustrating an example configuration of a multi-ring managing unit in the fourth embodiment.

Functions of the multi-ring managing unit 21b of the shared node in this embodiment are described here. FIG. 35 is a diagram illustrating an example configuration of the multi-ring managing unit 21b in this embodiment. The multi-ring managing unit 21b includes the failure managing unit 31, the own-node-information managing unit 32, the shared-node-information managing unit 33, and a ring-attribute-information managing unit 34. The own-node-information managing unit 32 manages, with respect to ring IDs, in a plurality thereof, of the ring network shared by the shared node (the own node), own node information, which is information concerning the own node such as the ring ID of the major ring and a port number of a port connected to the major ring, a ring ID of the sub ring and a port number of a port connected to the sub ring, and a port number of a port connected to the shared link. Note that, like the multi-ring network of ITU-_T G.8032, the major ring is a ring that determines a failure in the shared link and the sub ring is a ring that does not determine a failure in the shared link.

The shared-node-information managing unit 33 of the multi-ring managing unit 21b manages shared node information, which is information for identifying a port such as a node ID of a shared node (in the example illustrated in FIG. 34, the node 4 from the viewpoint of the node 1 or the node 1 from the viewpoint of the node 4) that terminates the shared link on the opposite side of the shared link and a port number connected to the shared node and information concerning the other shared nodes such as a node ID of a shared link intermediate node that is connected to the shared link but does not terminate the shared link. Note that, in the example illustrated in FIG. 34, the shared intermediate node is absent. However, the shared link intermediate node to which the shared link 10 is connected can be provided between the node 1 and the node 4.

The ring-attribute-information managing unit 34 of the multi-ring managing unit 21b sets, between the own node and the shared node (in the example illustrated in FIG. 34, the node 4 from the viewpoint of the node 1 or the node 1 from the viewpoint of the node 4) that terminates the shared link on the opposite side of the shared link: one as a shared link master node (hereinafter, master node) and the other as a shared link slave node (hereinafter, slave node). The ring-attribute-information managing unit 34 manages ring attribute information for identifying whether the own node is the master node or a slave node. The ring attribute information is information necessary for the shared node to control ring ID information of the major ring, which manages a failure in the shared link of the slave node, to coincide with ring ID information of the major ring of the master node.

The failure managing unit 31 of the multi-ring managing unit 21b includes the failure monitoring unit 311 that discriminates the presence or absence of a failure occurrence ring and the presence or absence of a failure in the shared link from the own node information, the shared node information, the ring attribute information, information stored in the R-APS frame when a failure occurs in the multi-ring network (a ring ID or a node ID in which a failure is detected), and port information (information concerning ports in which a failure is detected).

The failure managing unit 31 includes the switching processing unit 312 that switches ring IDs corresponding to a sub ring and the major ring, e.g., when a failure occurs other than in the shared link in the major ring, when a failure occurs other than in the shared link in the major ring after the failure occurs in the shared link, when information concerning the major ring does not match in the master node and the slave node that terminate the shared link, or when failures other than a failure in the shared link occur in all the rings having the same shared link. If failure occurrence probabilities of the links are the same, in the former case (the failure other than the failure in the shared link occurs in the major ring), by changing a ring functioning as the major ring (changing a ring ID set as the major ring), it is possible to reduce the probability of the of multiple failures including a failure in the shared link in one ring. Note that, when failures in the multi-ring simultaneously occur in the rings, the R-APS frame that gives notification of the failures is received at different times in the shared nodes at both ends of the shared link. Therefore, it is likely that the recognition of the major ring and the sub ring is different in the shared nodes at both the ends. To avoid this, when a failure occurs in the shared link, the slave node adjusts identification information of the major/sub rings of the shared link of the own node to identification information of the major/sub rings of the shared link in the master node to match the recognition of the major ring and the sub ring in the shared nodes at both ends of the shared link. The failure managing unit 31 of the multi-ring managing unit 21b includes the output control unit 313, which performs transfer/transmission processing of the R-APS frame on the basis of failure states of both the rings and the shared link and a result of the switching processing.

Figure 36:
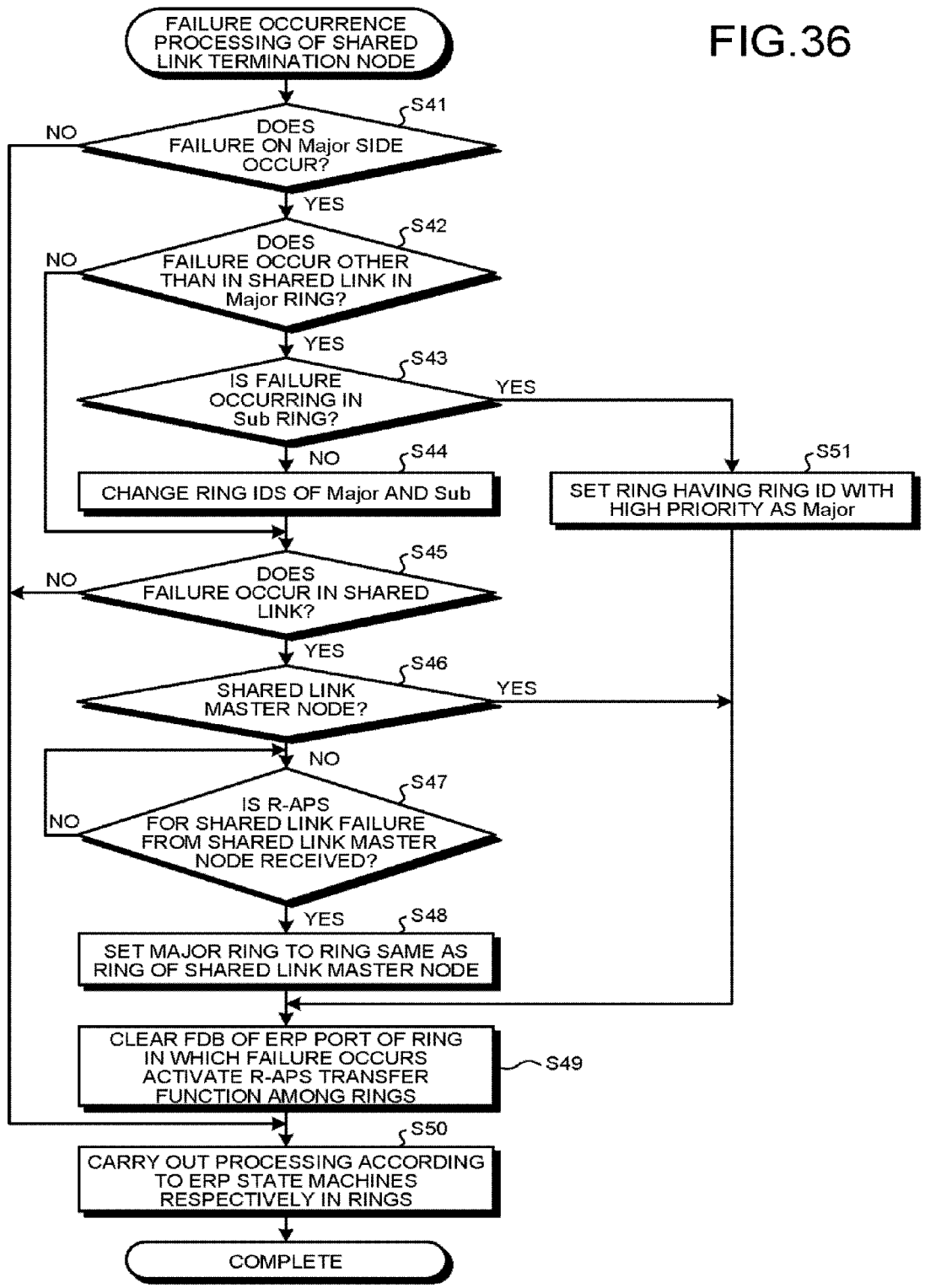
FIG. 36 is a flowchart illustrating an example of a processing (failure occurrence processing) procedure performed by the multi-ring managing unit in the forth embodiment when a failure is detected.

Processing performed in the multi-ring managing unit 21b of the shared node when a failure is detected anew is described here. FIG. 36 is a flowchart illustrating an example of a processing (failure occurrence processing) procedure performed in the multi-ring managing unit 21b when a failure is detected. Note that, when the shared link intermediate node is present, this failure occurrence processing is carried out by a shared node other than the shared link intermediate node, i.e., a shared link termination node that terminates the shared link.

As illustrated in FIG. 36, first, the multi-ring managing unit 21b determines whether a failure occurs on the Major side (step S41). Specifically, the multi-ring managing unit 21b determines on the basis of the R-APS frame received from a node belonging to the major ring whether a failure occurs in the major ring.

When a failure occurs on the Major side (Yes at step S41), the multi-ring managing unit 21b determines whether a failure occurs other than in the shared link (step S42). Whether a failure occurs in the shared link can be determined on the basis of the retained shared node information and the R-APS frame. When a failure occurs other than in the shared link (Yes at step S42), the multi-ring managing unit 21b determines whether a failure is occurring in the sub ring (step S43). The multi-ring managing unit 21b manages a failure occurrence state of the sub ring on the basis of the R-APS frame received from a node belonging to the sub ring. Consequently, it is possible to determine whether a failure occurs in the sub ring.

When a failure is not occurring in the sub ring (No at step S43), the multi-ring managing unit 21b switches Major and Sub (step S44). That is, in the state illustrated in FIG. 34, the multi-ring managing unit 21b changes the ring with the ring ID=1, which is the major ring, to the sub ring and changes the ring with the ring ID=2, which is the sub ring, to the major ring.

When a failure is occurring in the sub ring as well (Yes at step S43), the failures occur other than in the shared link in both the rings belonging to the shared link. Therefore, the multi-ring managing unit 21b sets, as the major ring, a ring having a ring ID with high priority determined in advance (step S51) and proceeds to step S49. For example, when the priority of the ring IDs is (the ring ID=1)>(the ring ID=2), the multi-ring managing unit 21b sets the ring ID=1 as the major ring and the ring ID=2 as the sub ring.

After step S44, the multi-ring managing unit 21b determines whether a failure occurs in the shared link (step S45). When a failure occurs in the shared link (Yes at step S45), the multi-ring managing unit 21b determines whether the own node is the shared link master node (or the slave node) (step S46). When the own node is the shared link slave node (No at step S46), the multi-ring managing unit 21b determines whether the R-APS frame due to the failure in the shared link is received from the master node (step S47). When the R-APS frame due to the failure in the shared link is received from the master node (Yes at step S47), the multi-ring managing unit 21b sets the major ring to a ring ID the same as the ring ID of the shared link master node (step S48). The identification of the major ring is determined according to information stored in the R-APS frame received from the master node because of the failure in the shared link. When the R-APS frame due to the failure in the shared link is not received from the master node (No at step S47), the multi-ring managing unit 21b returns to step S47.

According to the above processing, after the major ring that manages a failure in the shared link matches the shared link master node and the slave node, the multi-ring managing unit 21b clears FDBs of ERP ports of both the rings and activates a transfer function of the R-APS frame from the sub ring to the major ring (step S49). By activating the transfer function in both the rings, it is possible to transfer, through the major ring, a frame that cannot be transferred because of a failure in the shared link on the sub ring side because the failure occurs in the shared link. Note that, in the rings, as usual, in an initial state, a received frame and a port number are registered in the FDBs and transfer is performed using the FDBs.

Subsequently, the multi-ring managing unit 21b carries out processing according to ERP state machines in each of the rings (step S50) and ends the processing. The processing performed according to the ERP state machines is the same as the processing in the past. Therefore, detailed explanation of the processing is omitted.

Note that, when a failure does not occur on the Major side (No at step S41), the multi-ring managing unit 21b proceeds to step S50. The multi-ring managing unit 21b performs processing according to the respective ERP state machines in the rings. When a failure does not occur other than in the shared link of the major ring (No at step S42), the multi-ring managing unit 21b proceeds to step S45. When a failure does not occur in the shared link (No at step S45), the multi-ring managing unit 21b proceeds to step S50. When the own node is the shared link master node at step S46 (Yes at step S46), the multi-ring managing unit 21b proceeds to step S49.

Figure 37:
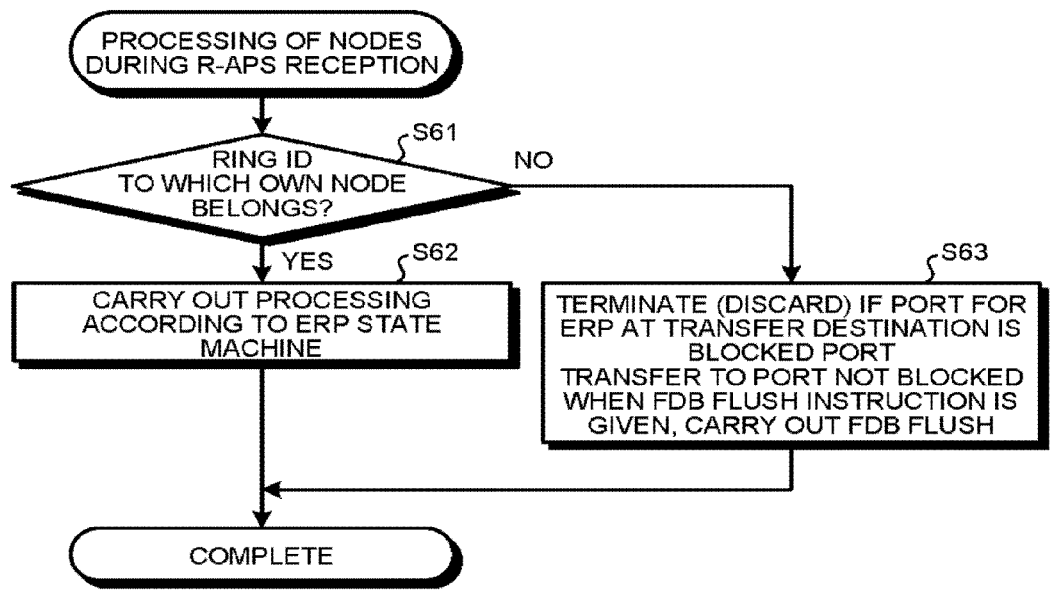
FIG. 37 is a flowchart illustrating an example of a processing procedure when receiving an R-APS frame in a node other than shared nodes in the fourth embodiment.

The nodes other than the shared nodes are described here. The nodes other than the shared nodes in this embodiment include the ERP control unit 14a as in the first embodiment. The ERP control unit 14a in this embodiment carries out operations described below. The ERP control unit 14a includes, as illustrated in FIG. 7, the own-node-information managing unit 23, the frame identifying unit 24, and the ERP processing unit 25. FIG. 37 is a flowchart illustrating an example of a processing procedure when receiving the R-APS frame in the nodes other than the shared nodes.

The own-node-information managing unit 23 manages information concerning the own node such as a ring ID to which the own node belongs. As illustrated in FIG. 37, when the R-APS frame is received, the frame identifying unit 24 determines on the basis of the information managed by the own-node-information managing unit 23 whether a ring ID (Ring ID in FIG. 4) in the received R-APS frame coincides with the ring ID to which the own node belongs (step S61). When the ring ID in the received R-APS frame coincides with the ring ID to which the own node belongs (Yes at step S61), the frame identifying unit 24 outputs the R-APS frame matching the ring ID to which the own node belongs to the ERP processing unit 25. The ERP processing unit 25 carries out normal ERP processing on the basis of the input R-APS frame (step S62). At this point, the change is reflected as to when, on the basis of the major/sub identification information of the R-APS frame, the ring network to which the own node belongs is the major ring or the sub ring is changed or not.

For example, when the own node is an RPL owner of a ring network initially set as the sub ring, in this state, even if a failure occurs in the shared link, unblocking of a blocked port of the own node is not performed. Thereafter, when the R-APS frame indicating that the ring network to which the own node belongs is the major ring is received, subsequently, unblocking of the blocked port of the own node is performed when the R-APS frame for detecting a failure in the shared link is received.

When the ring ID of the received R-APS frame does not coincide with the ring ID to which the own node belongs (No at step S61), the frame identifying unit 24 does not output the R-APS frame to the ERP processing unit 25. When the other ERP port (not on the receiving port side) (a port connected to a link from which the ERP ring is configured) at a transfer destination is a blocked port, the frame identifying unit 24 terminates (discards) the frame. When the ERP port is not the blocked port, the frame identifying unit 24 transfers the R-APS frame to the other port (step S63). When an FDB flush instruction is given in this case, the frame identifying unit 24 carries out a flush of the FDB.

The operations of the nodes in this embodiment are described here. First, the operation performed when a failure does not occur in the multi-ring network is described. In the multi-ring network, the ring with the ring ID=1 or the ring ID=2 is set as the major ring and the other is set as a sub ring in advance. As illustrated in FIG. 34, the ring with the ring ID=1 is set as the major ring and the ring with the ring ID=2 is set as a sub ring.

As illustrated in FIG. 34, one port of the node 2 and one port of the node 6, which are the RPL owners of the rings, are blocked. An R-APS (NR, RB) frame meaning no failure detection (the R-APS frame in which the Request/State is NR and a value indicating that the blocked ports of the RPL owners are blocked is stored in RB) is transmitted from the RPL owners. After carrying out, on the R-APS frame input from ports connected to the rings, ERP processing for a relevant ring ID (a ring ID stored in the R-APS frame), the nodes 1 and 4, which are the shared nodes, transfer the frame to the ports connected to the shared link. After carrying out, on the R-APS frame received from the shared link, ERP processing for the relevant ring ID in the same manner, the nodes 1 and 4 transfer the R-APS frame to ports to which a ring at a transfer destination is connected.

Operation performed when a failure occurs on the sub ring in the multi-ring network is described. The state in which a failure occurs in the ring with the ring ID=2 illustrated in FIG. 9 is described. The example illustrated in FIG. 9 indicates that the ring with the ring ID=1 is set as the major ring before a failure occurs and, in this state, a failure occurs between the node 4 and the node 5 of the ring with the ring ID=2, which is the sub ring. In this case, because a failure does not occur on the major ring side, one port of the node 2, which is the RPL owner of the ring, is blocked and the R-APS(NR, RB) frame meaning no failure detection is transmitted from the RPL owner. On the other hand, because a failure occurs between the node 4 and the node 5 on the sub ring side, failure detection ports are blocked. An R-APS(SF) frame (the R-APS frame in which Request/State is SF) is transmitted from the nodes 4 and 5. Blocking of the blocked port of the node 6, which is the RPL owner, is unblocked. After carrying out, on the R-APS frame input from the ports connected to the rings, ERP processing for a ring corresponding to a ring ID in the frame, the nodes 1 and 4, which are the shared nodes, transfer the frame to the ports to which the shared link 10 is connected. After carrying out, on the R-APS frame received from the shared link 10, ERP processing with the ring ID in the frame in the same manner, the nodes 1 and 4 transfer the R-APS frame to ports connected to a ring with the ring ID.

As described above, when a failure does not occur and when a failure occurs in the sub ring, operations are performed in the rings in the same manner as the ERP of a normal single ring except that the ring ID is discriminated.

The state in which multiple failures occur in the multi-ring network illustrated in FIG. 10 is described. In the example illustrated in FIG. 10, the ring with the ring ID=1 is set as the major ring before a failure occurs. In this state, failures occur in the shared link 10 and between the node 4 and the node 5. As in the example illustrated in FIG. 10, when a failure occurs in the shared link 10, ports of the nodes 1 and 4, which are the shared nodes, on the shared link 10 side are blocked. When the node 1, which is the shared node, is the shared link master node and the node 4 is the shared link slave node, the R-APS frame that provides notification of the failure in the shared link is transmitted from the node 1, which is the shared link master node. Therefore, a failure is detected in the ring ID=1 on the major ring side. Blocking of one port of the node 2, which is the RPL owner of the major ring, is unblocked. Before receiving the R-APS frame that provides notification of the failure in the shared link from the node 1, the node 4, which is the shared link slave node, does not transfer the R-APS frame that provides notification of the failure in the shared link. When the shared nodes receive the R-APS frame on the sub ring side, because the failure occurs in the shared link 10, the R-APS frame is transferred to the major ring side. Communication among the nodes is possible even during such multiple failures.

The state in which a failure occurs in the major ring illustrated in FIG. 11 is described. In the example illustrated in FIG. 11, the ring with the ring ID=1 is set as the major ring before a failure occurs. In this state, a failure occurs between the node 2 and the node 1 in the major ring. As illustrated in FIG. 11, because a failure does not occur in the ring with the ring ID=2, which is the sub ring, one port of the node 6, which is the RPL owner of the sub ring, is blocked. The R-APS(NR, RB) frame meaning no failure detection is transmitted. On the other hand, in the ring with the ring ID=1, which is the major ring, because a failure occurs between the node 2 and the node 1, failure detection ports are blocked. The R-APS(SF) frame is transmitted from the nodes 1 and 2. Blocking of a default blocked port of the node 2, which is the RPL owner, is unblocked. The nodes 1 and 4, which are the shared nodes, determine according to the R-APS frame input from the ports connected to the rings or according to failure detection of the own nodes that a failure occurs on the major ring side. The nodes 1 and 4 switch the major and the sub according to the flow of FIG. 36. The nodes 1 and 4 carry out, on the received R-APS frame, the ERP processing for a ring corresponding to a ring ID of the frame (e.g., if the ring is the ring with the ring ID=1, the ERP processing unit 22-1 carries out the ERP processing). The nodes 1 and 4 give information for identifying a new major ring or a new sub ring (after the switching) (major/sub identification information) to the R-APS frame and transfer the R-APS frame to the ports to which the shared link 10 is connected. When major/sub identification information in the R-APS frame received from the shared link 10 is the information before the switching, the nodes 1 and 4 update the major/sub identification information to values after the switching. After carrying out the ERP processing for a ring corresponding to the ring ID of the frame, the nodes 1 and 4 transfer the R-APS frame to ports connected to the ring with the ring ID.

The state in which a failure occurs in the shared link 10 after the major ring and the sub ring are switched illustrated in FIG. 12 is described. In the example illustrated in FIG. 12, after the failure occurs in the major ring and the major ring and the sub ring are switched as illustrated in FIG. 11, a failure further occurs in the shared link 10. As illustrated in FIG. 12, when a failure occurs in the shared link 10, the ports of the nodes 1 and 4, which are the shared nodes, on the shared link 10 side are blocked. The failure in the shared link 10 is detected by the major ring. Therefore, the R-APS frame that provides notification of the failure in the shared link is transmitted from the node 1, which is the shared link master node, to a new major ring side. Blocking of one port of the node 6, which is the RPL owner of the major ring after the switching is unblocked. Before receiving the R-APS frame that provides notification of the failure in the shared link from the node 1, the node 4, which is the shared link slave node, does not transfer the R-APS frame that provides notification of the failure in the shared link. When the R-APS frame of the ring ID=1, which is the sub ring in the shared node, is received, because the failure occurs in the shared link 10, the output control unit 313 transfers the R-APS frame to the ring ID=2 side, which is the major ring. Communication among the nodes is possible even during such multiple failures.

The state in which a failure occurs in the shared link 10 in a state without a failure illustrated in FIG. 13 is described. In the example illustrated in FIG. 13, the ring with the ring ID=1 is set as the major ring before a failure occurs. A failure occurs in the shared link 10 in this state. As illustrated in FIG. 13, a failure does not occur on the ring side with the ring ID=2, which is the sub ring. Therefore, one port of the node 6, which is the RPL owner of the ring, is blocked. The R-APS(NR, RB) meaning no failure detection is transmitted. On the other hand, on the ring side with the ring ID=1, which is the major ring, a failure occurs between the nodes 1 and 4, which are the shared nodes. Failure detection ports are blocked. The R-APS frame that provides notification of the failure in the shared link is transmitted from the node 1, which is the shared link master node, to a new major ring side. Blocking of the default blocked port of the node 2, which is the RPL owner, is unblocked. Before receiving the R-APS frame that provides notification of the failure in the shared link from the node 1, the node 4, which is the shared link slave node, does not transfer the R-APS frame that provides notification of the failure in the shared link. According to the failure detection in the shared link 10, when the R-APS frame is received from the ring side with the ring ID=2, which is the sub ring, according to the flow of FIG. 36, the nodes 1 and 4, which are the shared nodes, carry out the ERP processing and transfer the frame to the ring side with the ring ID=1, which is the major ring.

After the failure occurs in the shared link 10, when a failure occurs in the sub ring and multiple failures occur in the multi-ring network, a state is the same as the state illustrated in FIG. 10. Communication among the nodes is possible even while such multiple failures occur.

The state in which a failure occurs in the major ring after the failure occurs in the shared link 10 illustrated in FIG. 14 is described. In the example illustrated in FIG. 14, after the failure occurs in the shared link 10 as illustrated in FIG. 13, a failure occurs between the node 2 and the node 1 in the major ring. The shared link 10 performs failure processing in the major ring. However, when a failure occurs anew between the node 2 and the node 1 in a place other than the shared link 10 of the major ring, ports in which the failure between the nodes 1 and 2 is detected are blocked. The R-APS(SF) frame is transmitted from the nodes 1 and 2 to the major ring. At this point, the nodes 1 and 4, which are the shared nodes, determine according to the R-APS frame input from ports connected to the ring with the ring ID=1 or failure detection of the own nodes that multiple failures in the major ring occur. According to the flow illustrated in FIG. 36, the nodes 1 and 4 switch the major ring and the sub ring. Consequently, the ring with the ring ID=2 becomes the major ring. The R-APS(SF) frame for failure detection in the shared link is output from the node 1, which is the shared link master node, to the ports on the ring side with the ring ID=2. Blocking of the node 6, which is the RPL owner on the ring side with the ring ID=2, is unblocked. Before receiving the R-APS frame that provides notification of the failure in the shared link from the node 1, the node 4, which is the shared link slave node, does not transfer the R-APS frame that provides notification of the failure in the shared link. In the nodes 1 and 4, because the failure occurs in the shared link 10, the R-APS frame received from the ports on the ring side with the ring ID=1 is transferred to the ring side with the ring ID=2. Communication among the nodes is possible even during multiple failures described above.

Figure 38:
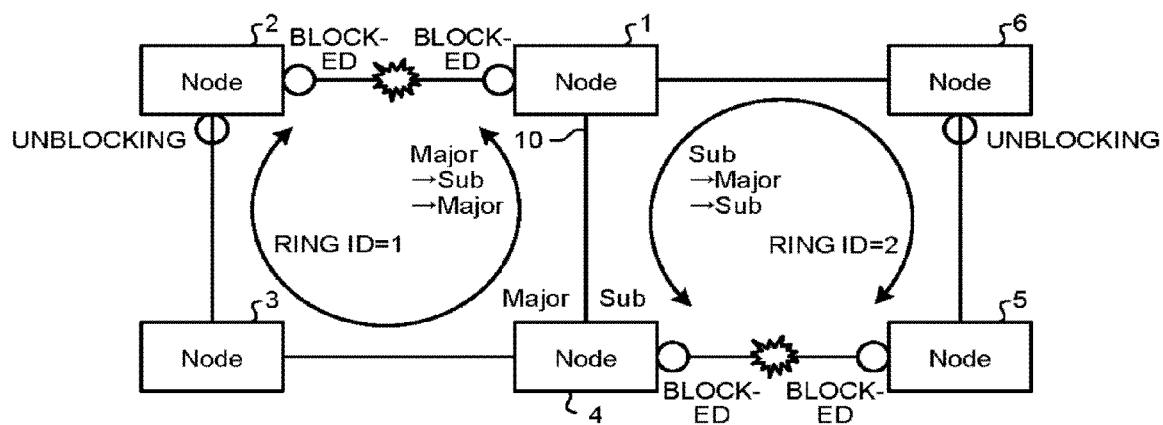
FIG. 38 is a diagram illustrating a state in which failures simultaneously occur other than in the shared links of a major ring and a sub ring.

FIG. 38 is a diagram illustrating a state in which failures simultaneously occur other than in respective shared links in a major ring and a sub ring. In an example illustrated in FIG. 38, the ring with the ring ID=1 is set as the major ring before a failure occurs. In this state, failures occur between the node 2 and the node 1 in the major ring and between the node 4 and the node 5 in the sub ring. As illustrated in FIG. 38, because the failures occur in both the rings, failure detection ports are blocked. The R-APS(SF) frame is transmitted from the nodes 1, 2, 4, and 5. Blocking of default blocked ports of the node 2 and the node 6, which are the RPL owners, is unblocked. According to the failure detection in the own nodes, the nodes 1 and 4, which are the shared nodes, determine that a failure occurs in the ring ID=1 on the major ring side and switches the major and the sub according to the flow of FIG. 36. On the other hand, the node 4 determines that a failure occurs in the ring ID=2 on the sub ring side and does not switch the major and the sub according to the flow of FIG. 36. At this point, ring IDs of the major ring and the sub ring are different in the nodes 1 and 4, which are the shared nodes.

Thereafter, according to the R-APS frame input from the ports connected to the ring ID=2 and according to the R-APS frame input from the ports connected to the ring ID=1, the node 1 and the node 4 respectively determine that the failures occur in both the rings. According to the flow of FIG. 36, when the ring ID=1 is set as a ring with high priority in advance, the nodes 1 and 4 set the ring ID=1 as the major and set the ring ID=2 as the sub. In the shared nodes, the nodes 1 and 4 carry out, on the rings, the ERP processing for the ring corresponding to the ring ID of the frame (e.g., if the ring is the ring with the ring ID=1, the ERP processing unit 22-1 carries out the ERP processing). The nodes 1 and 4 give information for identifying a new major ring or a new sub ring (after the switching) (major/sub identification information) to the R-APS frame and transfer the R-APS frame to the ports to which the shared link 10 is connected. When major/sub identification information in the R-APS frame received from the shared link 10 is the information before the switching, the nodes 1 and 4 update the major/sub identification information to values after the switching. After carrying out the ERP processing for a ring corresponding to the ring ID of the frame, the nodes 1 and 4 transfer the R-APS frame to ports connected to the ring with the ring ID.

As described above, in this embodiment, when a failure occurs in the shared link in the two ring networks, the ring ID of the major ring of the shared link master node is set as the major ring in the shared link slave node as well. The priority of the ring IDs is set in advance and, when multiple failures occur in the major ring and the sub ring other than in the shared link, the ring ID with high priority is set as the major ring. Therefore, in the shared link master node and the shared link slave node that terminate the shared link, the ring ID of the major ring that manages a failure in the shared link matches. When a failure in the shared link occurs, it is possible to normally set a bypass. Even when multiple failures occur, it is possible to continue communication. By instructing this switching using a field of Reserved 2 in the R-APS frame, it is possible to obtain the effects described above with fewer circuits and a less processing amount.

Fifth Embodiment

Figure 39:
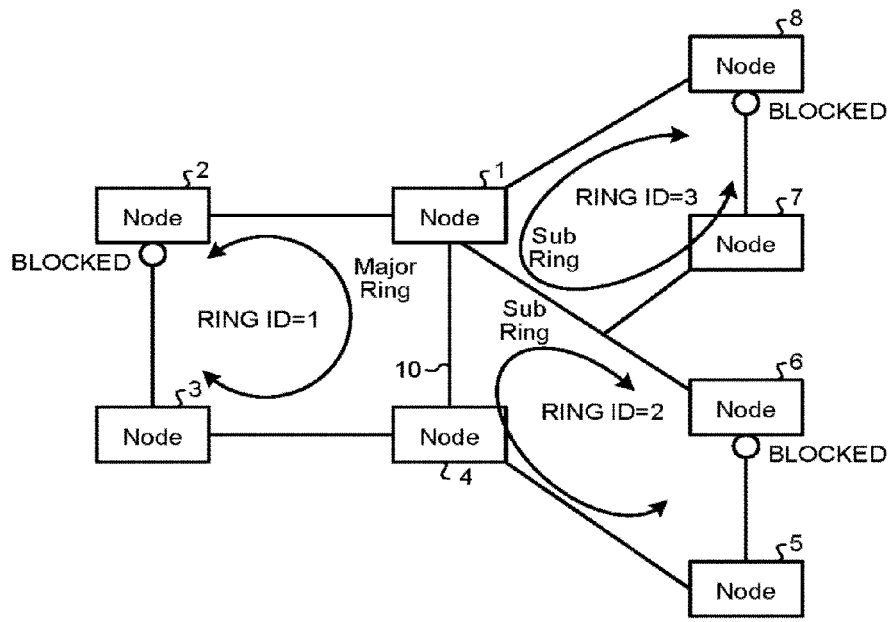
FIG. 39 is a diagram illustrating an example configuration of a multi-ring network in a fifth embodiment.

FIG. 39 is a diagram illustrating an example configuration of a multi-ring network in a fifth embodiment of the present invention. As illustrated in FIG. 39, the multi-ring network in this embodiment includes a ring with a ring ID=1, a ring with a ring ID=2, and a ring with a ring ID=3. In an example illustrated in FIG. 39, the shared link 10 is shared by the three rings with the ring IDs=1, 2, and 3. In the example illustrated in FIG. 39, the ring with the ring ID=1 is set as a major ring and the ring with the ring IDs=2 and 3 are set as sub rings in advance.

The ring with the ring ID=1 includes the nodes 1, 2, 3, and 4. The ring with the ring ID=2 includes the nodes 1, 4, 5, and 6. The ring with the ring ID=3 includes the nodes 1, 4, 7, and 8. The rings are connected to one another via the nodes 1 and 4, which are shared nodes that share the three rings each other. A link that connects the nodes 1 and 4 belonging to the three rings is the shared link 10.

As illustrated in FIG. 39, the node 1 is set in advance as a shared link master node that determines the major ring that performs the failure management for the shared link and the node 4 is set as a slave node that determines, following the major ring determined by the master node, the major ring that performs the failure management of the shared link. The shared link master node and the slave node can be determined in any way. For example, the shared link master node and the slave node can be determined by comparing information such as node IDs.

Note that, in FIG. 39, the multi-ring network including the eight apparatuses including the two shared nodes is illustrated as an example. However, the number of nodes connected to the rings is not limited to this. In FIG. 39, a structure in which three ring networks are connected is illustrated. However, the present invention is also applicable to a structure in which four or more ring networks are connected. The present invention is also applicable when three or more shared nodes are connected to the shared link 10.

Each of the nodes 1 to 8 includes a plurality of ports. The ports of the nodes adjacent to one another are connected to form the rings and the multi-ring network is configured. In the multi-ring network illustrated in FIG. 39, the nodes 1 and 4, which are the shared nodes, include four or more ports. The other nodes 2, 3, 5, 6, 7, and 8 include two or more ports.

The nodes 2, 6, and 8 operate as RPL owner nodes of ERP. The other nodes 1, 3, 4, 5, and 7 operate as non-RPL owner nodes of the ERP. Concerning setting of an RPL owner and setting and unblocking of a blocked port, operations conforming to the ERP standard of the related art are performed.

Like the rings with the ring IDs=1 and 2 in the first embodiment, the rings with the ring IDs=1, 2, and 3 operate specific one link in the ring networks in a logically disconnected state to prevent a loop frame from occurring in the rings. In the ring network illustrated in FIG. 39, a port of the node 2 on the node 3 side, a port of the node 6 on the node 5 side, and a port of the node 8 on the port 7 side are set as BPs.

The nodes 1 and 4 in this embodiment have a configuration same as the configuration of the shared nodes (the shared link termination nodes) in the first embodiment except that the nodes 1 and 4 include an ERP control unit 14c instead of the ERP control unit 14 of the shared node (the shared link termination node) in the first embodiment illustrated in FIG. 2. Components having functions same as the functions in the first embodiment are denoted by the reference numerals and signs same as the reference numerals and signs in the first embodiment and redundant explanation of the components is omitted. Differences from the first embodiment are described below.

The ERP control unit 14c in the shared nodes in this embodiment includes a multi-ring managing unit 21c and the ERP processing units 22-1 to 22-3 same as those in the third embodiment. In this way, the ERP control unit 14c includes ERP processing units equivalent to the number of shared ring networks. The ERP processing units manage a failure state and the like for each of rings. The multi-ring managing unit 21c manages a plurality of ERP processing units in order to avoid division of a network due to multiple failures in the multi-ring network.

Figure 40:
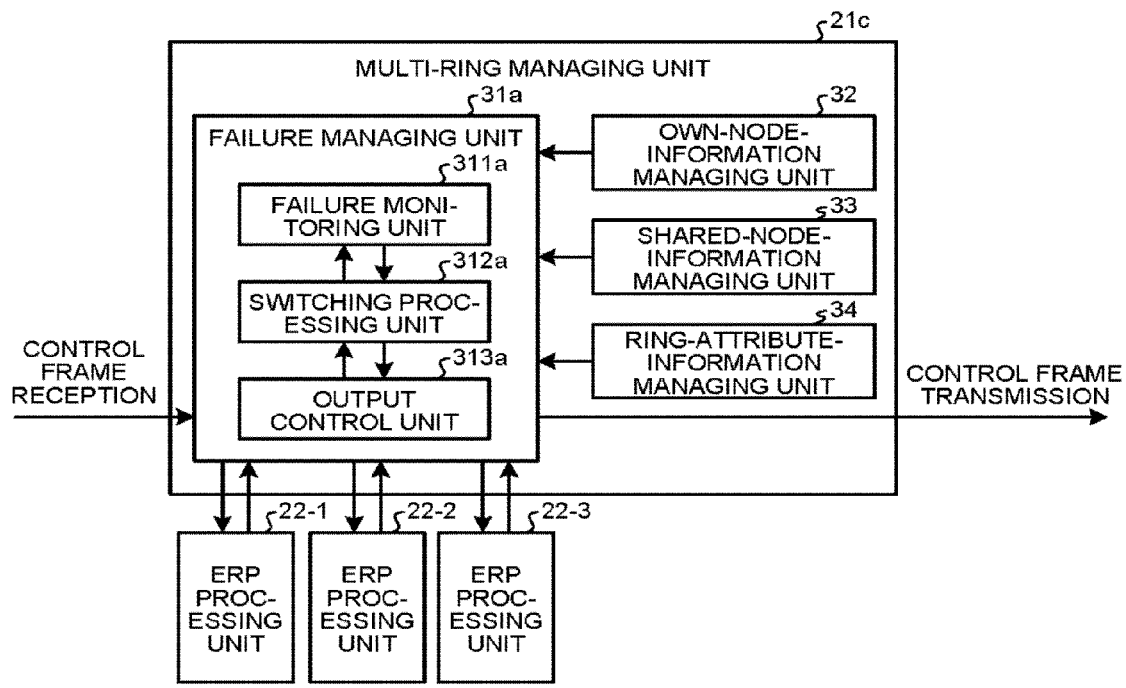
FIG. 40 is a diagram illustrating an example configuration of a multi-ring managing unit in the fifth embodiment.

The example configuration of the multi-ring managing unit 21c of the nodes 1 and 4, which are the shared link termination nodes, is as illustrated in FIG. 40. A processing flow of the nodes other than the shared nodes is the same as the flow in the first embodiment. A format of an R-APS frame used in this embodiment is also the same as the format in the first embodiment.

FIG. 40 is a diagram illustrating an example configuration of the multi-ring managing unit 21c in this embodiment. The multi-ring managing unit 21c is the same as the multi-ring managing unit 21 in the fourth embodiment except that the multi-ring managing unit 21c includes, instead of the failure managing unit 31, a failure managing unit 31a that controls three ERP processing units 22-1 to 22-3 and the ring-attribute-information managing unit 34 same as that in the fourth embodiment is added. The failure managing unit 31a includes a failure monitoring unit 311a, a switching processing unit 312a, and an output control unit 313a. The failure monitoring unit 311a discriminates presence or absence of a failure occurrence ring among the rings with the ring IDs=1, 2, and 3 shared by the shared nodes and presence or absence of a failure in the shared link 10 from own node information, shared node information, ring attribute information, information stored in the R-APS frame when a failure occurs in the multi-ring network, and port information (information concerning ports that receive the R-APS frame).

The switching processing unit 312a switches ring IDs corresponding to the sub ring and the major ring, for example, when a failure other than a failure in the shared link occurs in the major ring, when a failure occurs other than in the shared link in the major ring after the failure occurs in the shared link, when information concerning the major ring does not match in the master node and the slave node that terminate the shared link, or when failures other than a failure in the shared link occur in all the rings including the shared link. However, in this embodiment, because a plurality of sub rings are present, it is determined which of the sub rings is changed to the major ring. Among the sub rings, a ring in which a failure does not occur is selected. When a plurality of rings are selected, for example, one ring is selected according to order set in advance (e.g., an ascending order of ring IDs) and is set as the major ring. Note that, when failures in the multi-ring simultaneously occur in the rings, timing for receiving the R-APS frame that provides notification of the failures is different in the shared nodes at both ends of the shared link. Therefore, it is likely that the recognition of the major ring and the sub ring is different in the shared nodes at both the ends. To avoid this, when a failure occurs in the shared link, the slave node adjusts identification information of the major/sub rings of the shared link of the own node to identification information of the major/sub rings of the shared link in the master node to match the recognition of the major ring and the sub ring in the shared nodes at both the ends of the shared link.

The output control unit 313a performs transfer/transmission processing for the R-APS frame on the basis of failure states of the three rings and the shared link and a result of the switching processing.

Figure 41:
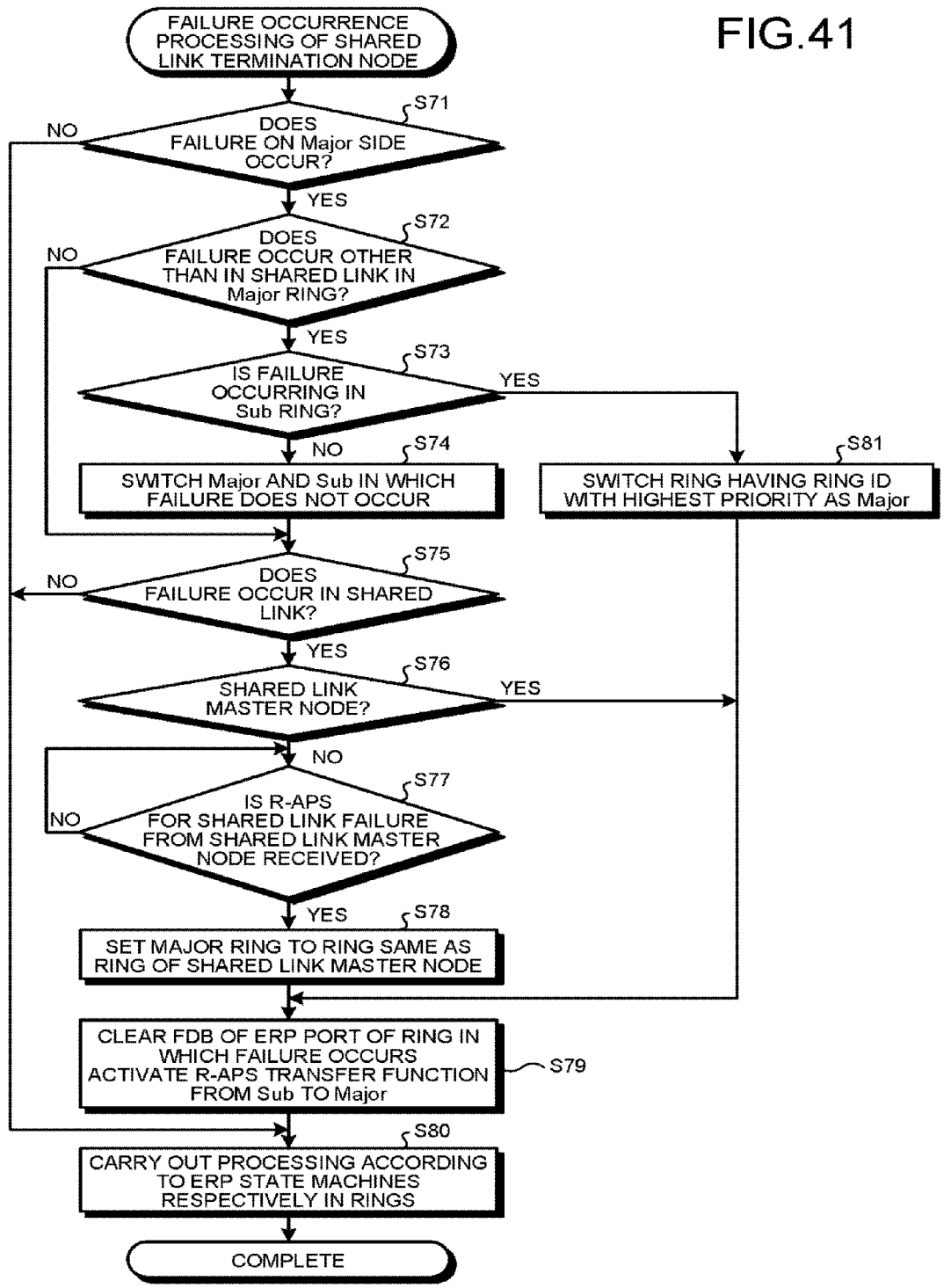
FIG. 41 is a flowchart illustrating an example of a processing (failure occurrence processing) procedure performed in the multi-ring managing unit in the fifth embodiment when a failure is detected.

Processing performed in the multi-ring managing unit 21c of the shared node when a failure is detected anew is described. FIG. 41 is a flowchart illustrating an example of a processing (failure occurrence procedure) processing performed in the multi-ring managing unit 21c when a failure is detected. Note that, when a shared link intermediate node is present, the shared node other than the shared link intermediate node, that is, a shared link termination node that terminates the shared link carries out the failure occurrence processing.

As illustrated in FIG. 41, first, the multi-ring managing unit 21c determines whether a failure occurs on the Major side (step S71). Specifically, the multi-ring managing unit 21c determines on the basis of the R-APS frame received from a node belonging to the major ring whether a failure occurs in the major ring.

When a failure occurs on the Major side (Yes at step S71), the multi-ring managing unit 21c determines whether a failure occurs other than in the shared link (step S72). Whether a failure occurs in the shared link can be determined on the basis of the retained shared node information and the R-APS frame. When a failure occurs other than in the shared link (Yes at step S72), the multi-ring managing unit 21c determines whether a failure is occurring in the sub rings (step S73). The multi-ring managing unit 21 manages failure occurrence states of the sub rings on the basis of the R-APS frame received from nodes belonging to the sub rings. Consequently, it is possible to determine whether a failure is occurring in the sub rings.

When a failure is not occurring in all the sub ring (No at step S73), the multi-ring managing unit 21c switches Major and Sub with respect to the sub rings in which a failure does not occur (step S74). That is, in the state illustrated in FIG. 29, the multi-ring managing unit 21c changes the ring with the ring ID=1, which is the major ring, to the sub ring and changes the ring with the ring ID=2, which is the sub ring, to the major ring.

When failures are occurring in all the sub rings (Yes at step S73), failures occur other than in the shared link in all the rings belonging to the shared link. Therefore, the multi-ring managing unit 21c sets, as the major ring, a ring having a ring ID with high priority determined in advance (step S81) and proceeds to step S79. For example, when the priority of the ring IDs is (the ring ID=1)>(the ring ID=2) >(the ring ID=3), the multi-ring managing unit 21b sets the ring ID=1 as the major ring and the ring IDs=2 and 3 as the sub rings.

After step S74, the multi-ring managing unit 21c determines whether a failure occurs in the shared link (step S75). When a failure occurs in the shared link (Yes at step S75), the multi-ring managing unit 21c determines whether the own node is the shared link master node or the slave node (step S76). When the own node is not the shared link master node (is the slave node) (No at step S76), the multi-ring managing unit 21c determines whether the R-APS frame due to a failure in the shared link is received from the master node (step S77). When the R-APS frame due to the failure in the shared link is received from the master node (Yes at step S77), the multi-ring managing unit 21c sets the major ring to a ring ID same as the ring ID of the shared link master node (step S78). The identification of the major ring is determined according to information stored in the R-APS frame due to the failure in the shared link received from the master node. When determining at step S77 that the R-APS frame due to the failure in the shared link is not received from the master node (No at step S77), the multi-ring managing unit 21c returns to step S77.

According to the above processing, after the major ring that manages a failure in the shared link matches in the shared link master node and the slave node, the multi-ring managing unit 21c clears an FDB of an ERP port of the major ring and activates a transfer function of the R-PS frame from the sub ring to the major ring (step S79). By activating the transfer function in both the rings, it is possible to transfer, through the major ring, a frame that cannot be transferred because of a failure in the shared link on the sub ring side because the failure occurs in the shared link. Note that, in the rings, as usual, in an initial state, a received frame and a port number are registered in FDBs and transfer is performed using the FDBs.

Subsequently, the multi-ring managing unit 21c carries out processing according to ERP state machines in each of the rings and ends the processing (step S80). The processing performed according to the ERP state machines is the same as the processing in the past. Therefore, detailed explanation of the processing is omitted.

When a failure does not occur on the Major side (No at step S71), the multi-ring managing unit 21c proceeds to step S80. The multi-ring managing unit 21c performs processing according to the respective ERP state machines in the rings. When a failure does not occur other than in the shared link of the major ring at step S72 (No at step S72), the multi-ring managing unit 21c proceeds to step S75. When a failure does not occur in the shared link (No at step S75), the multi-ring managing unit 21c proceeds to step S80. When it is determined at step S76 that the own node is the shared link master node (Yes at step S76), the multi-ring managing unit 21c proceeds to step S79.

The operations of the nodes in this embodiment are described. First, operation performed when a failure does not occur in the multi-ring network is described. Any one of the rings with the ring IDs=1, 2, or 3 is set as the major ring and the remaining rings are set as the sub rings in advance. As illustrated in FIG. 39, the ring with the ring ID=1 is set as the major ring and the rings with the ring IDs=2 and 3 are set as the sub rings. As illustrated in FIG. 39, one ports of the node 2, the node 6, and the node 8, which are the RPL owners of the rings are blocked. The R-APS(NR, RB) frame meaning no failure detection is transmitted from the RPL owners. After carrying out, on the R-APS frame input from the ports connected to the rings, the ERP processing for a ring with a ring ID stored in the R-APS frame, the shared nodes of the nodes 1 and 4 transfer the frame to the ports to which the shared link 10 is connected. After carrying out, on the R-APS frame received from the shared link 10, the ERP processing for a relevant ring ID in the same manner, the shared nodes transfer the R-APS frame to the ports to which a ring at a transfer destination is connected.

The example illustrated in FIG. 27 is described in which failures occur between the node 1 and the node 8 of the ring with the ring ID=3, which is the sub ring, and between the node 4 and the node 5 of the ring with the ring ID=2, which is the sub ring. In the example illustrated in FIG. 27, because a failure does not occur on the major ring side, one port of the node 2, which is the RPL owner of the ring, is blocked. The R-APS(NR, RB) frame meaning no failure detection is transmitted from the RPL owner. On the other hand, failures occur between the nodes 4 and 5 and between the nodes 1 and 8 on the sub ring side. Therefore, failure detection ports are blocked. The R-APS(SF) frame is transmitted from the nodes 4, 5, 1, and 8. Blocking of the blocked ports of the nodes 6 and 8, which are the RPL owners, is unblocked. After carrying out, on the R-APS frame input from the ports connected to the rings, the ERP processing for the ring with the ring ID in the frame, the nodes 1 and 4, which are the shared nodes, transfer the frame to the ports to which the shared link 10 is connected. After carrying out, on the R-APS frame received from the shared link 10, the ERP processing for the ring ID in the frame in the same manner, the nodes 1 and 4 transfer the R-APS frame to the ports connected to the ring with the ring ID.

As described above, when a failure does not occur and when a failure occurs in the sub ring, operations are performed in the rings in the same manner as the ERP of a normal single ring except that the ring ID is discriminated.

The example illustrated in FIG. 28 is described in which a failure occurs in the shared link after a failure occurs in the sub ring. In the example illustrated in FIG. 28, after the failure occurs in the sub ring as illustrated in FIG. 27, a failure further occurs in the shared link 10. As illustrated in FIG. 28, when a failure occurs in the shared link 10, the ports of the nodes 1 and 4, which are the shared nodes, on the shared link 10 side are blocked. Blocking of one port of the node 2, which is the RPL owner of the major ring, is unblocked. When the shared nodes receive the R-APS frame on the sub ring side, because the failure occurs in the shared link 10, the R-APS frame is transferred to the major ring side. Communication among the nodes is possible even during such multiple failures.

The example illustrated in FIG. 29 is described, in which a failure occurs in the major ring. In the example illustrated in FIG. 29, a failure occurs between the node 3 and the node 4 of the ring ID=1, which is the major ring. As illustrated in FIG. 29, a failure does not occur in the rings with the ring IDs=2 and 3, which are the sub rings. Therefore, one ports of the nodes 6 and 8, which are the RPL owner of the ring, are blocked. The R-APS(NR, RB) frame meaning no failure detection is transmitted. On the other hand, in the ring with the ring ID=1 which is the major ring, a failure occurs between the nodes 3 and 4. Therefore, failure detection ports are blocked. The R-APS(SF) frame is transmitted from the nodes 3 and 4. Blocking of the default blocked port of the node 2, which is the RPL owner, is unblocked. The nodes 1 and 4, which are the shared nodes, determine according to the R-APS frame input from the ports connected to the rings or failure detection of the own nodes that a failure occurs on the major ring side. The nodes 1 and 4 switch the major and the sub between the rings with the ring ID=1 and the ring ID=2 according to the flow of FIG. 41. The nodes 1 and 4 carry out, on the received R-APS frame, the ERP processing for a ring corresponding to a ring ID of the frame; give major/sub identification information after the switching to the R-APS frame; and transfer the R-APS frame to the ports to which the shared link 10 is connected. When detecting a failure in the own nodes, the nodes 1 and 4 transmit, to the ring corresponding to the failure, the R-APS frame that provides notification of failure occurrence given with the major/sub identification information after the switching. When the major/sub identification information in the frame received from the shared link 10 is the information after the switching, the nodes 1 and 4 update the major/sub identification information to values after the switching. After carrying out the ERP processing for a ring corresponding to the ring ID of the frame, the nodes 1 and 4 transfer the R-APS frame to ports connected to the ring with the ring ID.

The example illustrated in FIG. 30 is described in which, after the switching of the sub ring and the major ring due to the failure illustrated in FIG. 29, a failure occurs in the shared link 10 and a failure further occurs in the major ring. In the example illustrated in FIG. 30, the switching is performed according to the failure occurrence in the major ring as described with reference to FIG. 29, a failure further occurs in the shared link 10, and thereafter a failure further occurs between the nodes 4 and 5 of the major ring. When the failure occurs in the shared link 10, the ports of the nodes 1 and 4, which are the shared nodes, on the shared link 10 side are blocked. The R-APS frame that provides notification of the failure in the shared link is transmitted from the node 1, which is the shared link master node, to the ring ID=2, which is a new major ring side. Blocking of a default blocked port of the node 6, which is the RPL owner, is unblocked. Before receiving the R-APS frame that provides notification of the failure in the shared link from the node 1, the node 4, which is the shared link slave node, does not transfer the R-APS frame that provides notification of the failure in the shared link. According to the failure detection in the shared link 10, when the R-APS frame is received from the ring side with the ring ID=1, which is the sub ring, according to the flow of FIG. 41, the nodes 1 and 4, which are the shared nodes, carry out the ERP processing and transfer the frame to the ring side with the ring ID=2, which is the major ring.

Further, thereafter, as illustrated in FIG. 30, when a failure occurs in the nodes 4 and 5 of the major ring, the major and the sub are switched between the rings with the ring ID=2 and the ring ID=3. Consequently, blocking of one port of the node 8, which is the RPL owner of the major ring after the switching, is unblocked. When the shared nodes receive the R-APS frame from the rings with the ring IDs=1 and 2, which are the sub rings, because the failure occurs in the shared link 10, the shared nodes transfer the R-APS frame to the ring side with the ring ID=3, which is the major ring. Communication among the nodes is possible even during such multiple failures.

The example illustrated in FIG. 31 is described in which a failure occurs in the shared link 10 in a state without a failure. In the example illustrated in FIG. 31, a failure occurs in the shared link 10 in the state without a failure illustrated in FIG. 39. As illustrated in FIG. 31, a failure does not occur in the rings with the ring IDs=2 and 3, which are the sub rings. Therefore, one ports of the nodes 6 and 8, which are the RPL owners of the ring, are blocked. The R-ARP(NR, RB) frame meaning no failure detection is transmitted. On the other hand, in the ring with the ring ID=1, which is the major ring, a failure occurs between the nodes 1 and 4, which are the shared nodes. Therefore, failure detection ports are blocked. The R-APS(SF) frame is transmitted from the node 1, which is the shared link master node. Blocking of the default blocked port of the node 2, which is the RPL owner, is unblocked. Before receiving the R-APS frame that provides notification of the failure in the shared link from the node 1, the node 4, which is the shared link slave node, does not transfer the R-APS frame that provides notification of the failure in the shared link. According to the failure detection in the shared link 10, when the R-APS frame is received from the ring with the ring ID=2, which is the sub ring, according to the flow of FIG. 41, the nodes 1 and 4, which are the shared nodes, carry out the ERP processing and transfer the RS-APS frame to the ring with the ring ID=1, which is the major ring.

After the failure occurs in the shared link 10, when a failure occurs in the sub ring and multiple failures occur in the multi-ring network, a state is the same as the state illustrated in FIG. 28. Communication among the nodes is possible even during such multiple failures.

The example illustrated in FIG. 32 is described, in which a failure occurs in the major ring after the failure occurs in the shared link 10. In the example illustrated in FIG. 32, after the failure occurs in the shared link 10 as illustrated in FIG. 31, a failure occurs between the nodes 1 and 2 of the ring with the ring ID=1, which is the major ring. The shared link performs failure processing in the major ring. However, when a failure occurs anew between the nodes 1 and 2 in a place other than the shared link of the major ring, ports in which the failure between the nodes 1 and 2 is detected are blocked. The R-APS(SF) frame is transmitted from the nodes 1 and 2 to the major ring. At this point, the nodes 1 and 4, which are the shared nodes, determine according to the R-APS frame input from ports connected to the ring with the ring ID=1 or failure detection of the own nodes that multiple failures in the major ring occur. According to the flow illustrated in FIG. 41, the nodes 1 and 4 switch the major ring and the sub ring between the rings with the ring ID=1 and the ring ID=2. Consequently, the ring with the ring ID=2 becomes the major ring. The R-APS(SF) frame for failure detection in the shared link is output from the nodes 1 and 4, which are the shared nodes, to the ports on the ring side with the ring ID=2. Blocking of the node 6, which is the RPL owner on the ring side with the ring ID=2, is unblocked. In the nodes 1 and 4, because the failure occurs in the shared link, the R-APS frame received from the ports on the ring side with the ring ID=1 is transferred to the ring side with the ring ID=2.

The example illustrated in FIG. 33 is described in which a failure further occurs in the major ring after the failure occurrence illustrated in FIG. 32. In the example illustrated in FIG. 33, after the failure occurs in the shared link 10, a failure occurs between the nodes 1 and 2 of the ring with the ring ID=1, which is the major ring and a failure further occurs between the nodes 4 and 5 of the ring with the ring ID=2, which is the major ring at that point. The shared link performs failure processing in the major ring. However, when a failure occurs anew between the nodes 4 and 5 in a place other than the shared link of the major ring, ports in which the failure between the nodes 4 and 5 is detected are blocked. The R-APS(SF) frame is transmitted from the nodes 4 and 5 to the ring with the ring ID=2, which is the major ring. At this point, the nodes 1 and 4, which are the shared nodes, determine according to the R-APS frame input from ports connected to the ring with the ring ID=2; or failure detection of the own nodes that multiple failures in the major ring occur. According to the flow illustrated in FIG. 41, the nodes 1 and 4 switch the major ring and the sub ring between the rings with the ring ID=2 and the ring ID=3. Consequently, the ring with the ring ID=3 becomes the major ring. The R-APS(SF) frame for failure detection in the shared link 10 is output from the nodes 1 and 4, which are the shared nodes, to the ports on the ring ID=3 side. Blocking of the node 8, which is the RPL owner of the ring with the ring ID=3, is unblocked. In the nodes 1 and 4, because the failure occurs in the shared link 10, the R-APS frame received from the ports on the ring sides with the ring IDs=1 and 2 is transferred to the ring ID=3 side. Communication among the nodes is possible even during multiple failures described above.

Figure 42:
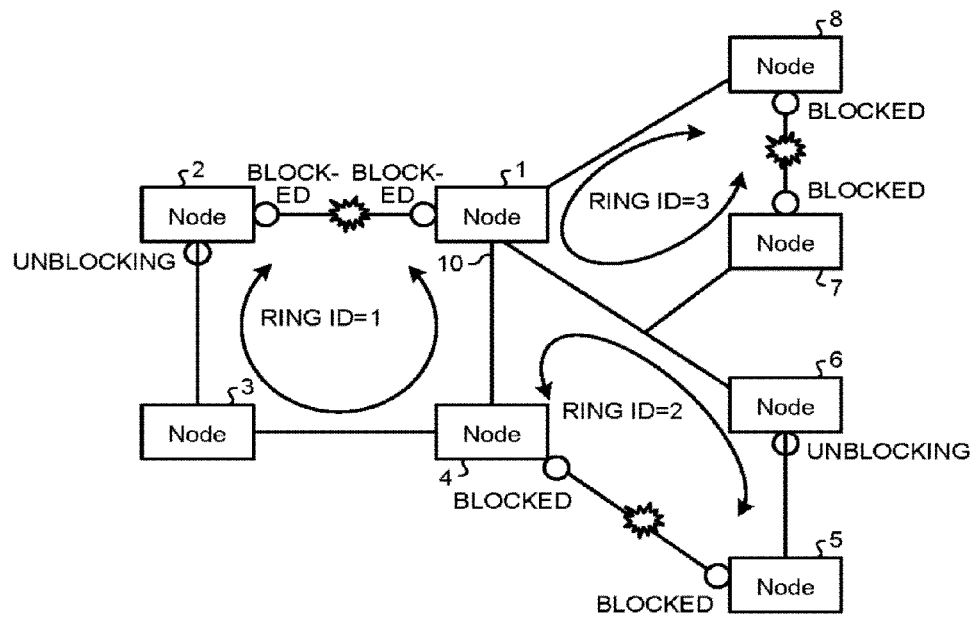
FIG. 42 is a diagram illustrating a state in which failures simultaneously occur in all rings other than the shared link.

FIG. 42 is a diagram illustrating a state in which failures simultaneously occur in all the rings other than the shared link. When failures simultaneously occur between the nodes 1 and 2 of the ring ID=1; between the nodes 4 and 5 of the ring ID=2; and between the nodes 7 and 8 of the ring ID=3, as illustrated in FIG. 42, failure detection ports are blocked. The R-APS(SF) frame is transmitted from the nodes 1, 2, 4, 5, 7, and 8. Blocking of the default blocked ports of the node 2 and the node 6, which are the RPL owners, is unblocked. The node 1, which is the shared master node, determines according to failure detection of the own node that a failure occurs in the ring ID=1 on the major ring side and switches the major ring to the ring ID=2 according to the flow of FIG. 41. The node 4, which is the node shared slave node, determines according to failure detection of the own node that a failure occurs in the ring ID=2 on the major ring side and keeps the major ring in the ring ID=1 according to the flow of FIG. 41. At this point, ring IDs of the major ring are different in the nodes 1 and 4 that are the shared nodes.

Thereafter, both of the node 1 and the node 4 determine that failures other than a failure in the shared link occur in all the rings. When the ring ID=1 is set as a ring with high priority, according to the flow of FIG. 41, the node 1 switches the major ring to the ring ID=1 and the node 4 keeps the major ring in the ring ID=1. Consequently, the major rings of the shared master node and the shared slave node coincide with each other. In the shared nodes, the nodes 1 and 4 carry out, on the rings, the ERP processing for the ring corresponding to the ring ID of the frame (e.g., if the ring is the ring with the ring ID=1, the ERP processing unit 22-1 carries out the ERP processing). The nodes 1 and 4 give information for identifying a new major ring or a new sub ring (after the switching) (major/sub identification information) to the R-APS frame and transfer the R-APS frame to the ports to which the shared link 10 is connected. When major/sub identification information in the R-APS frame received from the shared link 10 is the information before the switching, the nodes 1 and 4 update the major/sub identification information to values after the switching. After carrying out the ERP processing for a ring corresponding to the ring ID of the frame, the nodes 1 and 4 transfer the R-APS frame to ports connected to the ring with the ring ID.

As described above, in this embodiment, the configuration in which the three rings share the one shared link is referred to as an example and, as in the fourth embodiment, when a failure occurs in the shared link, the ring ID of the major ring of the shared link master node is set as the major ring in the shared link slave node as well. The priority is set in advance and, when multiple failures occur other than in the shared link in all the rings, the ring ID with high priority is set as the major ring. Therefore, in the shared link master node and the shared link slave node that terminate the shared link, the ring ID of the major ring that manages a failure in the shared link matches. When a failure in the shared link occurs, it is possible to normally set a bypass. Even when multiple failures occur, it is possible to continue communication. By instructing this switching using a field of Reserved 2 in the R-APS frame, it is possible to obtain the effects described above with fewer circuits and a less processing amount.

Sixth Embodiment

Figure 43:
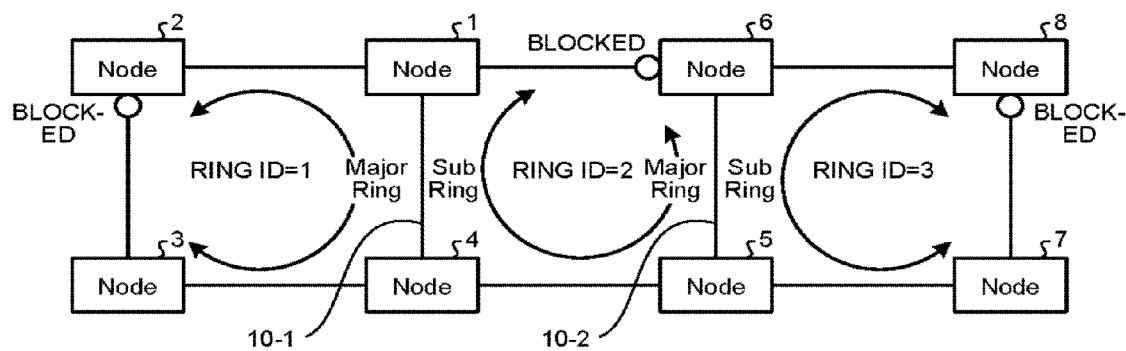
FIG. 43 is a diagram illustrating an example configuration of a multi-ring network in a sixth embodiment.

FIG. 43 is a diagram illustrating an example configuration of a multi-ring network in a sixth embodiment of the present invention. As illustrated in FIG. 43, the multi-ring network in this embodiment includes a ring with a ring ID=1, a ring with a ring ID=2, and a ring with a ring ID=3. In the multi-ring network illustrated in FIG. 43, shared links in two places, i.e., a shared link 10-1 and a shared link 10-2 are present. Concerning the shared link 10-1, the ring with the ring ID=1 is set as a major ring; and the ring with the ring ID=2 is set as a sub ring in advance. Concerning the shared link 10-2, the ring with the ring ID=2 is set as the major ring and the ring with the ring ID=3 is set as the sub ring in advance.

The ring with the ring ID=1 includes the nodes 1, 2, 3, and 4. The ring with the ring ID=2 includes the nodes 1, 4, 5, and 6. The ring with the ring ID=3 includes the nodes 5, 6, 7, and 8. The three rings are connected to one another via the nodes 1 and 4, which are shared nodes shared by the ring IDs=1 and 2 each other, and the nodes 5 and 6, which are shared nodes shared by the ring IDs=2 and 3 each other. Note that, in FIG. 43, the multi-ring network including the eight nodes including the four shared nodes is illustrated. However, the number of nodes connected to the rings is not limited to this. In FIG. 43, a structure in which the three ring networks are connected is illustrated. However, this embodiment is also applicable to a structure in which four or more ring networks are connected. Further, this embodiment is also applicable when three or more shared nodes are connected to the shared link.

Each of the nodes 1 to 8 includes a plurality of ports. The ports of the nodes adjacent to one another are connected to form rings and the multi-ring network is configured. In the multi-ring network illustrated in FIG. 43, the nodes 1, 4, 5, and 6, which are shared nodes, include three or more ports. The other nodes 2, 3, 7, and 8 include two or more ports.

The nodes 2, 6, and 8 operate as nodes of an RPL owner of ERP. The other nodes 1, 3, 4, 5, and 7 operate as nodes of a non-RPL owner of the ERP. Concerning setting of the RPL owner and setting and unblocking of a blocked port, operation conforming to the ERP standard in the related art is performed.

Like the rings with the ring IDs=1 and 2 in the first embodiment, the rings with the ring IDs=1, 2, and 3 operate specific one link in the ring networks in a logically disconnected state to prevent a loop frame from occurring in the rings. In the ring network illustrated in FIG. 43, a port of the node 2 on the node 3 side, a port of the node 6 on the node 1 side, and a port of the node 8 on the node 7 side are set as BPs.

The nodes, 1, 4, 5, and 6 in this embodiment has a configuration same as the configuration of the shared node (the shared link termination node) in the first embodiment as illustrated in FIGS. 2 and 3. The configuration of the nodes (the nodes 2, 3, 7, and 8) other than the shared node in this embodiment is the same as the configuration of the nodes other than the shared nodes in the first embodiment.

Figure 44:
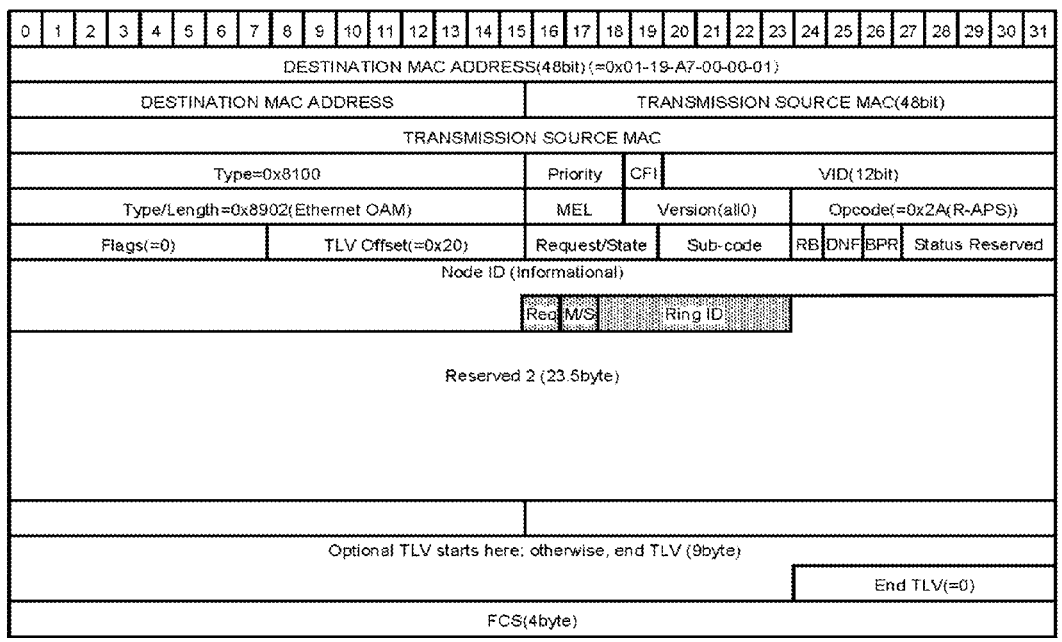
FIG. 44 is a diagram illustrating an example of a format of an R-APS frame for giving notification of a failure state in the sixth embodiment.

FIG. 44 is a diagram illustrating an example of a format of an R-APS frame for giving notification of a failure state in this embodiment. As illustrated in FIG. 44, in the R-APS frame of the ERP specified by ITU-T G.8032, in addition to a node ID of a transmission source and blocked port information in the past, and in addition to the major/sub identification information (M/S in FIG. 44), which is identification bits for identifying whether a ring is a major ring or a sub ring, and the ring ID (Ring ID in FIG. 44) indicating a ring to which a node at a transmission source belongs described in the first embodiment, major/sub switching request information (Req in FIG. 44) for switching major/sub to a ring capable of continuing communication through route switching even when multiple failures occur in a shared link in a plurality of rings is added to a region of Reserved 2. The information added in this embodiment is indicated by hatching in FIG. 44.

Functions of a multi-ring managing unit 21d of the nodes 1, 4, 5, and 6, which are shared link termination nodes, in this embodiment are described. FIG. 45 is a diagram illustrating an example configuration of the multi-ring managing unit 21d of the shared node in this embodiment. The multi-ring managing unit 21c includes the failure managing unit 31, the own-node-information managing unit 32, the shared-node-information managing unit 33, the ring-attribute-information managing unit 34, and an all-ring-information managing unit 35. The own-node-information managing unit 32 manages, with respect to a plurality of ring IDs of the ring network shared by the shared node (the own node), own node information, which is information concerning the own node such as a ring ID of the major ring and a port number of a port connected to the major ring, a ring ID of the sub ring and a port number of a port connected to the sub ring, and a port number of a port connected to the shared link. Note that, like the multi-ring network of ITU-_T G.8032, the major ring is a ring that determines a failure in the shared link and the sub ring is a ring that does not determine a failure in the shared link.

The shared-node-information managing unit 33 of the multi-ring managing unit 21d manages shared node information, which is information for identifying a port such as a node ID of a shared node (in the example illustrated in FIG. 43, the node 4 from the viewpoint of the node 1 or the node 1 from the viewpoint of the node 4) that terminates the shared link on the opposite side of the shared link and a port number connected to the shared node and information concerning the other shared nodes such as a node ID of a shared link intermediate node that is connected to the shared link but does not terminate the shared link. Note that, in the example illustrated in FIG. 43, the shared intermediate node is absent. However, the shared link intermediate node to which the shared links 10-1 and 10-2 are connected can be provided between the node 1 and the node 4 and between the node 5 and the node 6.

The ring-attribute-information managing unit 34 of the multi-ring managing unit 21d sets, between the own node and the shared node that terminates the shared link on the opposite side of the shared link, one as a shared link master node (hereinafter, master node) and the other as a shared link slave node (hereinafter, slave node). By setting the master node and the slave node, the ring-attribute-information managing unit 34 manages ring attribute information for identifying whether the own node is the master node or the slave node. The ring attribute information is information necessary for the shared node to control ring ID information of the major ring, which manages a failure in the shared link of the slave node, to coincide with ring ID information of the major ring of the master node.

The all-ring-information managing unit 35 of the multi-ring managing unit 21d manages, to continue communication as much as possible even when multiple failures including failures in a plurality of shared links occur, connection order of all rings of a network configured by a multi-ring and failure presence/absence information of rings capable of switching a route. FIG. 46 is a diagram illustrating an example of a ring management table. The all-ring-information managing unit 35 includes, concerning all the rings of the network configured by the multi-ring, a table, for example as illustrated in FIG. 46, for always managing the order of ring IDs and presence or absence of a failure in the rings (route switching possibility). The connection order of the ring IDs is set by some means. The presence or absence of a failure in the rings is determined by monitoring the R-APS frame cyclically received from the rings. It is determined that a ring having cyclically received an R-APS(NR, RB) from a plurality of ports has no failure, a ring having cyclically received an R-APS(SF) has a failure, and the presence or absence of a failure is unknown about a ring not receiving the R-APS.

The failure managing unit 31 of the multi-ring managing unit 21d includes a failure monitoring unit 311 that discriminates presence or absence of a failure occurrence ring and presence or absence of a failure in the shared link from the own node information, the shared node information, the ring attribute information, information stored in the R-APS frame for transferring a failure state in the multi-ring network into the network (presence or absence of a failure or a ring ID or a node ID in which a failure is detected), and port information (information concerning ports in which a failure is detected).

The failure managing unit 31 includes the switching processing unit 312 that switches ring IDs corresponding to the sub ring and the major ring, for example, when a failure occurs other than in the shared link in the major ring; when a failure occurs other than in the shared link in the major ring after the failure occurs in the shared link; or when information concerning the major ring does not match in the master node and the slave node that terminate the shared link. If failure occurrence probabilities of the links are the same, in the former case (the failure other than the failure in the shared link occurs in the major ring), by changing a ring functioning as the major ring (changing a ring ID set as the major ring), it is possible to reduce a probability of occurrence of multiple failures including a failure in the shared link in one ring. Note that, when failures in the multi-ring simultaneously occur in the rings, timing for receiving the R-APS frame that provides notification of the failures is different in the shared nodes at both ends of the shared link. Therefore, it is likely that the recognition of the major ring and the sub ring is different in the shared nodes at both the ends. To avoid this, when a failure occurs in the shared link, the slave node adjusts identification information of the major/sub rings of the shared link of the own node to identification information of the major/sub rings of the shared link in the master node to match the recognition of the major ring and the sub ring in the shared nodes at both the ends of the shared link.

The failure managing unit 31 of the multi-ring managing unit 21d always monitors the received R-APS frame and notifies the all-ring-information managing unit of the R-APS frame.

The failure managing unit 31 of the multi-ring managing unit 21*d* includes the output control unit 313 that performs transfer/transmission processing of the R-APS frame on the basis of failure states of all the rings and the shared link and a result of the switching processing.

Figure 47:
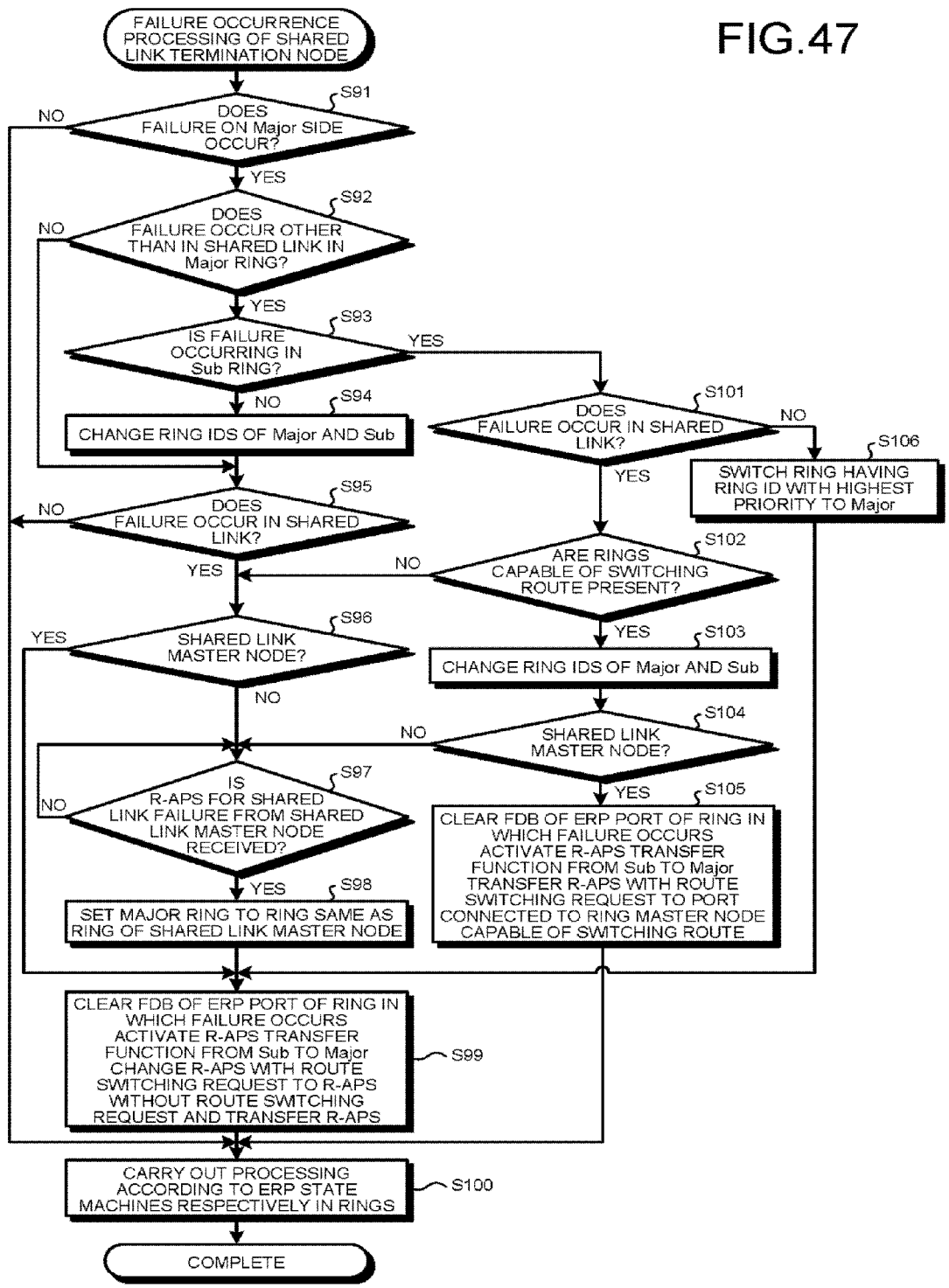
FIG. 47 is a flowchart illustrating an example of a processing (failure occurrence processing) procedure performed in the multi-ring managing unit in the sixth embodiment when a failure is detected.

Processing performed in the multi-ring managing unit 21*d* of the shared node when a failure is detected anew is described. FIG. 47 is a flowchart illustrating an example of a processing (failure occurrence processing) procedure performed in the multi-ring managing unit 21*d* when a failure is detected. Note that, when the shared link intermediate node is present, this failure occurrence processing is carried out by the shared node other than the shared link intermediate node, that is, a shared link termination node that terminates the shared link.

As illustrated in FIG. 47, first, the multi-ring managing unit 21*d* determines whether a failure occurs on the Major side (step S91). Specifically, the multi-ring managing unit 21*d* determines on the basis of the R-APS frame received from a node belonging to the major ring whether a failure occurs in the major ring.

When a failure occurs on the Major side (Yes at step S91), the multi-ring managing unit 21*d* determines whether a failure occurs other than in the shared link (step S92). Whether a failure occurs in the shared link can be determined on the basis of the retained shared node information and the R-APS frame. When a failure occurs other than in the shared link (Yes at step S92), the multi-ring managing unit 21*d* determines whether a failure is occurring in the sub ring (step S93). The multi-ring managing unit 21*d* manages a failure occurrence state of the sub ring on the basis of the R-APS frame received from a node belonging to the sub ring. Consequently, it is possible to determine whether a failure is occurring in the sub ring.

When a failure is not occurring in the sub ring (No at step S93), the multi-ring managing unit 21*d* switches Major and Sub (step S94). That is, in the state illustrated in FIG. 43, the multi-ring managing unit 21*d* changes the ring with the ring ID=1, which is the major ring, to the sub ring; and changes the ring with the ring ID=2, which is the sub ring, to the major ring.

When a failure is occurring in the sub ring as well (Yes at step S93), the multi-ring managing unit 21*d* determines whether a failure occurs in the shared link (step S101). When a failure does not occur in the shared link (No at step S101), a failure occurs other than in the shared link in both the rings belonging to the shared link. Therefore, the multi-ring managing unit 21*d* sets, as the major ring, a ring having a ring ID with high priority determined in advance (step S106). For example, when the priority of the ring IDs is (the ring ID=1)>(the ring ID=2), the multi-ring managing unit 21*d* sets the ring ID=1 as the major ring and the ring ID=2 as the sub ring. When a failure occurs in the shared link (Yes at step S101), the multi-ring managing unit 21*d* determines whether rings capable of switching a route are present (step S102). Specifically, it is determined, on the basis of a ring managing table, whether there is a ring that functions as a bypass circuit in which no failure is occurring. When rings capable of switching a route are present (Yes at step S102), the multi-ring managing unit 21*d* switches Major and Sub (step S103). The multi-ring managing unit 21*d* determines whether the own node is the shared link master node (step S104). When the own node is the shared link master node (Yes at step S104), the multi-ring managing unit 21*d* clears an FDB of an ERP port of the ring in which the failure occurs, transfers the R-APS frame, which activates a route switching request, to a port to which the shared link master node of rings capable of switching a route is connected (step S105), and proceeds to step S100.

When a failure is not occurring in the sub ring (No at step S93), the multi-ring managing unit 21*d* carries out step S94 to step S100 same as steps S44 to S50 in FIG. 36. When the rings capable of switching a route are absent (No at step S102), the multi-ring managing unit 21*d* proceeds to step S96.

According to the above processing, even when multiple failures in the shared links and in the rings occur, it is possible to continue communication by switching a route in remote rings to switch Major and Sub of the shared links.

According to the above processing, after the major ring that manages a failure in the shared link matches in the shared link master node and the slave node, FDBs of ERP ports of both the rings are cleared and a transfer function of the R-APS frame from the sub ring to the major ring is activated. By activating the transfer function in both the rings, it is possible to transfer, through the major ring, a frame that cannot be transferred because of a failure in the shared link on the sub ring side because the failure occurs in the shared link. Note that, in the rings, in an initial state, a received frame and a port number are registered in the FDBs and transfer is performed using the FDBs.

An operation example in this embodiment is described. First, operation performed when a failure does not occur in the multi-ring network is described. As illustrated in FIG. 43, one ports of the node 2, the node 6, and the node 8, which are the RPL owners of the rings, are blocked. The R-APS (NR, RB) frame meaning no failure detection is transmitted from the RPL owners. After carrying out, on the R-APS frame input from the ports connected to the rings, the ERP processing for a ring ID stored in the R-APS frame, the shared nodes of the nodes 1, 4, 5, and 6 transfer the frame to ports to which the shared link (the shared link 10-1 or 10-2) is connected. After carrying out, on the R-APS frame received from the shared links 10-1 and 10-2, the ERP processing for the ring ID stored in the R-APS frame in the same manner, the shared nodes transfer the R-APS frame to ports to which a ring at a transfer destination is connected.

Figure 48:
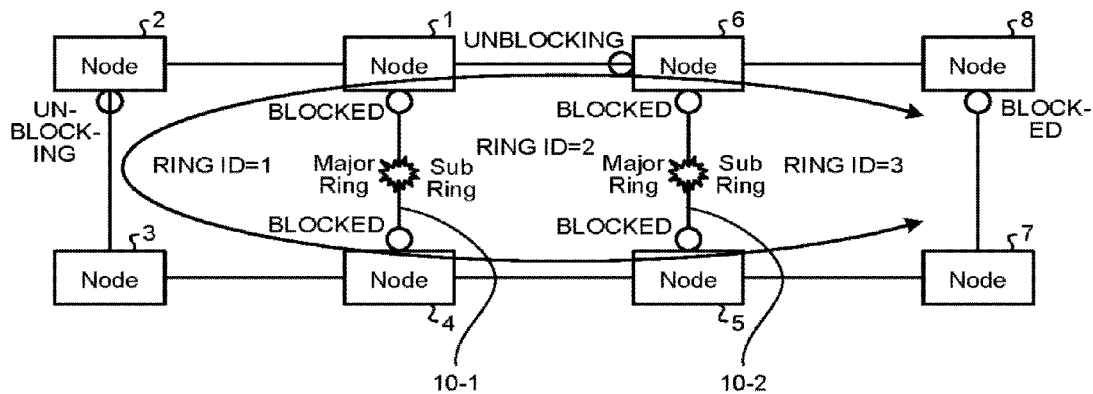

Operation performed when a failure occurs in the multi-ring network is described. FIG. 48 is a diagram illustrating a state in which failures occur in the shared link 10-1 and the shared link 10-2. As illustrated in FIG. 48, when failures occur in the shared link 10-1 and the shared link 10-2, in the ring ID=1, which is the major ring of the shared link 10-1, and the ring ID=2, which is the major ring of the shared link 10-2, failures occur between the nodes 1 and 4 of the shared link 10-1 and between the nodes 5 and 6 of the shared link 10-2. Therefore, failure detection ports are blocked in the rings. The R-APS(SF) frame is transmitted from the nodes 1, 4, 5, and 6. A default blocked port of the node 8, which is the RPL owner, is unblocked. According to the failure detection of the shared links 10-1 and 10-2, according to the flow of FIG. 47, when receiving the R-APS frame from the ring sides of the ring IDs=2 and 3, which are the sub rings in the rings, the nodes 1, 4, 5, and 6, which are the shared nodes, carry out the ERP processing and transfer the R-APS frame to the ring sides of the ring IDs=1 and 2, which are the major rings.

Figure 49:
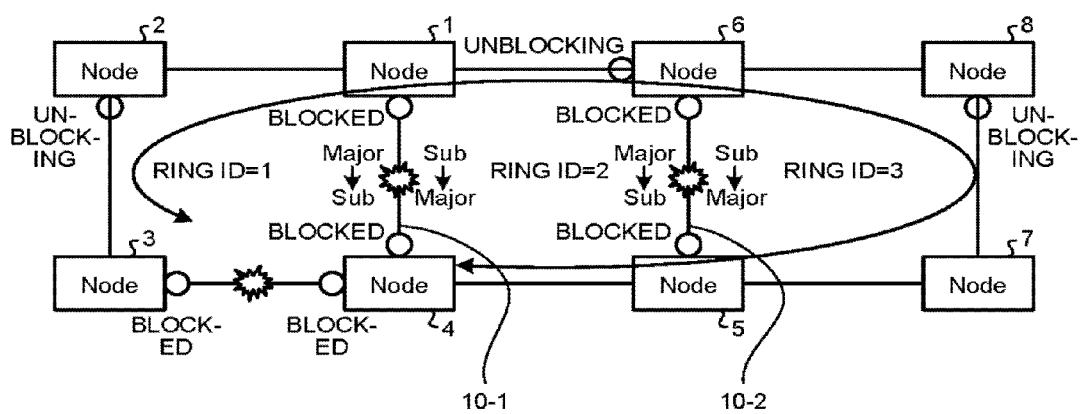
FIG. 49 is a diagram illustrating a state in which a failure occurs in a major ring with respect to shared links after a failure occurs in two shared links.

FIG. 49 is a diagram illustrating a state in which a failure occurs in the major ring with respect to the shared link 10-1 after failures occur in the two shared links 10-1 and 10-2. FIG. 49 shows an example in which, after the failures occur in the shared links 10-1 and 10-2 as illustrated in FIG. 48, a failure further occurs between the nodes 3 and 4 of the major ring with respect to the shared link 10-1. The shared link performs failure processing in the major ring. However, when a failure occurs anew between the nodes 3 and 4 in a place other than the shared link 10-1 of the major ring of the shared link 10-1, ports in which the failure between the nodes 3 and 4 is detected are blocked. The R-APS(SF) frame is transmitted from the nodes 3 and 4 to the ring with the ring ID=1. At this point, the nodes 1 and 4, which are the shared nodes, determine according to the R-APS frame input from ports connected to the ring with the ring ID=1 or failure detection that multiple failures in the major ring occur. According to the flow illustrated in FIG. 47, the nodes 1 and 4 determine whether rings capable of switching a route are present. In FIG. 48, the nodes 1 and 4, which are the shared nodes, receive the R-APS(NR, RB) of the ring ID=3 from two ports other than the port to which the shared link 10-1 is connected. In the ring management table of all the rings illustrated in FIG. 46 of the shared nodes, it is determined that the ring ID=3 is a ring having no failure and capable of switching a route. The major ring and the sub ring with respect to the shared link 10-1 are switched. The R-APS(SF) for detection of a failure in the major ring and storing information indicating that a route switching request is active is transferred from the node 1, which is the shared link master node, to the node 6 side. The shared node 6 of the shared link 10-2 receives the R-ASP(SF).

The node 6 detects a failure other than a failure in the shared link 10-2 of the ring with the ring ID=2, which is the major ring of the shared link 10-2, and switches the major ring and the sub ring with respect to the shared link 10-2 according to the flow of FIG. 47. Consequently, with respect to the shared link 10-2, the ring with the ring ID=3 is the major ring. The R-APS(SF) frame for failure detection in the shared link 10-2 is output from the nodes 5 and 6, which are the shared nodes, to the ports on the ring side with the ring ID=3. The node 8, which is the RPL owner of the ring with the ring ID=3, receives the R-APS(SF) frame and unblocks the blocked port as illustrated in FIG. 49. In the nodes 1 and 4, which are the shared nodes, because the failure occurs in the shared link 10-1, the R-APS frame received from the port on the ring side with the ring ID=1 is transferred to the ring side with the ring ID=2. In the nodes 5 and 6, because the failure occurs in the shared link 10-2, the R-APS frame received from the port on the ring side with the ring ID=2 is transferred to the ring side with the ring ID=3. Communication among the nodes is possible even during such multiple failures.

As described above, in this embodiment, the configuration in which the three rings are connected by the two shared links is referred to as an example and the operation for switching the major ring and the sub ring in the shared nodes when failures occur in the two shared links and a failure other than a failure in the shared link of the major ring is detected is described. In this way, when the three rings are connected by the two shared links, it is possible to set a bypass and continue communication when multiple failures including a failure in the shared link in the major ring occur.

INDUSTRIAL APPLICABILITY

As described above, the communication system, the communication apparatus, and the protection method according to the present invention are useful for the multi-ring network.

REFERENCE SIGNS LIST

1 to 8 Nodes
10, 10-1, 10-2 Shared links
11-1 to 11-n Input processing units
12 Multiplexing unit
13 Transfer-destination managing unit
14, 14a, 14b ERP control units
Buffer memory
16 Buffer control unit
17-1 to 17-n Output processing units
21, 21a, 21b, 21c Multi-ring managing units
22-1 to 22-3, 25 ERP processing units
23, 32 Own-node-information managing units
24 Frame identifying unit
31, 31a Failure managing units
33 Shared-node-information managing unit
34 Ring-attribute-information managing unit
35 All-ring-information managing unit
311, 311a Failure monitoring units
312, 312a Switching processing units
313, 313a Output control units

The invention claimed is:
1. A communication system comprising two or more ring networks in which a plurality of communication apparatuses are connected in a ring shape,
 the communication system:
  carrying out ring protection by blocking a single port as a blocked port for each of the ring networks and switching the blocked port to a failure occurrence port when a failure occurs,
  setting one of the ring networks as a major ring that detects a failure in a shared link, which is a transmission line shared among the ring networks, and
  setting the ring network other than the major ring as sub ring that does not monitor for a failure, wherein
 a shared apparatus, which is the communication apparatus that terminates the shared link, includes:
  a failure monitoring circuit that, for two or more of the ring networks that share the shared link, detects both failures in the ring networks and also detects a failure in the shared link;
  a switching processing circuit that carries out switching of the major ring and the sub ring on the basis of a detection result of the failures detected by the failure monitoring circuit; and
  a ring processing circuit that notifies, when the switching is performed by the switching processing circuit, the ring networks of information indicating the major ring after the switching,
 the communication apparatus,
  when transmitting a failure monitoring control frame for giving notification of presence or absence of occurrence of a failure in the ring networks, stores, in the failure monitoring control frame, information indicating the ring network to which an own node belongs and identification information indicating whether the ring network is the major ring or the sub ring and transmits the failure monitoring control frame, and
  when receiving the failure monitoring control frame from another of the communication apparatuses, transfers the failure monitoring control frame to the communication apparatus adjacent thereto, and
 the ring processing circuit, when the switching is performed by the switching processing circuit,
  stores, after the switching, the identification information in the failure monitoring control frame and transfers or transmits the failure monitoring control frame to the adjacent communication apparatus, the communication system sets, as a master shared apparatus, one of a pair of the shared apparatuses that terminate the shared link and sets the other as a slave shared apparatus, the master shared apparatus, because of the occurrence of a failure in the shared link, transfers the failure monitoring control frame to the ring network that is set as the major ring, and the slave shared apparatus, before receiving the failure monitoring control frame transferred to the major ring side by the master shared apparatus, does not transfer the failure monitoring control frame received from the shared link, when receiving the failure monitoring control frame for giving notification the failure in the shared link transferred from the master shared apparatus, changes ring attribute information for identifying the ring network functioning as the major ring of the slave shared apparatus to coincide with ring attribute information of the major ring of the master shared apparatus, and transfers the failure monitoring control frame received from the shared link to the major ring.

2. The communication system according to claim 1, wherein, when the failure monitoring control frame received from the ring networks set as the sub rings cannot be transferred in the ring networks because a failure occurs in the shared link, the shared apparatus transfers the failure monitoring control frame to the ring network that is set as the major ring.

3. The communication system according to claim 1, wherein the communication system sets, as a master shared apparatus, one of a pair of the shared apparatuses that terminate the shared link and sets the other as a slave shared apparatus, and the communication system retains information concerning connection order of all the ring networks from which the communication system is configured and receives the failure monitoring control frame cyclically transmitted in the ring networks so as to thereby monitor presence or absence of a failure state of the ring networks.

4. The communication system according to claim 1, wherein the ring networks carry out the ring protection with Ethernet Ring Protection and use the failure monitoring control frame as a Ring-Automatic Protection Switching frame.

5. The communication system according to claim 1, wherein, the switching processing circuit, when a failure occurs other than in the shared link in the ring network that is set as the major ring, changes the ring network to the sub ring and changes the ring network in which a failure does not occur among the ring networks that are set as the sub rings to the major ring.

6. The communication system according to claim 1, wherein priority is set in advance for each of the ring networks as ring information, and the switching processing circuit, when a failure occurs in the shared link in at least one of the ring networks from which the communication system is configured, changes the ring network having ring information with highest priority among all the ring networks to the major ring and changes all the ring networks other than the major ring before the change to the sub rings.

7. The communication system according to claim 1, wherein, the switching processing circuit, when failures occurs in a plurality of the shared links and multiple failures occur in the shared links and in links other than the shared links in the ring networks, changes the major ring of the plurality of shared links in which the failures occur to the sub ring.

8. The communication system according to claim 1, wherein a pair of the ring networks share a singularity of the shared link.

9. The communication system according to claim 1, wherein three or more of the ring networks share a singularity of the shared link.

10. The communication system according to claim 1, wherein a plurality of the shared link are provided, and the communication system includes the shared apparatus that switches the major ring and the sub ring for the ring networks in which each of the ring networks shares the shared link.

11. A protection method in a communication system including two or more ring networks in which a plurality of communication apparatuses are connected in a ring shape in each of the ring networks, the communication system:

carrying out ring protection for blocking a single port as a blocked port for each of the ring networks and switching the blocked port to a failure occurrence port when a failure occurs, setting one of the ring networks as a major ring that detects a failure in a shared link, which is a transmission line shared among the ring networks, and setting the ring networks other than the major ring as sub rings that do not monitor a failure in the shared link, the protection method comprising:

a failure monitoring step in which a shared apparatus, which is the communication apparatus that terminates the shared link, respectively detects, concerning two or more of the ring networks that share the shared link, failures in the ring networks and detects a failure in the shared link;

a switching step in which the shared apparatus carries out switching of the major ring and the sub ring on the basis of a detection result of the failures at the failure monitoring step; and a ring processing step for giving notification of, when the switching is performed at the switching step, information indicating the major ring after the switching to the ring network, wherein the communication apparatus, when transmitting a failure monitoring control frame for giving notification of presence or absence of occurrence of a failure in the ring networks, stores, in the failure monitoring control frame, information indicating the ring network to which an own node belongs and identification information indicating whether the ring network is the major ring or the sub ring and transmits the failure monitoring control frame, and when receiving the failure monitoring control frame from another of the communication apparatuses, transfers the failure monitoring control frame to the communication apparatus adjacent thereto, the shared apparatus, when the switching is performed, stores, after the switching, the identification information in the failure monitoring control frame and transfers or transmits the failure monitoring control frame to the adjacent communication apparatus, the communication system sets, as a master shared apparatus, one of a pair of the shared apparatuses that terminate the shared link and sets the other as a slave shared apparatus, the master shared apparatus, because of the occurrence of a failure in the shared link, transfers the failure monitoring control frame to the ring network that is set as the major ring, and the slave shared apparatus,
  before receiving the failure monitoring control frame transferred to the major ring side by the master shared apparatus, does not transfer the failure monitoring control frame received from the shared link,
  when receiving the failure monitoring control frame for giving notification the failure in the shared link transferred from the master shared apparatus, changes ring attribute information for identifying the ring network functioning as the major ring of the slave shared apparatus to coincide with ring attribute information of the major ring of the master shared apparatus, and
  transfers the failure monitoring control frame received from the shared link to the major ring.

12. The protection method according to claim 11, wherein the communication system:
  setting one of the communication apparatuses, which terminate the shared link, as a master node that determines the major ring and the sub rings, and
  setting the communication apparatus, which terminates the shared link, other than the master node as a slave node.

13. A protection method in a communication system including three or more ring networks in which a plurality of the communication apparatuses are connected in a ring shape,
  the ring networks including a shared link, which is a transmission line shared between two of the ring networks adjacent to each other,
  the communication system:
    carrying out ring protection for blocking a single port as a blocked port for each of the ring networks and switching the blocked port to a failure occurrence port when a failure occurs,
    setting one of the two ring networks, which share the shared link, as a major ring that detects a failure in a shared link,
    setting the ring networks other than the major ring as sub rings that do not monitor a failure,
    setting one of the communication apparatuses, which terminate the shared link, as a master node that determines the major ring and the sub rings, and
    setting the communication apparatus, which terminates the shared link, other than the master node as a slave node,
  the protection method comprising:
    a failure monitoring step in which a shared apparatus, which terminates shared links, respectively detects, concerning the ring networks that share the shared link, a plurality of failures in the ring networks and detects a failure in the shared link;
    a step in which the shared apparatus retains a connection state to all the ring networks and monitors a failure state of the ring networks;
    a switching step in which the shared apparatus carries out switching of the major ring and the sub ring on the basis of a detection result of the failures at the failure monitoring step; and
  a ring processing step for
    giving notification of, when the switching is performed at the switching step, information indicating the major ring after the switching to the ring networks and
    requesting the ring networks not having a failure and capable of switching a route to switch the major ring and the sub ring,
  at least one of the plurality of communication apparatuses,
    when transmitting a failure monitoring control frame for giving notification of presence or absence of occurrence of a failure in the ring networks, stores, in the failure monitoring control frame, information indicating the ring network to which an own node belongs and identification information indicating whether the ring network is the major ring or the sub ring and transmits the failure monitoring control frame, and
    when receiving the failure monitoring control frame from another of the communication apparatuses, transfers the failure monitoring control frame to the communication apparatus adjacent thereto, and
  the ring processing circuit, when the switching is performed by the switching processing circuit
    stores, after the switching, the identification information in the failure monitoring control frame and
    transfers or transmits the failure monitoring control frame to the adjacent communication apparatus,
  the communication system sets, as a master shared apparatus, one of a pair of the shared apparatuses that terminate the shared link and sets the other as a slave shared apparatus,
  the master shared apparatus, because of the occurrence of a failure in the shared link, transfers the failure monitoring control frame to the ring network that is set as the major ring, and
  the slave shared apparatus,
    before receiving the failure monitoring control frame transferred to the major ring side by the master shared apparatus, does not transfer the failure monitoring control frame received from the shared link,
    when receiving the failure monitoring control frame for giving notification the failure in the shared link transferred from the master shared apparatus, changes ring attribute information for identifying the ring network functioning as the major ring of the slave shared apparatus to coincide with ring attribute information of the major ring of the master shared apparatus, and
    transfers the failure monitoring control frame received from the shared link to the major ring.

* * * * *